US006452756B1

(12) United States Patent
Sasaki

(10) Patent No.: US 6,452,756 B1
(45) Date of Patent: Sep. 17, 2002

(54) THIN-FILM MAGNETIC HEAD AND METHOD OF MANUFACTURING SAME AND THIN-FILM MAGNETIC HEAD MATERIAL AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/318,843

(22) Filed: May 26, 1999

(30) Foreign Application Priority Data

| Jun. 4, 1998 | (JP) | 10-156424 |
| Jun. 5, 1998 | (JP) | 10-158157 |
| Jul. 7, 1998 | (JP) | 10-191154 |
| Jul. 15, 1998 | (JP) | 10-200724 |

(51) Int. Cl.[7] .............. G11B 5/39; G11B 5/31; G11B 5/147; H04R 31/00
(52) U.S. Cl. ............... 360/317; 360/319; 360/126; 29/603.14
(58) Field of Search ............... 360/126, 317, 360/319, 322; 29/603.14

(56) References Cited

U.S. PATENT DOCUMENTS

| 5,097,371 A | * | 3/1992 | Somers | 360/113 |
| 5,764,446 A | * | 6/1998 | Seagle | 360/113 |
| 5,966,274 A | * | 10/1999 | Suzuki | 360/113 |
| 6,034,848 A | * | 3/2000 | Garfunkel et al. | 360/126 |
| 6,101,067 A | * | 8/2000 | Matsuzono et al. | 360/113 |
| 6,130,809 A | * | 10/2000 | Santini | 360/317 |
| 6,154,346 A | * | 11/2000 | Sasaki | 360/317 |
| 6,154,347 A | * | 11/2000 | Sasaki | 360/317 |

* cited by examiner

Primary Examiner—William Klimowicz
(74) Attorney, Agent, or Firm—Oliff & Berridge, PLC

(57) ABSTRACT

An object of the invention is to improve the insulating property between an electrode connected to a magnetoresistive element and a shield layer. A thin-film magnetic head of the invention includes: a magnetoresistive element; a bottom shield layer and a top shield layer for shielding the magnetoresistive element, wherein portions of the bottom shield layer and the top shield layer facing a recording medium are opposed to each other with the magnetoresistive element in between; two insulating layers each provided between the magnetoresistive element and each of the shield layers; a conductive layer connected to the magnetoresistive element; and an induction-type magnetic transducer. The bottom shield layer, for example, has a groove in which the conductive layer making up a lead connected to the magnetoresistive element is placed. The conductive layer is placed in the groove, being insulated by an insulating film from the bottom shield layer.

38 Claims, 63 Drawing Sheets

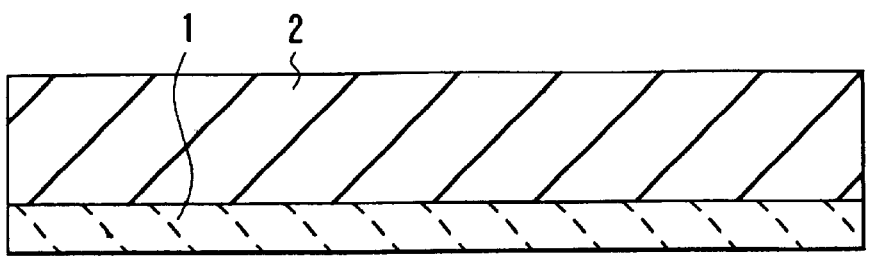 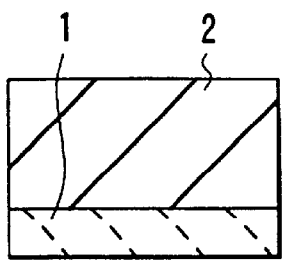
FIG. 1A  FIG. 1B
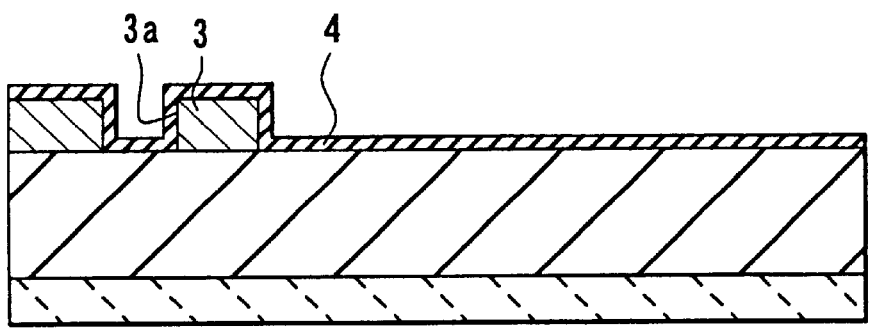 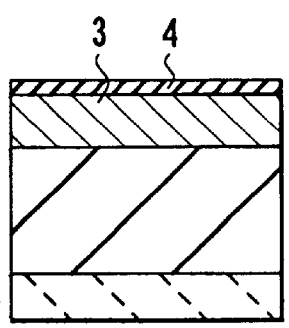
FIG. 2A  FIG. 2B
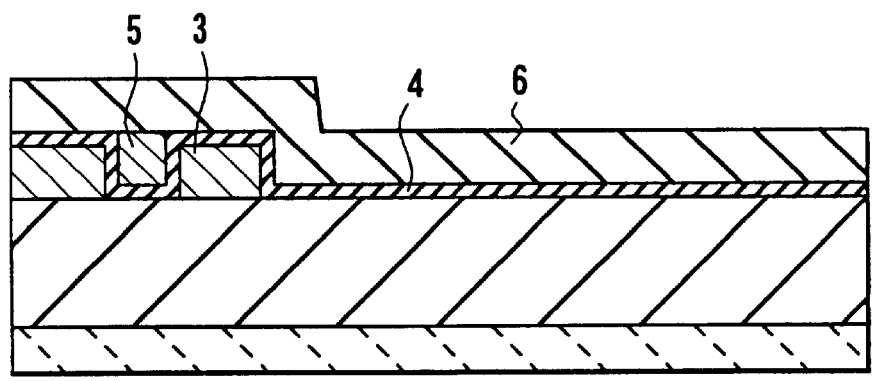 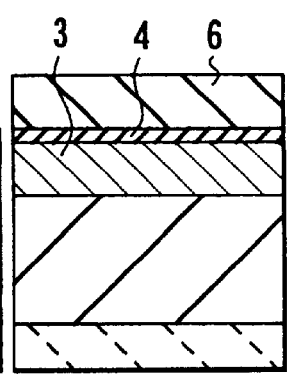
FIG. 3A  FIG. 3B

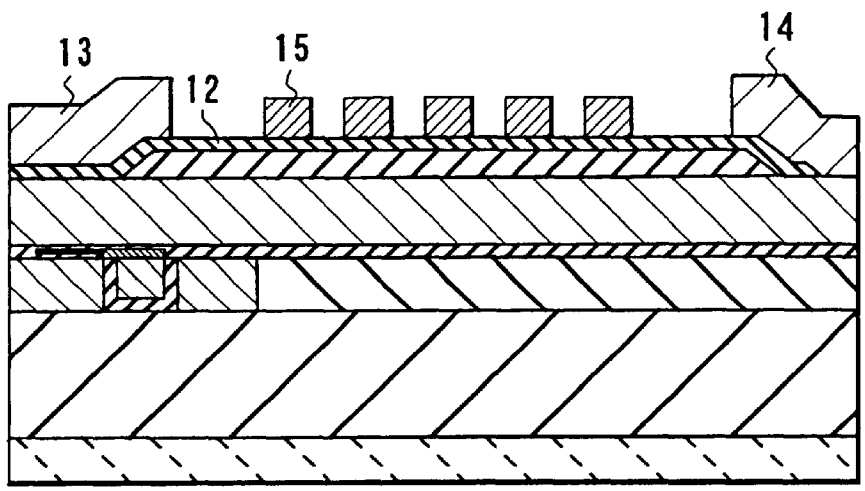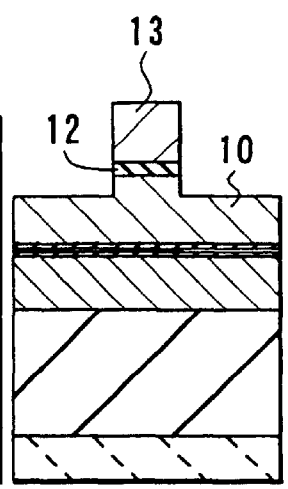
FIG. 7A     FIG. 7B
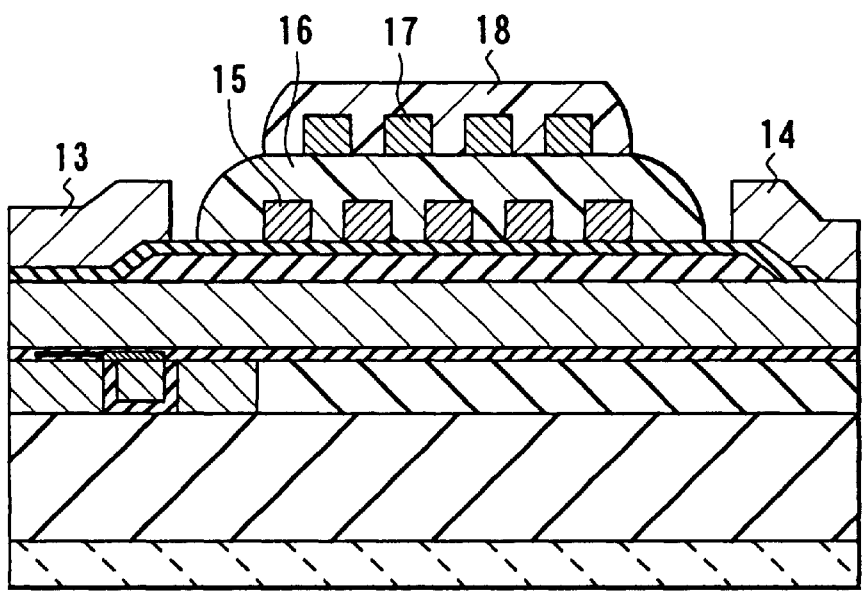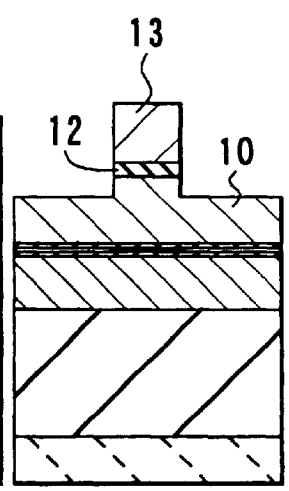
FIG. 8A     FIG. 8B

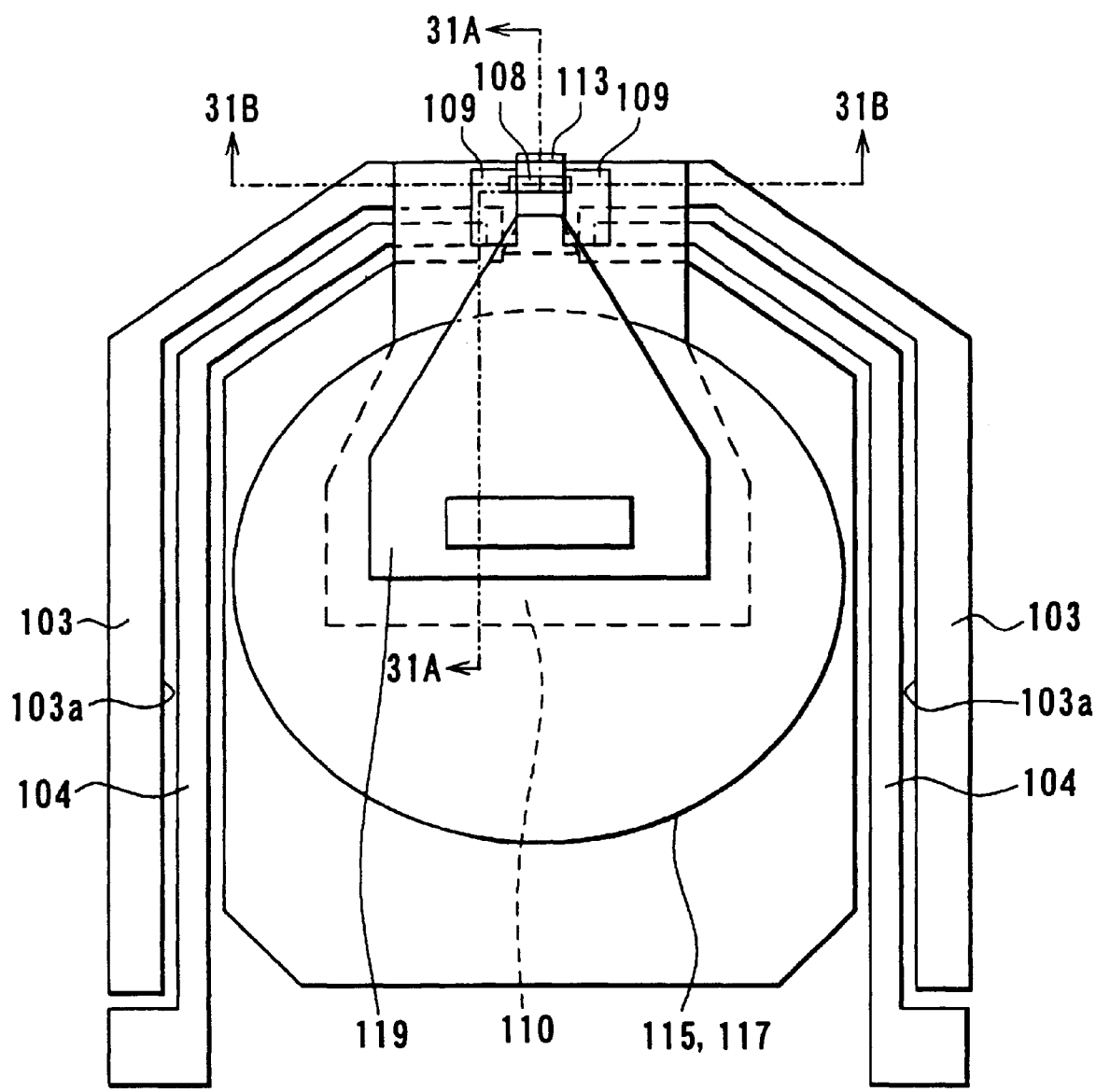
F I G. 33

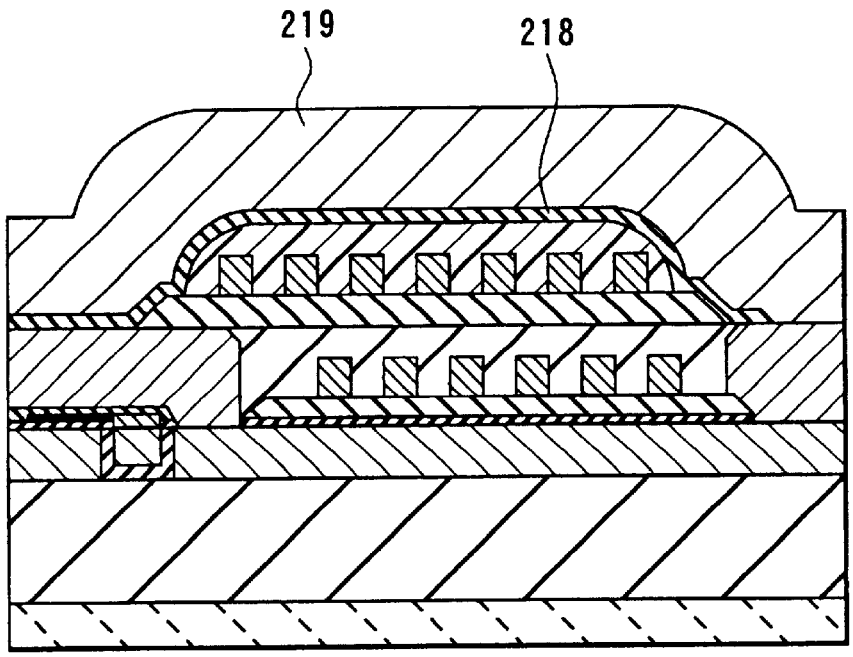
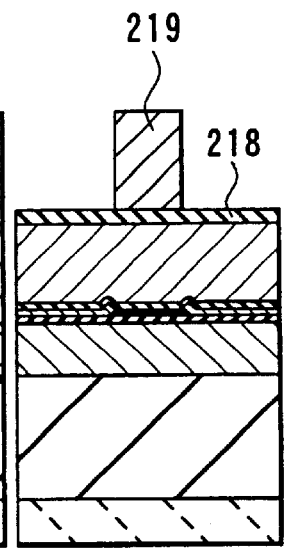
FIG. 50A  FIG. 50B
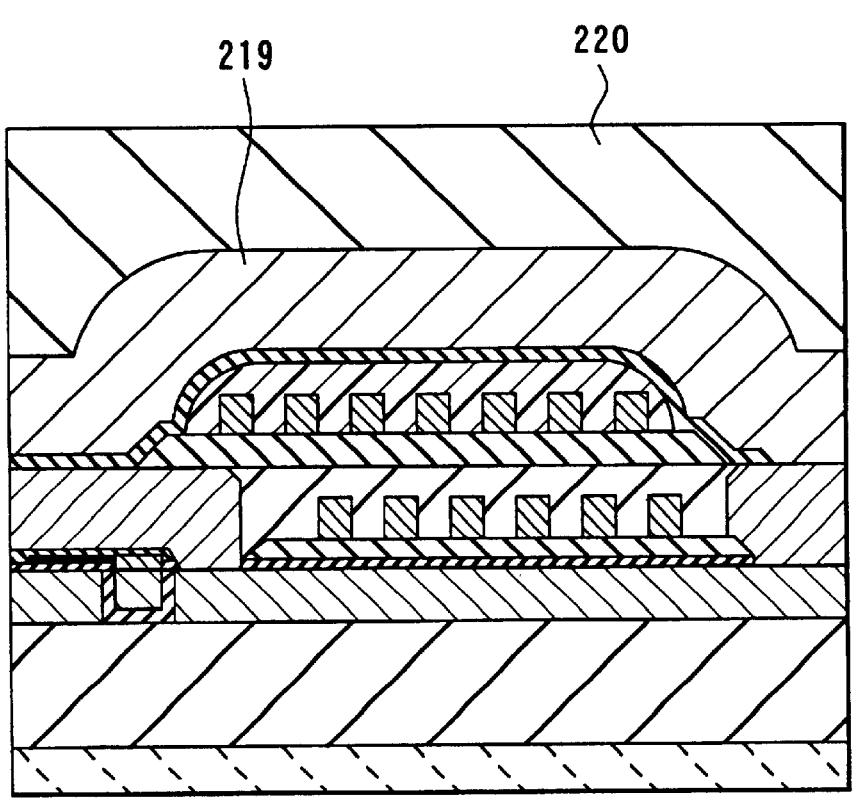
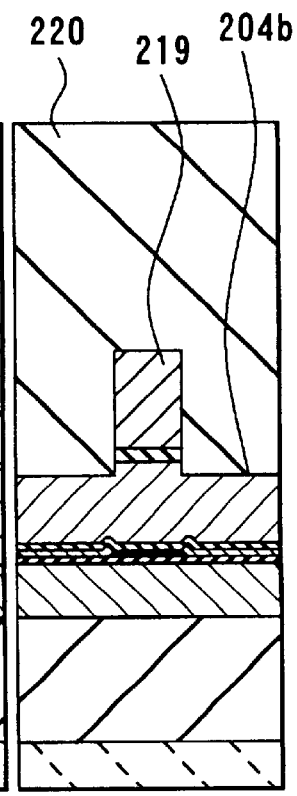
FIG. 51A  FIG. 51B

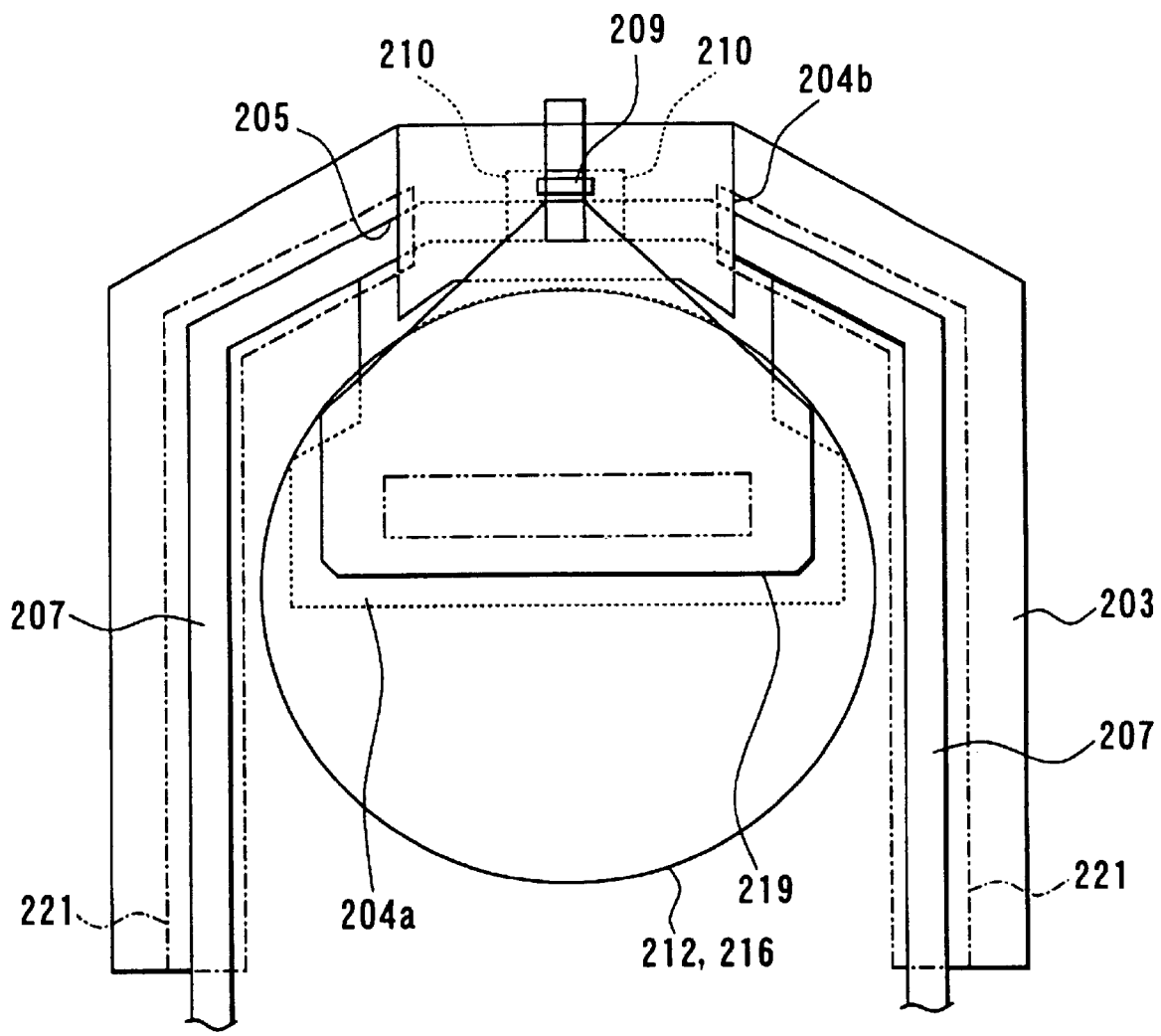
F I G. 54

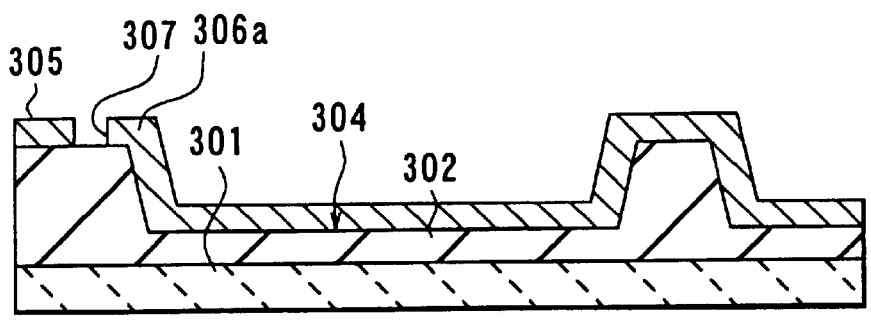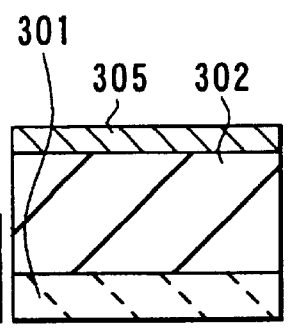
FIG. 72A  FIG. 72B
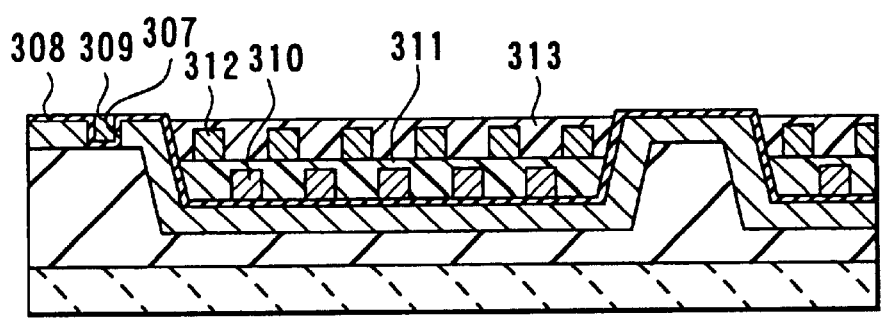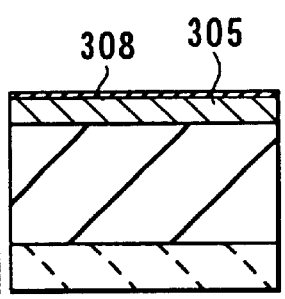
FIG. 73A  FIG. 73B
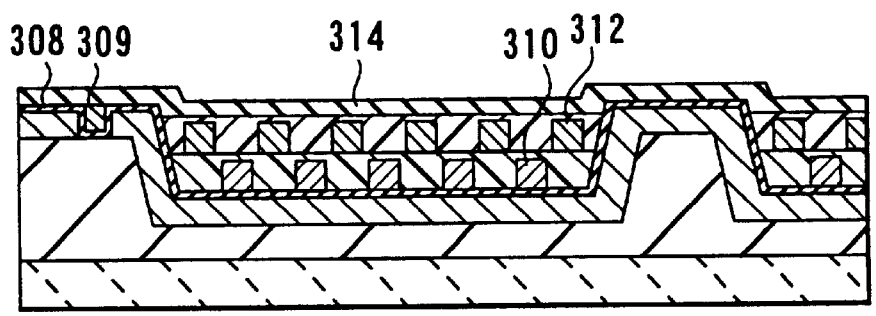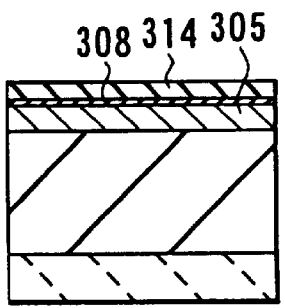
FIG. 74A  FIG. 74B

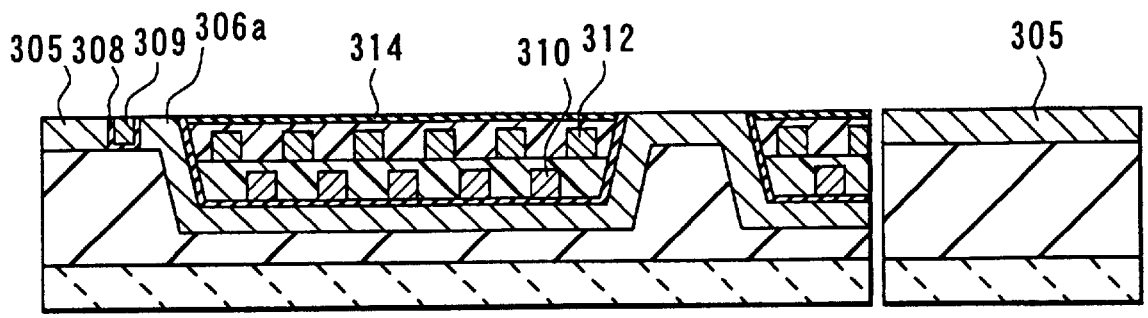 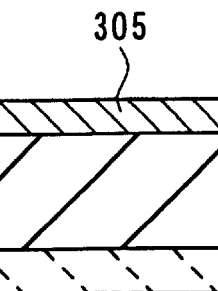
FIG. 75A  FIG. 75B
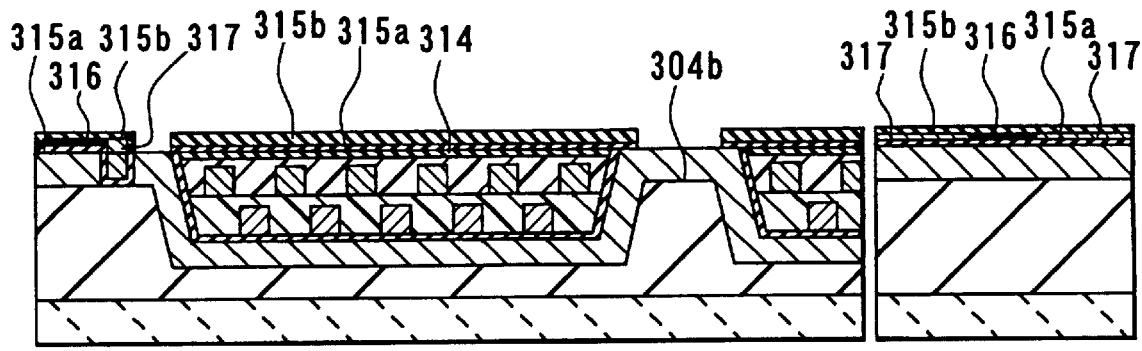 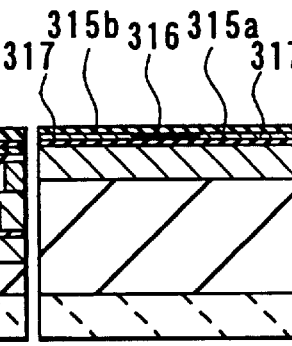
FIG. 76A  FIG. 76B
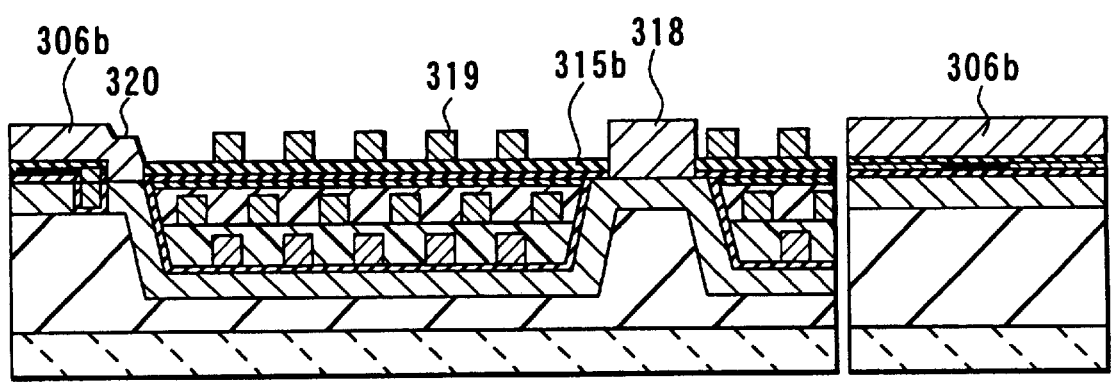 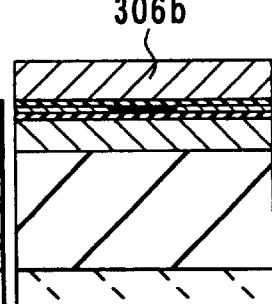
FIG. 77A  FIG. 77B

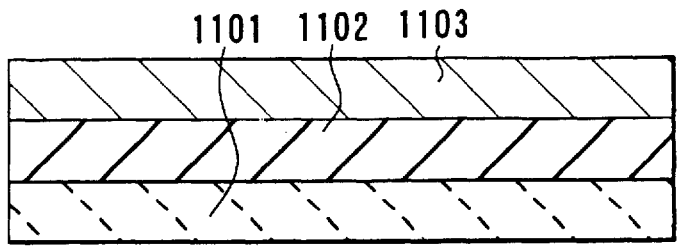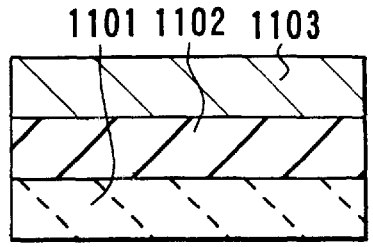
FIG. 91A
RELATED ART
FIG. 91B
RELATED ART
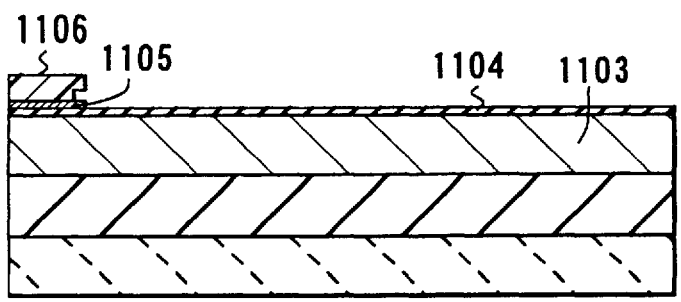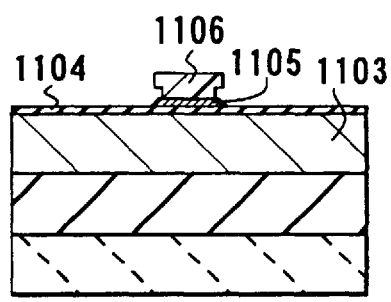
FIG. 92A
RELATED ART
FIG. 92B
RELATED ART
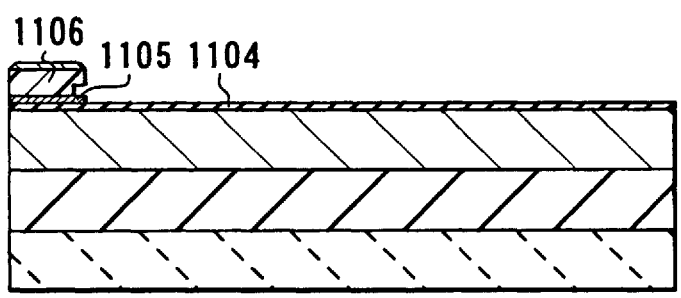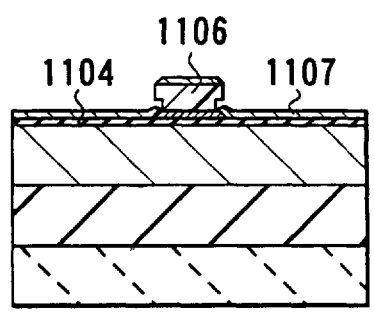
FIG. 93A
RELATED ART
FIG. 93B
RELATED ART
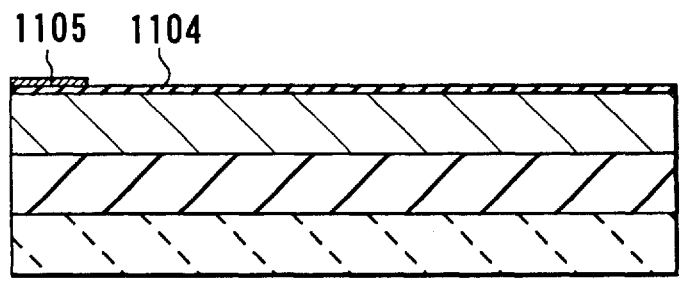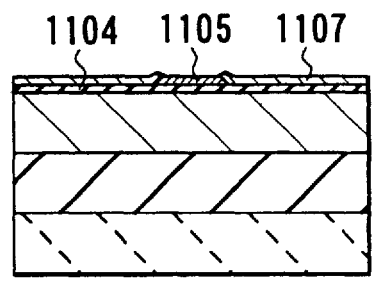
FIG. 94A
RELATED ART
FIG. 94B
RELATED ART

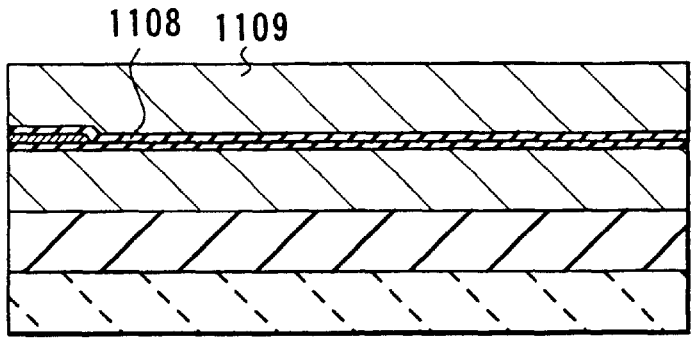 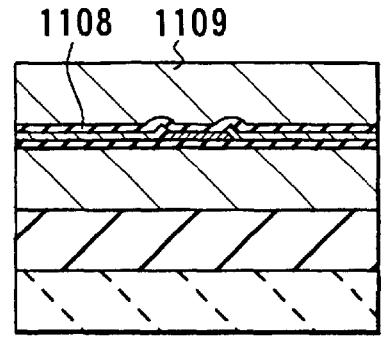
FIG. 95A
RELATED ART
FIG. 95B
RELATED ART
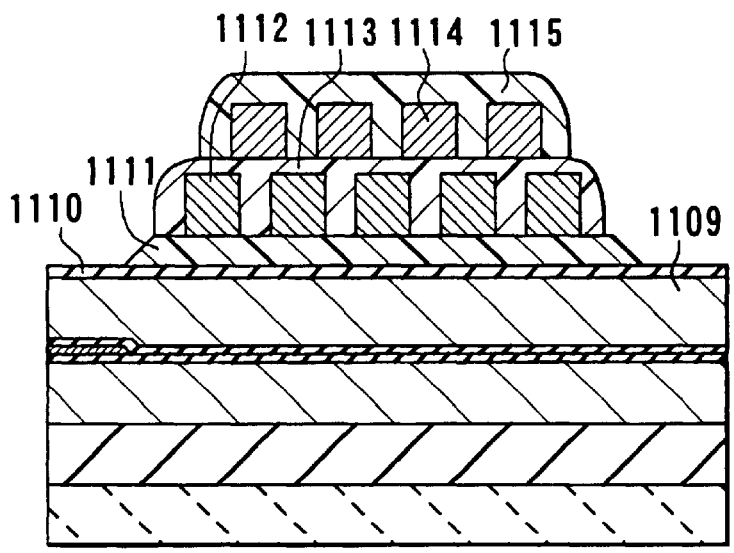 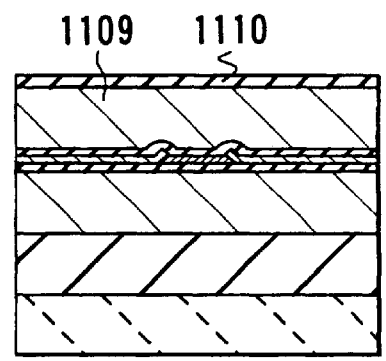
FIG. 96A
RELATED ART
FIG. 96B
RELATED ART

THIN-FILM MAGNETIC HEAD AND METHOD OF MANUFACTURING SAME AND THIN-FILM MAGNETIC HEAD MATERIAL AND METHOD OF MANUFACTURING SAME

BACKGROUND OF THE INVENTION

1. Field of the Invention

The present invention relates to a thin-film magnetic head having at least a magnetoresistive element for reading and a method of manufacturing such a magnetic head, and to a thin-film magnetic head material used for producing a composite thin-film magnetic head having a magnetoresistive element and an induction-type magnetic transducer and a method of manufacturing such a thin-film magnetic head material.

2. Description of the Related Art

Performance improvements in thin-film magnetic heads have been sought with an increase in surface recording density of a hard disk drive. A composite thin-film magnetic head has been widely used which is made of a layered structure including a recording head having an induction magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called AMR head or simply MR head. A reproducing head using a GMR element is called GMR head. An AMR head is used as a reproducing head whose surface recording density is more than 1 gigabit per square inch. A GMR head is used as a reproducing head whose surface recording density is more than 3 gigabits per square inch.

An AMR head comprises an AMR film having the AMR effect. In place of the AMR film a GMR head comprises a GMR film having the GMR effect. The configuration of the GMR head is similar to that of the AMR head. However, the GMR film exhibits a greater change in resistance under a specific external magnetic field compared to the AMR film. As a result, the reproducing output of the GMR head is about three to five times as great as that of the AMR head.

The MR film may be changed in order to improve the performance of a reproducing head. In general, an AMR film is made of a magnetic substance that exhibits the MR effect and has a single-layer structure. In contrast, many of GMR films have a multilayer structure consisting of a plurality of films. There are several types of mechanisms of producing the GMR effect. The layer structure of a GMR film depends on the mechanism. GMR films include a superlattice GMR film, a granular film, a spin valve film and so on. The spin valve film is most efficient since the film has a relatively simple structure, exhibits a great change in resistance in a low magnetic field, and suitable for mass production. The performance of the reproducing head is thus easily improved by replacing the AMR film with a GMR film and the like with an excellent magnetoresistive sensitivity.

Besides selection of a material as described above, the pattern width such as the MR height, in particular, determines the performance of a reproducing head. The MR height is the length (height) between the end of the MR element closer to the air bearing surface (medium facing surface) and the other end. The MR height is basically controlled by an amount of lapping when the air bearing surface is processed.

Many of reproducing heads have a structure in which the MR element is electrically and magnetically shielded by a magnetic material.

Referring to FIG. 91 to FIG. 100, an example of a manufacturing method of a composite thin-film magnetic head will now be described as an example of a manufacturing method of a related-art thin-film magnetic head. FIG. 91A to FIG. 98A are cross sections orthogonal to the air bearing surface. FIG. 91B to FIG. 98B are cross sections parallel to the air bearing surface of the pole portion.

According to the manufacturing method, as shown in FIGS. 91A and 91B, an insulating layer 1102 made of alumina ($Al_2O_3$), for example, of about 5 to 10 $\mu$m in thickness is deposited on a substrate 1101 made of aluminum oxide and titanium carbide ($Al_2O_3$—TiC), for example. On the insulating layer 1102 a bottom shield layer 1103 made of a magnetic material of 2 to 3 $\mu$m in thickness is formed for a reproducing head.

Next, as shown in FIGS. 92A and 92B, on the bottom shield layer 1103 alumina or aluminum nitride, for example, of 50 to 100 nm in thickness is deposited through sputtering to form a bottom shield gap film 1104 as an insulating layer. On the bottom shield gap film 1104 an MR film of tens of nanometers in thickness is formed for making an MR element 1105 for reproduction. Next, on the MR film a photoresist pattern 1106 is selectively formed where the MR element 1105 is to be formed. The photoresist pattern 1106 takes a shape that easily allows lift-off, such as a shape having a T-shaped cross section. Next, with the photoresist pattern 1106 as a mask, the MR film is etched through ion milling to form the MR element 1105. The MR element 1105 may be either a GMR element or an AMR element.

Next, as shown in FIGS. 93A and 93B, on the bottom shield gap film 1104 a pair of first conductive layers 1107 whose thickness is tens of nanometers are formed, using the photoresist pattern 1106 as a mask. The first conductive layers 1107 are electrically connected to the MR element 1105. The first conductive layers 1107 may have a multilayer structure including TiW, CoPt, TiW, and Ta, for example. Next, as shown in FIGS. 94A and 94B, the photoresist pattern 1106 is lifted off. Although not shown in FIGS. 94A and 94B, a pair of second conductive layers whose thickness is 50 to 100 nm are formed in a specific pattern. The second conductive layers are electrically connected to the first conductive layers 1107. The second conductive layers may be made of copper (Cu), for example. The first conductive layers 1107 and the second conductive layers make up leads electrically connected to the MR element 1105.

Next, as shown in FIG. 95A and FIG. 95B, a top shield gap film 1108 of 50 to 150 nm in thickness is formed as an insulating layer on the bottom shield gap film 1104 and the MR film 1105. The MR film 1105 is embedded in the shield gap films 1104 and 1108. Next, on the top shield gap film 1108 a top shield layer-cum-bottom magnetic layer (called top shield layer in the following description) 1109 of about 3 $\mu$m in thickness is formed. The top shield layer 1109 is made of a magnetic material and used for both a reproducing head and a recording head.

Next, as shown in FIG. 96A and FIG. 96B, on the top shield layer 1109, a recording gap layer 1110 made of an insulating film such as an alumina film is formed whose thickness is about 0.2 to 0.3 $\mu$m. On the recording gap layer 1110 a photoresist layer 1111 for determining the throat height is formed into a specific pattern whose thickness is about 1.0 to 2.0 $\mu$m. Next, on the photoresist layer 1111 a thin-film coil 1112 of a first layer is made for the induction-type recording head. The thickness of the thin-film coil 1112 is 3 $\mu$m. Next, a photoresist layer 1113 is formed into a specific pattern on the photoresist layer 1111 and the coil 1112. On the photoresist layer 1113 a thin-film coil 1114 of a second layer is then formed into a thickness of 3 μm.

Next, a photoresist layer 1115 is formed into a specific pattern on the photoresist layer 1113 and the coil 1114.

Next, as shown in FIG. 97A and FIG. 97B, the recording gap layer 1110 is partially etched in a portion behind the coils 1112 and 1114 (the right side of FIG. 97A) to form a magnetic path. A top pole layer 1116 of about 3 μm in thickness is then formed on the recording gap layer 1110 and the photoresist layers 1111, 1113 and 1115. The top pole layer 1116 is made of a magnetic material for the recording head such as Permalloy (NiFe) or FeN as a high saturation flux density material. The top pole layer 1116 comes to contact with the top shield layer (bottom pole layer) 1109 and is magnetically coupled to the top shield layer 1109 in a portion behind the coils 1112 and 1114.

As shown in FIG. 98A and FIG. 98B, the recording gap layer 1110 and the top shield layer (bottom pole layer) 1109 are etched through ion milling, using the top pole layer 1116 as a mask. Next, an overcoat layer 1117 of alumina, for example, having a thickness of 20 to 30 μm is formed to cover the top pole layer 1116. Finally, machine processing of the slider is performed to form the air bearing surface of the recording head and the reproducing head. The thin-film magnetic head is thus completed. As shown in FIG. 98B, the structure is called trim structure wherein the sidewalls of the top pole layer 1116, the recording gap layer 1110, and part of the top shield layer (bottom pole layer) 1109 are formed vertically in a self-aligned manner. The trim structure suppresses an increase in the effective track width due to expansion of the magnetic flux generated during writing in a narrow track.

FIG. 99 is a top view of the thin-film magnetic head manufactured as described above. The overcoat layer 1117 is omitted in FIG. 99. FIG. 100 is a top view wherein the MR element 1105, the first conductive layer 1107 and the second conductive layer 1118 are formed on the bottom shield gap film 1104. FIG. 91A to FIG. 98A are cross sections taken along line 98A—98A of FIG. 99. FIG. 91B to FIG. 98B are cross sections taken along line 98B—98B of FIG. 99.

As shown in FIG. 99 and FIG. 100, the related-art thin-film magnetic head has the structure wherein the conductive layers 1107 and 1118 connected to the MR element 1105 are inserted in a wide region between the bottom shield layer 1103 and the top shield layer 1109 for shielding the MR element 1105. The very thin bottom shield gap film 1104 and top shield gap film 1108 are each placed between the shield layer 1103 and the conductive layers 1107 and 1118 and between the shield layer 1109 and the conductive layers 1107 and 1118, respectively. High insulation property is therefore required for the shield gap films 1104 and 1108. The yields of the thin-film magnetic heads thus greatly depend on the insulation property.

With improvements in performance of the recording head, a problem of thermal asperity comes up. Thermal asperity is a reduction in reproducing characteristic due to self-heating of the reproducing head during reproduction. To overcome thermal asperity, a material with high cooling efficiency is required for the bottom shield layer 1103 and the shield gap films 1104 and 1108 in the related-art. Therefore, the bottom shield layer 1103 is made of a magnetic material such as Permalloy or Sendust in the related-art. The shield gap films 1104 and 1108 are made of a material such as alumina, through sputtering, into a thickness of 100 to 150 nm, for example. The shield gap films 1104 and 1108 thus magnetically and electrically isolate the shield layers 1103 and 1109 from the MR element 1105 and the conductive layers 1107 and 1118.

It is inevitable that thermal asperity should be overcome in order to improve the performance of the reproducing head. Recently, the thickness of the shield gap films 1104 and 1108 has been reduced to as thin as 50 to 100 nm, for example. The cooling efficiency of the MR element 1105 is thereby improved so as to overcome thermal asperity.

However, since the shield gap films 1104 and 1108 are formed through sputtering, faults may result in the magnetic and electrical insulation that isolates the shield layers 1103 and 1109 from the MR element 1105 and the conductive layers 1107 and 1118, due to particles or pinholes in the films. Such faults more often result if the shield gap films 1104 and 1108 are thinner.

In order to improve the output characteristic of the reproducing head, it is preferred that the wiring resistance of the conductive layer connected to the MR element is as low as possible so that a minute change in the output signal corresponding to a minute change in resistance of the MR element can be detected. Therefore, the area of the conductive layer 1118 is often designed to be large in the related-art. However, the areas of the portions of the conductive layers 1118 that face the shield gap films 1104 and 1108 are made large, as a result. If the shield gap films 1104 and 1108 are thin as described above, magnetic and electrical insulation faults may more often result between the conductive layers 1118 and each of the shield layers 1103 and 1109.

As described above, it is preferred that the wiring resistance of the conductive layers connected to the MR element is low to improve the output characteristic of the reproducing head. However, there is a limit to reducing the wiring resistance of the conductive layers since the conductive layers 1107 and 1118 as thin as 50 to 100 nm are inserted between the shield layers 1103 and 1109 in the related-art thin-film magnetic head.

Since a narrow track width is required for the thin-magnetic head, a minute-size MR element is required. For the GMR head, in particular, it is required to precisely detect the output signal of the minute MR element. It is therefore required to reduce noises caused by internal factors such as the coils of the induction-type recording head or external factors such as the motor of the hard disk drive. However, the conductive layers 1118 carry noises in the related-art thin-film magnetic head. Such noises may reduce the performance of the reproducing head.

In Japanese Patent Application Laid-open Hei 9-312006 (1997) a technique is disclosed for reducing the electric resistance of the lead and preventing insulation faults between the lead and the top shield. The length of the bottom shield is made shorter than the top shield in the direction of drawing out the lead connected to the MR element from between the top and bottom shields. The thickness of the portion of the lead between the top and bottom shields is made thin. The portion of the lead off the bottom shield is made thick and to protrude downward.

In the technique, however, the lead is hardly shielded by the bottom shield. As a result, magnetic flux from the coil is easily received in the GMR head that requires a high output. The lead therefore tends to carry noises.

A technique disclosed in Japanese Patent Application Laid-open Sho 60-93613 (1985) is that a spacer layer is formed on an MR element and contact holes are made in the spacer layer to expose part of the MR element. A shield film and a conductive film (lead) are then formed at the same time, and the conductive film is connected to the MR element through the contact holes.

The technique prevents insulation faults between the conductive film and the shield film. However, the conductive film tends to carry noises since the conductive film is not shielded by the shield film.

OBJECTS AND SUMMARY OF THE INVENTION

It is a first object of the invention to provide a thin-film magnetic head and a method of manufacturing the same and a thin-film magnetic head material and a method of manufacturing the same for improving the insulation property between the shield layer and the conductive layer connected to the magnetoresistive element without increasing the thickness of the insulating layer between the shield layer and the magnetoresistive element.

It is a second object of the invention to provide a thin-film magnetic head and a method of manufacturing the same and a thin-film magnetic head material and a method of manufacturing the same for reducing the wiring resistance of the conductive layer connected to the magnetoresistive element.

It is a third object of the invention to provide a thin-film magnetic head and a method of manufacturing the same and a thin-film magnetic head material and a method of manufacturing the same for reducing the effect of noises on the conductive layer connected to the magnetoresistive element.

A first thin-film magnetic head of the invention comprises: a magnetoresistive element; a first shield layer and a second shield layer for shielding the magnetoresistive element, wherein portions of the first shield layer and the second shield layer facing a recording medium are opposed to each other with the magnetoresistive element; a first insulating layer provided between the magnetoresistive element and the first shield layer and a second insulating layer provided between the magnetoresistive element and the second shield layer; a conductive layer connected to the magnetoresistive element; and a groove in which at least part of the conductive layer is placed, the groove being formed in either the first shield layer or the second shield layer, or between the first and second shield layers. The at least part of the conductive layer is placed in the groove, being insulated from the shield layer having the groove or the shield layers facing the groove.

In the first thin-film magnetic head of the invention, the at least part of the conductive layer connected to the magnetoresistive element is placed in the groove formed in either the first shield layer or the second shield layer, or between the first and second shield layers, being insulated from the shield layer having the groove or the shield layers facing the groove. As a result, the insulation property is improved between the conductive layer and the shield layer without increasing the thickness of the insulating layer between the magnetoresistive element and the shield layer.

In the first thin-film magnetic head of the invention, the groove may be formed in the first shield layer. In this case the following configurations (1) to (3) are possible. (1) The at least part of the conductive layer placed in the groove is made of a material the same as a material the first shield layer is made of. (2) The thin-film magnetic head further comprises a seed layer electrically connected to the first shield layer, formed in a region greater than a region where the first shield layer is formed, and used for forming the first shield layer. (3) The first shield layer is divided into a portion facing the magnetoresistive element and a portion not facing the magnetoresistive element.

The first thin-film magnetic head of the invention may further comprise an insulating film placed in the groove. The insulating film insulates the at least part of the conductive layer from the shield layer having the groove or the shield layers facing the groove.

The first thin-film magnetic head of the invention may further comprise an induction-type magnetic transducer having two magnetic layers magnetically coupled to each other and a thin-film coil placed between the two magnetic layers. Parts of sides of the two magnetic layers facing a recording medium include magnetic pole portions opposed to each other with a gap layer in between. The magnetic layers are each made up of at least one layer. In this case the following configurations (1) to (3) are possible. (1) One of the first and second shield layers functions as one of the two magnetic layers as well. (2) At least part of the groove is placed around a region facing the two magnetic layers and the thin-film coil of the induction-type magnetic transducer. (3) At least part of the groove is placed to pass through a region facing the two magnetic layers and the thin-film coil of the induction-type magnetic transducer.

The first thin-film magnetic head of the invention may further comprise a shield layer for shielding the at least part of the conductive layer.

In the first thin-film magnetic head of the invention, the second shield layer may include a first portion at least part of which is placed in the same plane as the first shield layer and a second portion connected to the first portion, the second portion being opposed to the first shield layer with the magnetoresistive element in between. The groove is formed between the first shield layer and the first portion of the second shield layer.

With the above configuration the thin-film magnetic head may further comprise an induction-type magnetic transducer having two magnetic layers magnetically coupled to each other and a thin-film coil placed between the two magnetic layers. Parts of sides of the two magnetic layers facing a recording medium include magnetic pole portions opposed to each other with a gap layer in between. The magnetic layers are each made up of at least one layer. In this case the following configurations (1) and (2) are possible. (1) At least part of the thin-film coil is placed on a side of the second portion of the second shield layer in a direction parallel to surfaces of the second portion. (2) The thin-film magnetic head further comprises a base body having a concave potion. At least part of the first shield layer is placed in a portion other than the concave portion on the surface of the base body where the concave portion is formed. Part of the first portion of the second shield layer is placed in a portion other than the concave portion on the surface of the base body where the concave portion is formed. The remaining part of the first portion of the second shield layer is placed along the inner surface of the concave portion. At least part of the thin-film coil is placed in the concave portion.

A second or third thin-film magnetic head of the invention comprises: a magnetoresistive element; a first shield layer and a second shield layer for shielding the magnetoresistive element, wherein portions of the first shield layer and the second shield layer facing a recording medium are opposed to each other with the magnetoresistive element in between; a first insulating layer provided between the magnetoresistive element and the first shield layer and a second insulating layer provided between the magnetoresistive element and the second shield layer; and a conductive layer connected to the magnetoresistive element. The first shield layer and at least part of the conductive layer are made of one material, placed in one plane and insulated from each other.

The second thin-film magnetic head of the invention further comprises a shield layer for shielding the at least part of the conductive layer.

The third thin-film magnetic head of the invention further comprises a seed layer electrically connected to the at least part of the conductive layer, formed in a region greater than a region where the at least part of the conductive layer is formed, and used for forming the at least part of the conductive layer.

In the second or third thin-film magnetic head of the invention, the first shield layer and at least part of the conductive layer are made of one material, placed in one plane and insulated from each other. As a result, the insulation property is improved between the conductive layer and the shield layer without increasing the thickness of the insulating layer between the magnetoresistive element and the shield layer.

The third thin-film magnetic head of the invention may further comprise a shield layer for shielding the at least part of the conductive layer.

A first method of the invention is provided for manufacturing a thin-film magnetic head comprising: a magnetoresistive element; a first shield layer and a second shield layer for shielding the magnetoresistive element, wherein portions of the first shield layer and the second shield layer facing a recording medium are opposed to each other with the magnetoresistive element in between; a first insulating layer provided between the magnetoresistive element and the first shield layer and a second insulating layer provided between the magnetoresistive element and the second shield layer; and a conductive layer connected to the magnetoresistive element.

The first method of manufacturing a thin-film magnetic head of the invention includes the steps of: forming the first shield layer; forming the first insulating film on the first shield layer; forming the magnetoresistive element on the first insulating layer; forming the second insulating layer on the magnetoresistive element and the first insulating layer; and forming the second shield layer so that the portion of the second shield layer facing the recording medium is opposed to the first shield layer with the first insulating layer, the magnetoresistive element and the second insulating layer in between. A groove in which at least part of the conductive layer is placed is formed in either the first shield layer or the second shield layer, or between the first and second shield layers in at least one of the step of forming the first shield layer and the step of forming the second shield layer. The method further includes the step of forming the conductive layer so that at least part of the conductive layer is placed in the groove, being insulated from the shield layer having the groove or the shield layers facing the groove.

In the first method of manufacturing a thin-film magnetic head of the invention, the at least part of the conductive layer connected to the magnetoresistive element is placed in the groove formed in either the first shield layer or the second shield layer, or between the first and second shield layers, being insulated from the shield layer having the groove or the shield layers facing the groove. As a result, the insulation property is improved between the conductive layer and the shield layer without increasing the thickness of the insulating layer between the magnetoresistive element and the shield layer.

In the first method, the groove may be formed in the first shield layer. In this case the following configurations (1) to (5) are possible. (1) The at least part of the conductive layer placed in the groove is formed at the same time as the first shield layer and made of the same material as the first shield layer in the step of forming the first shield layer and the step of forming the conductive layer. (2) The method further comprises the step of forming a seed layer electrically connected to the first shield layer, formed in a region greater than a region where the first shield layer is formed, and used for forming the first shield layer. (3) The first shield layer is divided into a portion facing the magnetoresistive element and a portion not facing the magnetoresistive element. (4) The first shield layer is formed by plating. (5) The at least part of the conductive layer is formed by plating.

As stated above, if the at least part of the conductive layer placed in the groove is formed at the same time as the first shield layer and made of the same material as the first shield layer in the step of forming the first shield layer and the step of forming the conductive layer, the first shield layer and the at least part of the conductive layer may be formed by plating or formed by depositing films through sputtering and selectively etching the films through dry etching.

The first method may further include the step of forming an insulating film placed in the groove. The insulating film insulates the at least part of the conductive layer from the shield layer having the groove or the shield layers facing the groove.

The first method may further include the step of forming an induction-type magnetic transducer having two magnetic layers magnetically coupled to each other and a thin-film coil placed between the two magnetic layers. Parts of sides of the two magnetic layers facing a recording medium include magnetic pole portions opposed to each other with a gap layer in between. The magnetic layers are each made up of at least one layer. In this case the following configurations (1) to (4) are possible. (1) One of the first and second shield layers functions as one of the two magnetic layers as well. (2) At least part of the groove is placed around a region facing the two magnetic layers and the thin-film coil of the induction-type magnetic transducer. (3) At least part of the groove is placed to pass through a region facing the two magnetic layers and the thin-film coil of the induction-type magnetic transducer. (4) The method further includes the step of forming a shield layer for shielding at least part of the conductive layer at the same time as forming the one of the magnetic layers of the induction-type magnetic transducer.

The first method may further include the step of forming a shield layer for shielding at least part of the conductive layer.

In the first method, for example, a first portion and a second portion of the second shield layer are formed in the step of forming the second shield layer, at least part of the first portion being placed in the same plane as the first shield layer so that the groove is formed between the first shield layer and the first portion, the second portion being connected to the first portion and being opposed to the first shield layer with the magnetoresistive element in between. In this case the following configurations (1) to (4) are possible. (1) The first portion of the second shield layer is formed at the same time as the first shield layer and made of the same material as the first shield layer in the step of forming the first shield layer and the step of forming the second shield layer. (2) The method further includes the step of forming an induction-type magnetic transducer having two magnetic layers magnetically coupled to each other and a thin-film coil placed between the two magnetic layers. Parts of sides of the two magnetic layers facing a recording medium include magnetic pole portions opposed to each other with a gap layer in between. The magnetic layers are each made up of at least one layer. (3) The first shield layer and the first portion of the second shield layer placed in the one plane are formed by plating. (4) The at least part of the conductive layer is formed by plating.

If the method includes the step of forming the induction-type magnetic transducer as stated above, at least part of the thin-film coil may be placed on a side of the second portion of the second shield layer in a direction parallel to surfaces of the second portion.

If the method includes the step of forming the induction-type magnetic transducer as stated above, the at least part of the conductive layer and at least part of the thin-film coil may be formed by plating, for example, at the same time in the step of forming the conductive layer and the step of forming the induction-type magnetic transducer.

If the method includes the step of forming the induction-type magnetic transducer as stated above, the thin-film magnetic head may further comprise a base body having a concave portion. At least part of the first shield layer is placed in a portion other than the concave portion on the surface of the base body where the concave portion is formed. Part of the first portion of the second shield layer is placed in a portion other than the concave portion on the surface of the base body where the concave portion is formed. The remaining part of the first portion of the second shield layer is placed along the inner surface of the concave portion. At least part of the thin-film coil is placed in the concave portion. In this case the following configurations (1) and (2) are possible. (1) The step of forming the induction-type magnetic transducer includes the steps of: forming the at least part of the thin-film coil in the concave portion; forming an insulating portion to cover the at least part of the thin-film coil in the concave portion; and flattening the surfaces of the insulating portion, the first shield layer and the first portion of the second shield layer so that the surfaces are brought to one plane. (2) The step of forming the induction-type magnetic transducer includes the steps of: forming part of the thin-film coil in the concave portion; forming a first insulating portion to cover the part of the thin-film coil in the concave portion; flattening the surfaces of the first insulating portion, the first shield layer and the first portion of the second shield layer so that the surfaces are brought to one plane; forming the remaining part of the thin-film coil on the first insulating portion; forming a second insulating portion to cover the remaining part of the thin-film coil; and flattening the surfaces of the second insulating portion and the second portion of the second shield layer so that the surfaces are brought to one plane.

A second or third method of the invention is provided for manufacturing a thin-film magnetic head comprising: a magnetoresistive element; a first shield layer and a second shield layer for shielding the magnetoresistive element, wherein portions of the first shield layer and the second shield layer facing a recording medium are opposed to each other with the magnetoresistive element in between; a first insulating layer provided between the magnetoresistive element and the first shield layer and a second insulating layer provided between the magnetoresistive element and the second shield layer; and a conductive layer connected to the magnetoresistive element.

The second method of the invention includes the steps of: forming the first shield layer; forming the first insulating film on the first shield layer; forming the magnetoresistive element on the first insulating film; forming the second insulating film on the magnetoresistive element and the first insulating film; and forming the second shield layer so that the portion of the second shield layer facing the recording medium is opposed to the first shield layer with the first insulating layer, the magnetoresistive element and the second insulating layer in between. The first shield layer and at least part of the conductive layer are made of one material, placed in one plane and insulated from each other in the step of forming the first shield layer and the step of forming the conductive layer. The method further includes the step of forming a shield layer for shielding at least part of the conductive layer.

The third method of the invention includes the steps of: forming the first shield layer; forming the first insulating layer on the first shield layer; forming the magnetoresistive element on the first insulating layer; forming the second insulating layer on the magnetoresistive element and the first insulating layer; and forming the second shield layer so that the portion of the second shield layer facing the recording medium is opposed to the first shield layer with the first insulating layer, the magnetoresistive element and the second insulating layer in between. The first shield layer and at least part of the conductive layer are made of one material, placed in one plane and insulated from each other in the step of forming the first shield layer and the step of forming the conductive layer. The method further includes the step of forming a seed layer electrically connected to at least part of the conductive layer and used for forming the at least part of the conductive layer, the seed layer being formed in a region greater than a region where the at least part of the conductive layer is formed.

In the second or third method of the invention, the first shield layer and at least part of the conductive layer are made of one material, placed in one plane and insulated from each other. As a result, the insulation property is improved between the conductive layer and the shield layer without increasing the thickness of the insulating layer between the magnetoresistive element and the shield layer.

The third method may further include the step of forming a shield layer for shielding the at least part of the conductive layer.

A thin-film magnetic head material of the invention is used for manufacturing a thin-film magnetic head comprising: a magnetoresistive element; a first shield layer and a second shield layer for shielding the magnetoresistive element, wherein portions of the first shield layer and the second shield layer facing a recording medium are opposed to each other with the magnetoresistive element in between; a first insulating layer provided between the magnetoresistive element and the first shield layer and a second insulating layer provided between the magnetoresistive element and the second shield layer; a conductive layer connected to the magnetoresistive element; and an induction-type magnetic transducer. In the magnetic head the induction-type magnetic transducer has a first magnetic layer and a second magnetic layer magnetically coupled to each other and a thin-film coil placed between the two magnetic layers. Parts of sides of the two magnetic layers facing a recording medium include magnetic pole portions opposed to each other with a gap layer in between. The magnetic layers are each made up of at least one layer. The second shield layer includes a first portion at least part of which is placed in the same plane as the first shield layer and a second portion connected to the first portion, the second portion being opposed to the first shield layer with the magnetoresistive element in between. The second shield layer functions as the first magnetic layer as well.

The thin-film magnetic head material of the invention comprises: the first shield layer; the first portion of the second shield layer placed such that a groove in which at least part of the conductive layer is placed is formed between the first shield layer and the first portion; the at least part of the conductive layer placed in the groove, being insulated from the first shield layer and the first portion of the second shield layer; and at least part of the thin-film coil placed to face the first portion of the second shield layer.

In the thin-film magnetic head material of the invention, at least part of the conductive layer connected to the magnetoresistive element is placed in the groove formed between the first layer and the first portion of the second shield layer, being insulated from the first shield layer and the first portion. As a result, the insulation property is improved between the conductive layer and the shield layer without increasing the thickness of the insulating layer between the magnetoresistive element and the shield layer.

The thin-film magnetic head material of the invention may further comprise an insulating film placed in the groove. The insulating film insulates at least part of the conductive layer from the first shield layer and the first portion of the second shield layer.

The thin-film magnetic head material of the invention may further comprise a base body having a concave potion. At least part of the first shield layer is placed in a portion other than the concave portion on the surface of the base body where the concave portion is formed. Part of the first portion of the second shield layer is placed in a portion other than the concave portion on the surface of the base body where the concave portion is formed. The remaining part of the first portion of the second shield layer is placed along the inner surface of the concave portion. At least part of the thin-film coil is placed in the concave portion.

A method of the invention is provided for manufacturing a thin-film magnetic head material used for manufacturing a thin-film magnetic head comprising: a magnetoresistive element; a first shield layer and a second shield layer for shielding the magnetoresistive element, wherein portions of the first shield layer and the second shield layer facing a recording medium are opposed to each other with the magnetoresistive element in between; a first insulating layer provided between the magnetoresistive element and the first shield layer and a second insulating layer provided between the magnetoresistive element and the second shield layer; a conductive layer connected to the magnetoresistive element; and an induction-type magnetic transducer. In the magnetic head, the induction-type magnetic transducer has a first magnetic layer and a second magnetic layer magnetically coupled to each other and a thin-film coil placed between the two magnetic layers. Parts of sides of the two magnetic layers facing a recording medium include magnetic pole portions opposed to each other with a gap layer in between. The magnetic layers are each made up of at least one layer. The second shield layer includes a first portion at least part of which is placed in the same plane as the first shield layer and a second portion connected to the first portion, the second portion being opposed to the first shield layer with the magnetoresistive element in between. The second shield layer functions as the first magnetic layer as well.

The method of manufacturing a thin-film magnetic head material of the invention includes the steps of: forming the first shield layer; forming the first portion of the second shield layer such that a groove in which at least part of the conductive layer is placed is formed between the first shield layer and the first portion; forming the at least part of the conductive layer placed in the groove, being insulated from the first shield layer and the first portion of the second shield layer; and forming at least part of the thin-film coil on the first portion of the second shield layer.

In the method of manufacturing a thin-film magnetic head material of the invention, at least part of the conductive layer connected to the magnetoresistive element is placed in the groove formed between the first layer and the first portion of the second shield layer, being insulated from the first shield layer and the first portion. As a result, the insulation property is improved between the conductive layer and the shield layer without increasing the thickness of the insulating layer between the magnetoresistive element and the shield layer.

The method may further include the step of forming an insulating film placed in the groove, the insulating film insulating at least part of the conductive layer from the first shield layer and the first portion of the second shield layer.

In the method the first portion of the second shield layer may be formed at the same time as the first shield layer and made of the same material as the first shield layer in the step of forming the first shield layer and the step of forming the first portion of the second shield layer.

In the method the first shield layer and the first portion of the second shield layer may be formed by plating. At least part of the conductive layer may be formed by plating.

In the method the at least part of the conductive layer and the at least part of the thin-film coil may be formed by plating at the same time in the step of forming the at least part of the conductive layer and the step of forming the at least part of the thin-film coil.

In the method the thin-film magnetic head material may comprise a base body having a concave portion. At least part of the first shield layer is placed in a portion other than the concave portion on the surface of the base body where the concave portion is formed. Part of the first portion of the second shield layer is placed in a portion other than the concave portion on the surface of the base body where the concave portion is formed. The remaining part of the first portion of the second shield layer is placed along the inner surface of the concave portion. At least part of the thin-film coil is placed in the concave portion.

The method may further include the steps of: forming an insulating portion to cover the at least part of the thin-film coil in the concave portion; and flattening the surfaces of the insulating portion, the first shield layer and the first portion of the second shield layer so that the surfaces are brought to one plane.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 7A and FIG. 7B are cross sections for illustrating a step that follows FIG. 6A and FIG. 6B.

FIG. 8A and FIG. 8B are cross sections for illustrating a step that follows FIG. 7A and FIG. 7B.

FIG. 33 is a top view of the thin-film magnetic head of the seventh embodiment of the invention.

FIG. 50A and FIG. 50B are cross sections for illustrating a step that follows FIG. 49A and FIG. 49B.

FIG. 51A and FIG. 51B are cross sections of the thin-film magnetic head of the fourteenth embodiment of the invention.

FIG. 54 is a top view of a thin-film magnetic head of a fifteenth embodiment of the invention.

FIG. 72A and FIG. 72B are cross sections for illustrating a step that follows FIG. 71A and FIG. 71B.

FIG. 73A and FIG. 73B are cross sections for illustrating a step that follows FIG. 72A and FIG. 72B.

FIG. 74A and FIG. 74B are cross sections for illustrating a step that follows FIG. 73A and FIG. 73B.

FIG. 75A and FIG. 75B are cross sections for illustrating a step that follows FIG. 74A and FIG. 74B.

FIG. 76A and FIG. 76B are cross sections for illustrating a step that follows FIG. 75A and FIG. 75B.

FIG. 77A and FIG. 77B are cross sections for illustrating a step that follows FIG. 76A and FIG. 76B.

FIG. 91A and FIG. 91B are cross sections for illustrating a step in a method of manufacturing a thin-film magnetic head of a related art.

FIG. 92A and FIG. 92B are cross sections for illustrating a step that follows FIG. 91A and FIG. 91B.

FIG. 93A and FIG. 93B are cross sections for illustrating a step that follows FIG. 92A and FIG. 92B.

FIG. 94A and FIG. 94B are cross sections for illustrating a step that follows FIG. 93A and FIG. 93B.

FIG. 95A and FIG. 95B are cross sections for illustrating a step that follows FIG. 94A and FIG. 94B.

FIG. 96A and FIG. 96B are cross sections for illustrating a step that follows FIG. 95A and FIG. 95B.

DETAILED DESCRIPTION OF THE PREFERRED EMBODIMENTS

Figures 4A, 4B:
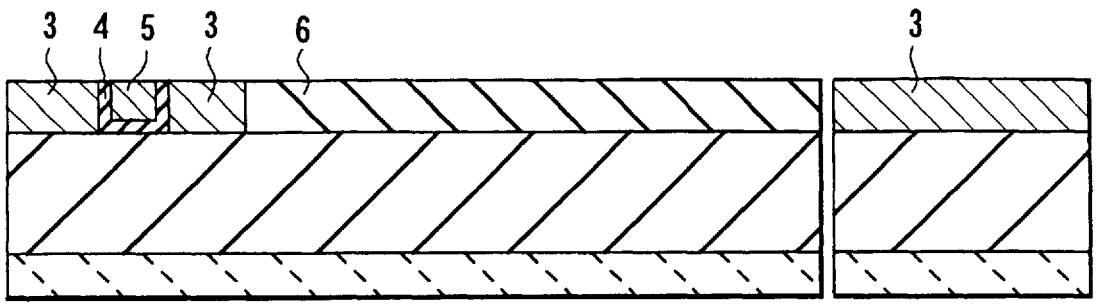
FIG. 4A and FIG. 4B are cross sections for illustrating a step that follows FIG. 3A and FIG. 3B.

Preferred embodiment of the invention will now be described in detail with reference to the accompanying drawings.

[First Embodiment]

Reference is now made to FIG. 1A to FIG. 10A, FIG. 1B to FIG. 10B, and FIG. 11 to FIG. 14 to describe a composite thin-film magnetic head and a method of manufacturing the same of a first embodiment of the invention. FIG. 1A to FIG. 10A are cross sections each orthogonal to the air bearing surface of the thin-film magnetic head. FIG. 1B to FIG. 10B are cross sections each parallel to the air bearing surface of the pole portion of the head.

In the method of the embodiment, as shown in FIG. 1A and FIG. 1B, an insulating layer 2 made of alumina ($Al_2O_3$), for example, of about 5 to 10 µm in thickness is deposited on a substrate 1 made of aluminum oxide and titanium carbide ($Al_2O_3$—TiC), for example.

Although not shown, a seed layer (electrode film) is made on the insulating layer 2 through sputtering Permalloy (NiFe). The seed layer is used for forming a bottom shield layer through plating.

Next, as shown in FIG. 2A and FIG. 2B, a magnetic material such as Permalloy (NiFe) of about 2 to 3 µm in thickness is selectively deposited on the seed layer by plating with a photoresist film as a mask to form a bottom shield layer 3 for a reproducing head. The bottom shield layer 3 corresponds to a first shield layer of the invention. Through the use of a photoresist film, the bottom shield layer 3 is formed to have a pair of grooves 3a in which at least part of a pair of conductive layers connected to the MR element is placed. Next, an insulating film 4 of alumina, for example, whose thickness is 500 nm or above is formed through sputtering, for example, on the bottom shield layer 3 including inside the grooves 3a.

Next, as shown in FIG. 3A and FIG. 3B, a pair of conductive layers 5 made of copper (Cu), for example, are formed inside the pair of grooves 3a of the bottom shield layer 3. The conductive layers 5 are to be leads connected to the MR element. The conductive layers 5 may be made by selectively depositing copper inside the grooves 3a to the thickness of about 2 to 3 µm through plating with a photoresist film as a mask. Alternatively, the conductive layers 5 may be formed through sputtering. Next, an insulating layer 6 of alumina, for example, whose thickness is 3 to 4 µm is formed all over the conductive layers 5 and the insulating film 4.

Next, as shown in FIG. 4A and FIG. 4B, the insulating layer 6 is polished to the surface of the bottom shield layer 3 and flattened. The polishing method may be mechanical polishing or chemical mechanical polishing (CMP). Through this flattening process, the surfaces of the bottom shield layer 3 and the conductive layer 5 are exposed. In the drawings that follow FIG. 4A and FIG. 4B, the insulating film 4 and the insulating layer 6 are shown as the one insulating layer 6.

As thus described, the conductive layers 5 are formed through plating to be precisely embedded in the grooves 3a of bottom shield layer 3 fully covered with the insulating film 4 whose thickness is 500 nm or above. As a result, an extremely high insulation property is obtained between the conductive layers 5 and the bottom shield layer 3. It is therefore possible to prevent magnetic and electrical insulation faults between the conductive layers 5 and the bottom shield layer 3 due to particles or pinholes in the layers.

Figures 5A, 5B:
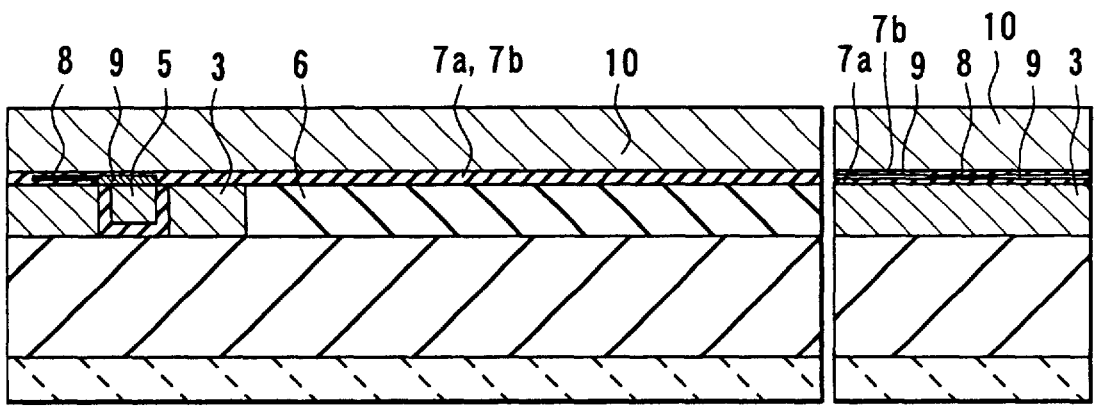
FIG. 5A and FIG. 5B are cross sections for illustrating a step that follows FIG. 4A and FIG. 4B.

Next, as shown in FIG. 5A and FIG. 5B, an insulating material such as aluminum nitride or alumina is sputtered to a thickness of about 50 to 100 nm over the bottom shield layer 3, the conductive layers 5 and the insulating layer 6. A bottom shield gap film 7a as an insulating layer is thus formed. Before forming the bottom shield gap film 7a, a photoresist pattern in a T-shape, for example, is formed to facilitate liftoff where contact holes are to be formed for electrically connecting the conductive layers 5 to other conductive layers described later. After the bottom shield gap film 7a is formed, the contact holes are formed through lifting off the photoresist patterns. Alternatively, the contact holes may be formed by selectively etching the bottom shield gap film 7a through the use of photolithography.

Next, an MR film of tens of nanometers in thickness for forming an MR element 8 for reproduction is deposited through sputtering on the bottom shield gap film 7a. A photoresist pattern (not shown) is then selectively formed where the MR element 8 is to be formed on the MR film. The photoresist pattern is T-shaped, for example, to facilitate liftoff. Next, the MR film is etched through argon-base ion milling with the photoresist pattern as a mask to form the MR element 8. The MR element 8 may be either a GMR element or an AMR element.

Next, on the bottom shield gap film 7a, a pair of conductive layers 9 of 80 to 150 nm in thickness are formed through sputtering with the same photoresist pattern as a mask. The conductive layers 9 are to be connected to the MR element 8. The conductive layers 9 may be formed through stacking TiW, CoPt, TiW, Ta, and Au, for example. The conductive layers 9 are electrically connected to the conductive layers 5 through the contact holes provided in the bottom shield gap film 7a. The conductive layers 9 and 5 make up the leads connected to the MR element 8.

Next, on the bottom shield gap film 7a, the MR element 8 and the conductive layers 9, an insulating material such as aluminum nitride or alumina is sputtered to a thickness of about 50 to 100 nm to form a top shield gap film 7b as an insulating layer. The MR element 8 is thus embedded in the shield gap films 7a and 7b.

Next, a top shield layer-cum-bottom pole layer (called top shield layer in the following description) 10 made of a magnetic material is formed on the top shield gap film 7b. The top shield layer 10 is used for both reproducing and recording heads. The top shield layer 10 may be made of NiFe or a high saturation flux density material such as FeN or a compound thereof or an amorphous of Fe—Co—Zr. The top shield layer 10 may be made of layers of NiFe and a high saturation flux density material.

Next, an alumina film or a silicon dioxide film of 4 to 6 μm in thickness is formed over the entire surface. The entire surface is then flattened so that the surface of the top shield layer 10 is exposed. The flattening may be performed through mechanical polishing or CMP. Such a flattening process prevents formation of a rise in the top shield layer 10 caused by the pattern of the MR element 8. The surface of the top shield layer 10 is thus made flat, and the recording gap layer of the magnetic pole of the recording head to be formed is made flat. As a result, the writing property in a high frequency range is improved.

Figures 6A, 6B:
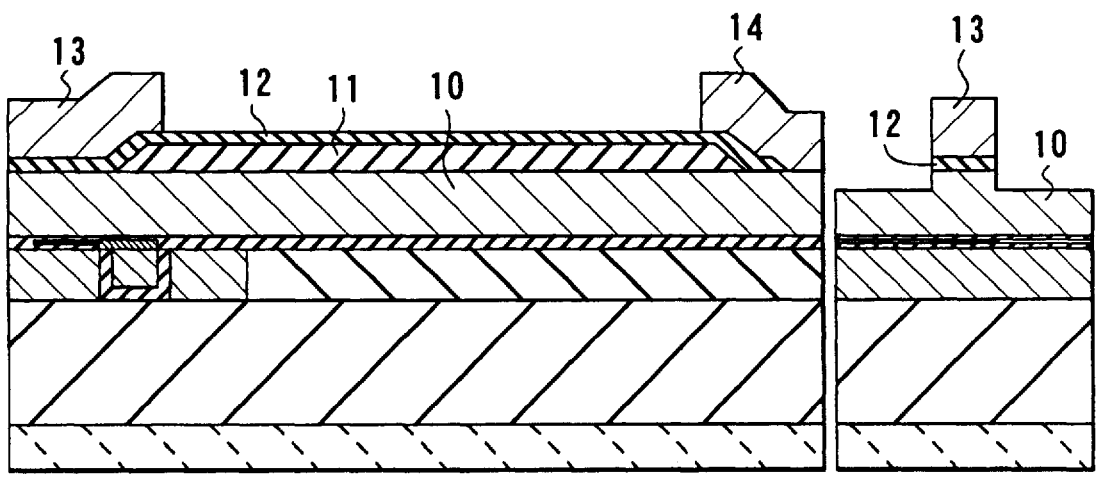
FIG. 6A and FIG. 6B are cross sections for illustrating a step that follows FIG. 5A and FIG. 5B.

Next, as shown in FIG. 6A and FIG. 6B, an insulating film of alumina or silicon dioxide of 1 to 2 μm in thickness is formed on the flattened top shield layer 10. The insulating film is then selectively etched through photolithography to form an insulating layer 11 that defines the throat height. A taper is formed in the edge on the pole portion side of the insulating layer 11. The tapered edge defines the throat height.

Next, a recording gap layer 12 made of an insulating film of alumina, for example, is formed on the top shield layer 10 and the insulating layer 11. A rearward portion of the recording gap layer 12 (the right side of FIG. 6A) is then selectively etched to form a magnetic path. Next, a top pole tip 13 and a magnetic layer 14 whose thickness is about 3 μm are formed on the recording gap layer 12. The top pole tip 13 determines the track width of the induction recording head. The magnetic layer 14 makes up a magnetic path. The top pole tip 13 and the magnetic layer 14 may be formed through plating with NiFe (50 weight % Ni and 50 weight % Fe), or through sputtering a high saturation flux density material such as FeN or a compound thereof and then patterning. Besides the above examples, the material of the top pole tip 12 may be NiFe (80 weight % Ni and 20 weight % Fe) or a high saturation flux density material such as an amorphous of Fe—Co—Zr. Alternatively, the top pole layer 13 may be layers of two or more of the above materials. The top pole layer 13 made of a high saturation flux density material allows the magnetic flux generated by the coil described later to effectively reach the pole portion without saturating before reaching the pole. A recording head that achieves high recording density is therefore obtained.

Next, part of the recording gap layer 12 on both sides of the top pole tip 13 is removed through dry etching. The exposed top shield layer 10 is then etched through ion milling by about 0.4 μm with the top pole tip 13 as a mask so as to form a trim structure.

Next, as shown in FIG. 7A and FIG. 7B, on the recording gap layer 12 in the region where the insulating layer 11 is formed, a thin-film coil 15 of a first layer for the recording head is formed through plating, for example, whose thickness is 2 to 3 μm.

Next, as shown in FIG. 8A and FIG. 8B, an insulating layer 16 made of photoresist is formed into a specific pattern on the insulating layer 11 and the coil 15. Next, a thin-film coil 17 of a second layer whose thickness is 2 to 3 μm is formed on the insulating layer 16. An insulating layer 18 made of photoresist is formed into a specific pattern on the insulating layer 16 and the coil 17. Next, the entire structure is cured at a temperature in the range between 200 to 250° C., such as about 200° C.

Figures 9A, 9B:
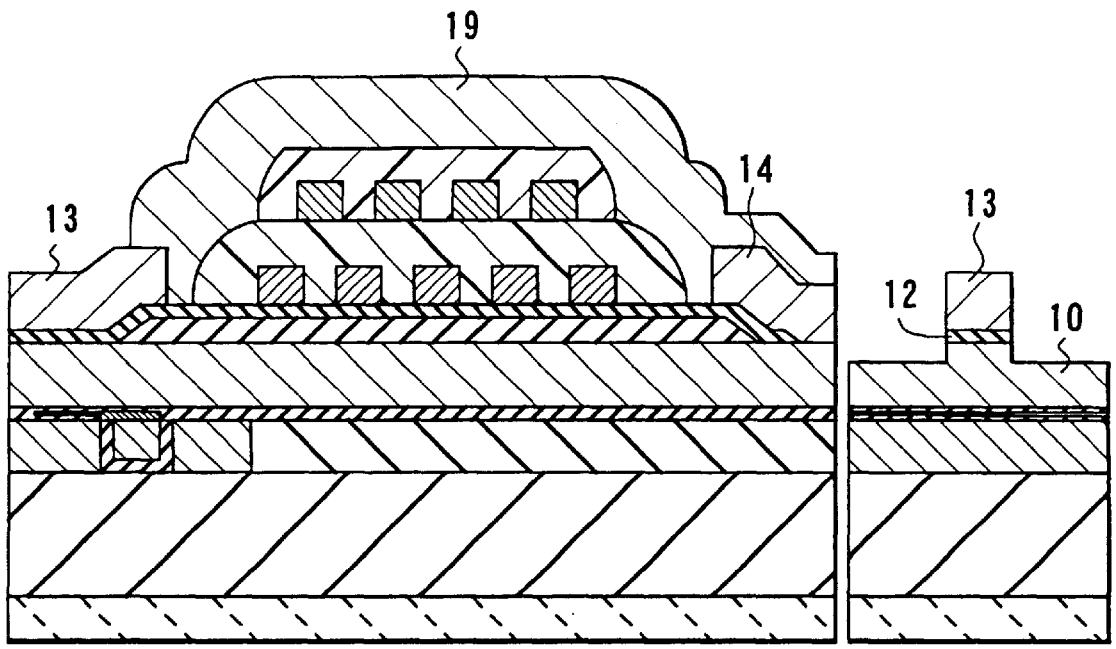
FIG. 9A and FIG. 9B are cross sections for illustrating a step that follows FIG. 8A and FIG. 8B.

Next, as shown in FIG. 9A and FIG. 9B, a top yoke layer 19 of about 3 to 4 μm in thickness is formed through plating to cover the magnetic layer 14, the insulating layers 16 and 18, and a rearward portion of the top pole tip 13.

The upper one of the magnetic layers of the recording head is thus divided into the top pole tip 13 and the top yoke layer 19. As a result, the microstructured top pole tip 13 is obtained and the recording head with the submicron track width is easily achieved. The top yoke layer 19 is brought to contact with the top pole tip 13 on the total of four surfaces including the top surface and the three lateral surfaces of the top pole tip 13. As a result, the magnetic flux passing through the top yoke layer 19 efficiently flows into the top pole tip 13 without saturating. The recording head that achieves high recording density is therefore obtained. The top pole layer is made up of the top pole tip 13, the top yoke layer 19 and the magnetic layer 14 in combination.

The trim structure is obtained by etching the top shield layer 10 with the microstructured top pole tip 13 as a mask. The trim structure suppresses an increase in the effective track width due to expansion of the magnetic flux generated during writing in a narrow track.

Figures 10A, 10B:
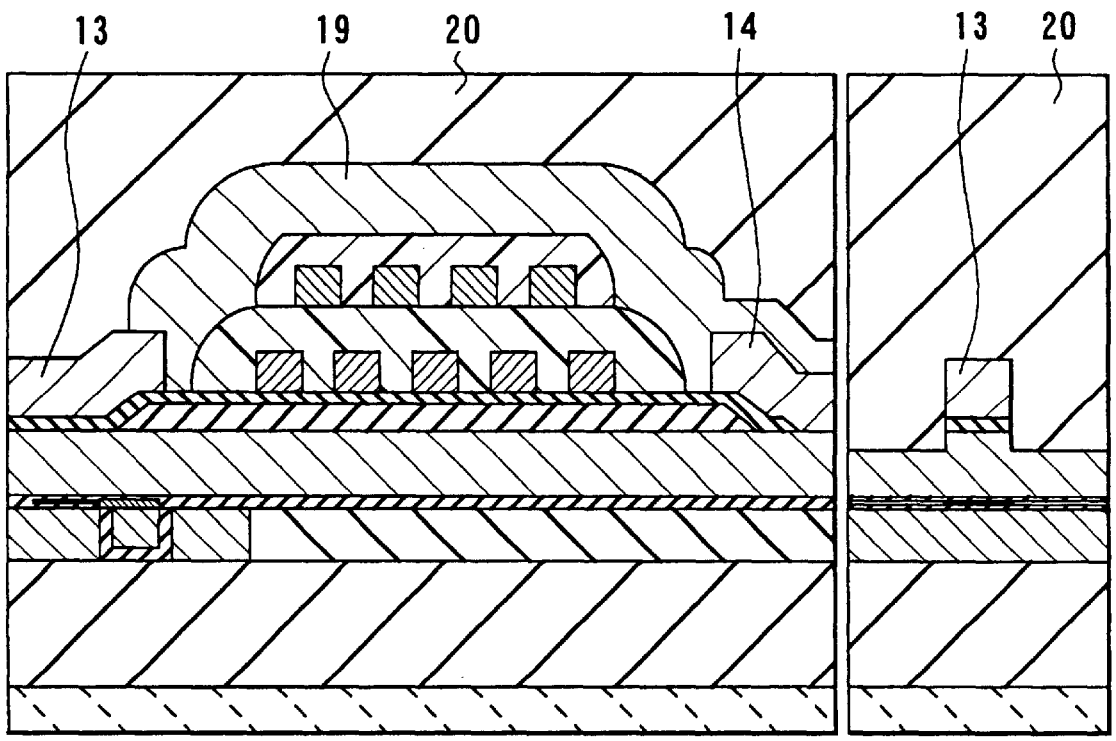
FIG. 10A and FIG. 10B are cross sections of the thin-film magnetic head of the first embodiment of the invention.

Next, as shown in FIG. 10A and FIG. 10B, an overcoat layer 20 of alumina, for example, is formed to cover the top yoke layer 19. Finally, machine processing of the slider is performed and the air bearing surface of the recording head and the reproducing head is formed. The thin-film magnetic head is thus completed.

The top shield layer (bottom pole layer) 10, the top pole tip 13, the magnetic layer 14, and the thin-film coils 15 and 17 correspond to an induction-type magnetic transducer of the invention. That is, the top shield layer (bottom pole layer) 10 corresponds to one of the two magnetic layers of the recording head of the invention. The top pole tip 13, the magnetic layer 14 and the top yoke layer 19 correspond to the other of the two magnetic layers. The top shield layer 10 corresponds to a second shield layer of the invention as well.

Figure 11:
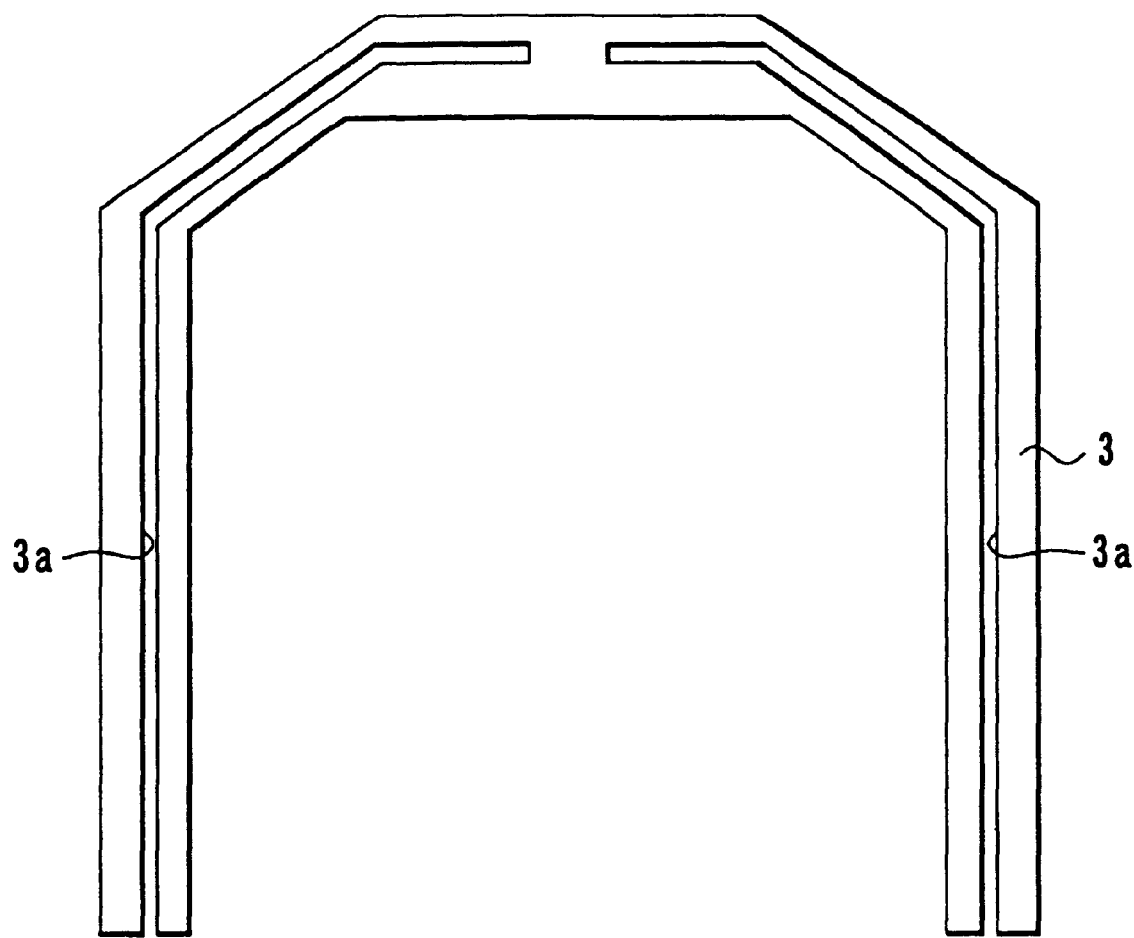
FIG. 11 is a top view of a bottom shield layer of the thin-film magnetic head of the first embodiment of the invention.
Figure 12:
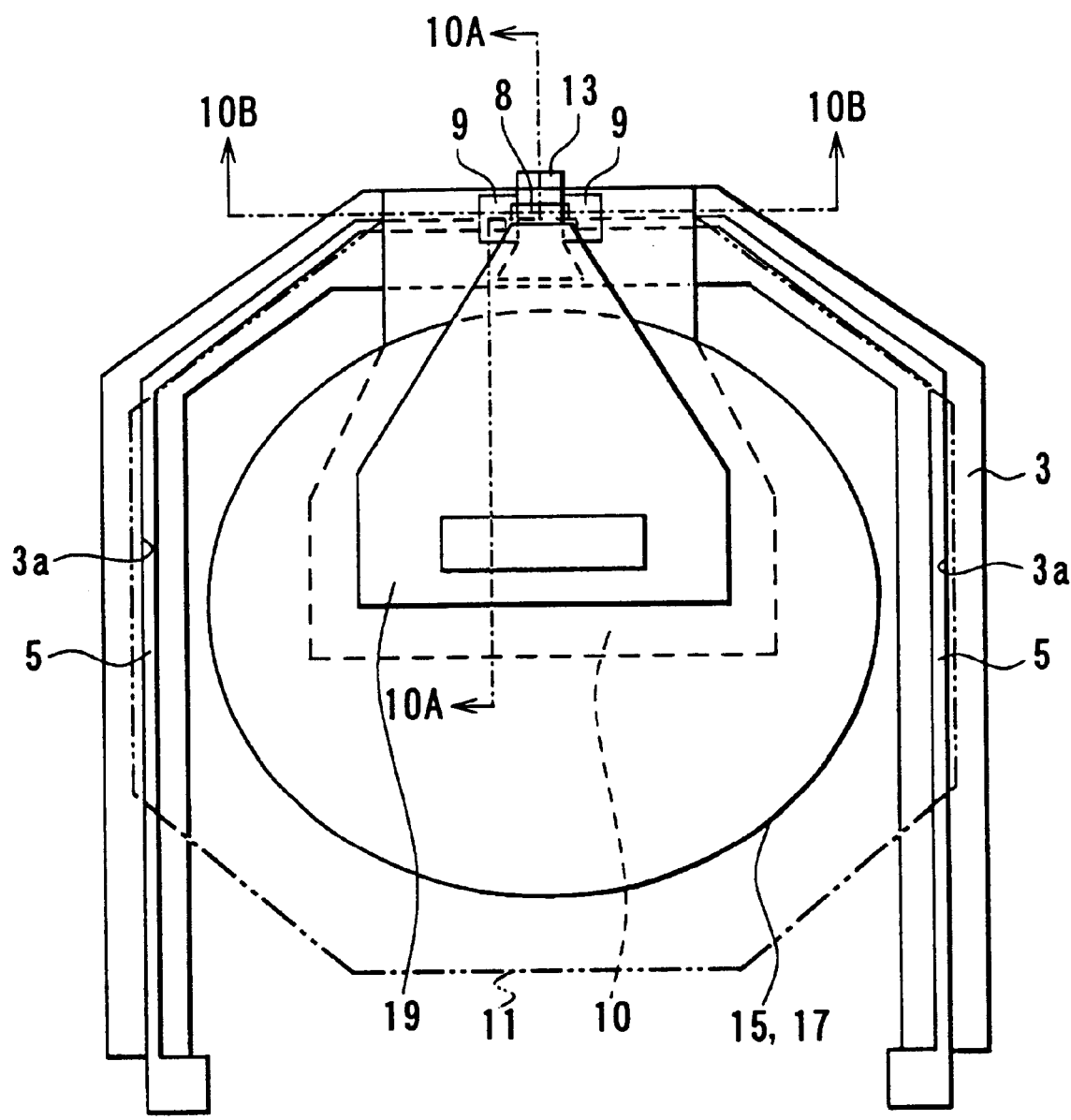
FIG. 12 is a top view of the thin-film magnetic head of the first embodiment of the invention.

FIG. 11 is a top view of the bottom shield layer 3. FIG. 12 is a top view of the thin-film magnetic head of the embodiment manufactured through the foregoing process. The overcoat layer 20 is omitted in FIG. 12. FIG. 12 shows the state before mechanical processing of the slider is performed. FIG. 1A to FIG. 10A are cross sections taken along line 10A—10A of FIG. 12. FIG. 1B to FIG. 10B are cross sections taken along line 10B—10B of FIG. 12. As shown in the drawings, the bottom shield layer 3 extends from the region facing the MR element 8 and its periphery to both sides of the MR element 8. Part of the bottom shield layer 3 passes through the region facing the top shield layer 10. Most of the remaining part is placed around the region facing the two magnetic layers of the induction-type magnetic transducer (the top shield layer 10, the top pole tip 13, the magnetic layer 14 and the top yoke layer 19) and the thin-film coils 15 and 17. The grooves 3a of the bottom shield layer 3 extend from the positions near both ends of the MR element 8 to both sides of the MR element 8. Part of the grooves 3a passes through the region facing the top shield layer 10. Most of the remaining part is placed around the region facing the two magnetic layers of the induction-type magnetic transducer and the thin-film coils 15 and 17. The conductive layers 5 making up the lead connected to the MR element 8 are embedded in the grooves 3a of the bottom shield layer 3, being insulated. Therefore, the conductive layers 5 extend from the positions near both ends of the MR element 8 to both sides of the MR element 8. Part of the conductive layers 5 pass through the region facing the top shield layer 10. Most of the remaining part is placed around the region facing the two magnetic layers of the induction-type magnetic transducer and the thin-film coils 15 and 17. The ends of the conductive layers 5 opposite to the MR element 8 are greater in width than the grooves 3a and placed outside the bottom shield layer 3.

Figure 13:
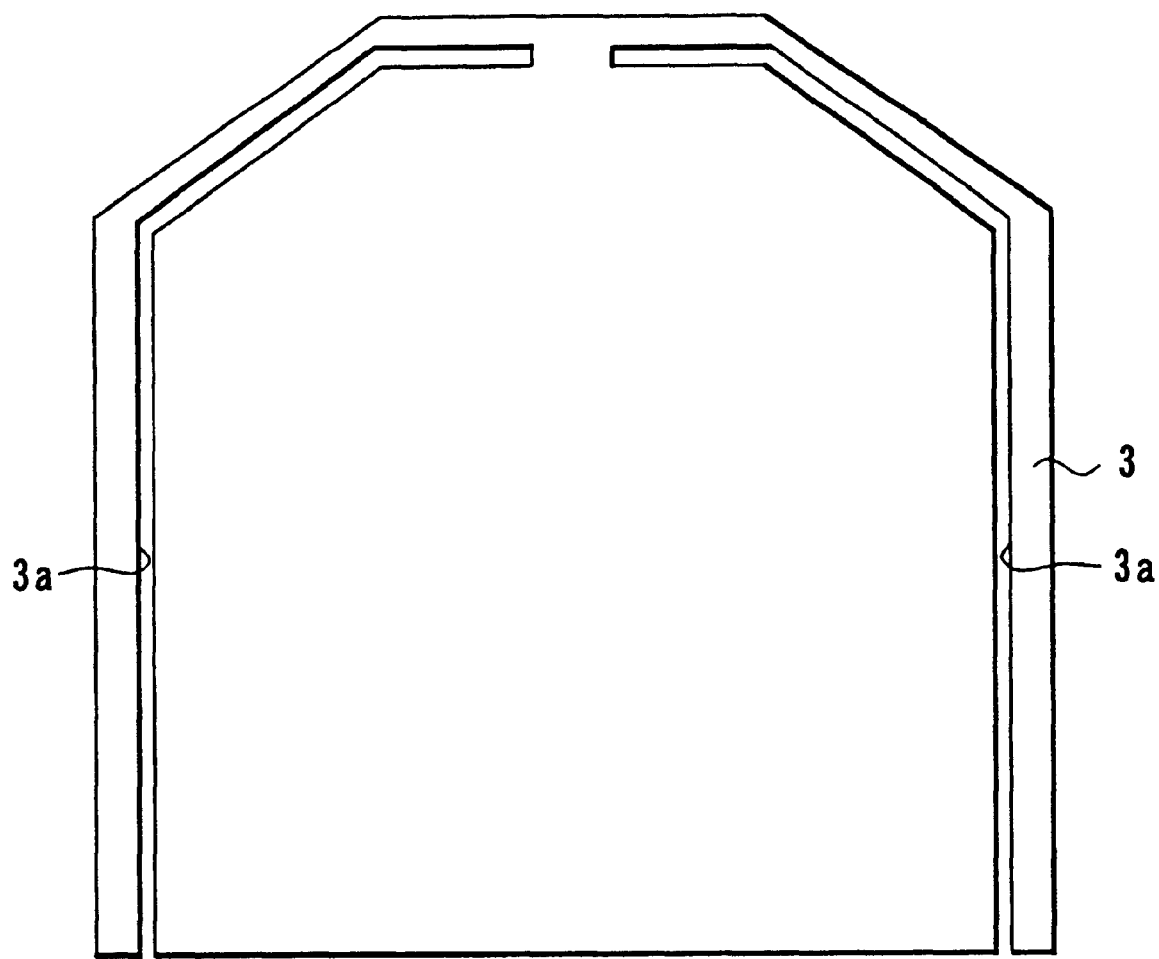
FIG. 13 is a top view of another example of the bottom shield layer of the thin-film magnetic head of the first embodiment of the invention.
Figure 14:
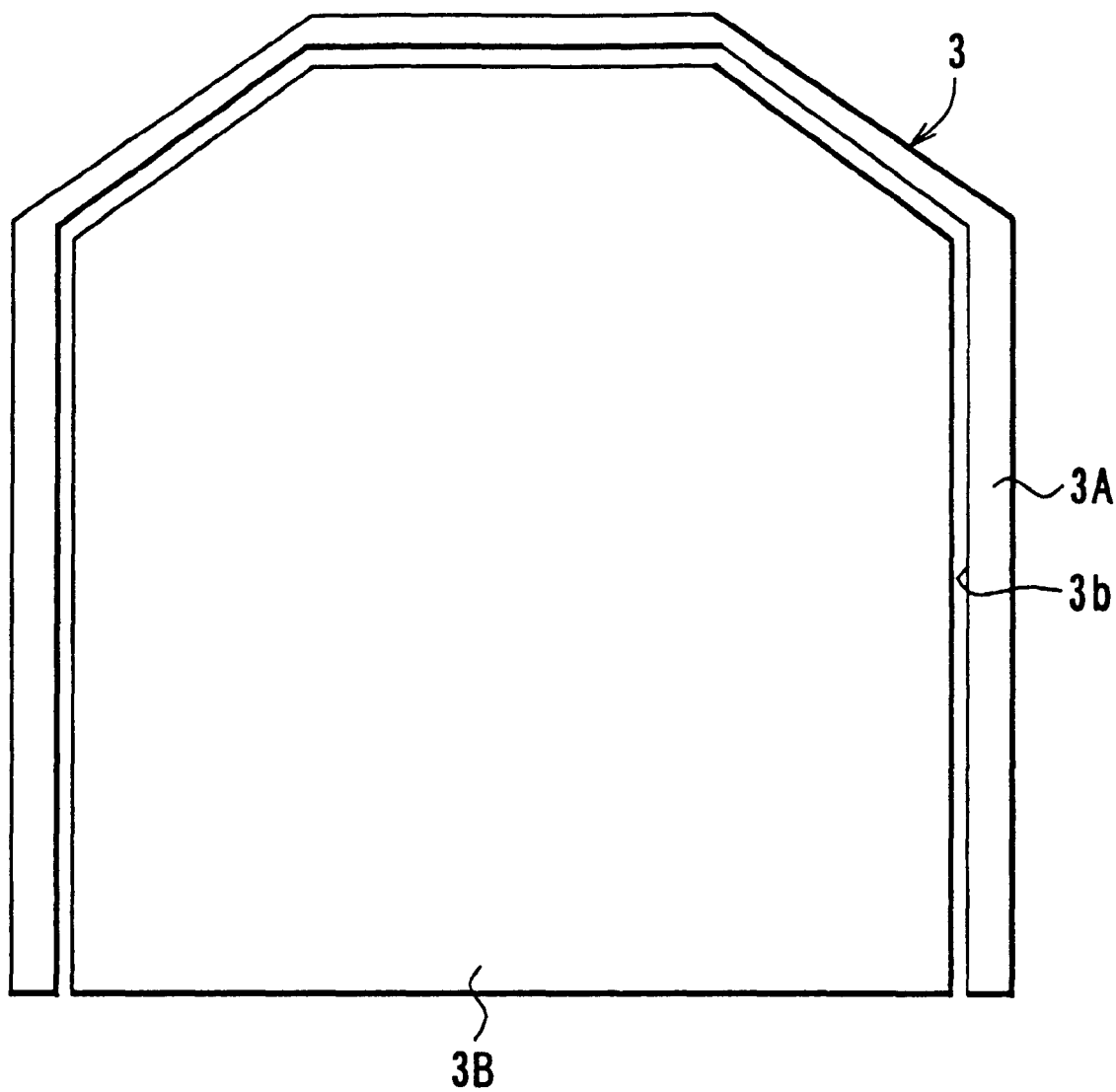
FIG. 14 is a top view of still another example of the bottom shield layer of the thin-film magnetic head of the first embodiment of the invention.

The shape of the bottom shield layer 3 is not limited to the one shown in FIG. 11. For example, as shown in FIG. 13, part of the bottom shield layer 3 inside the grooves 3a may be formed in the entire region facing the two magnetic layers of the magnetic transducer and the thin-film coils 15 and 17. Alternatively, as shown in FIG. 14, a single groove 3b may be formed in the bottom shield layer 3 shown in FIG. 13 in place of the pair of grooves 3a. The groove 3b takes the shape of the pair of grooves 3a coupled to each other. The groove 3b divides the bottom shield layer 3 into a portion 3A outside the groove 3b and a portion 3B inside the groove 3b.

In the embodiment, the bottom shield layer 3 has the grooves 3a. The most part of the conductive layers 5 making up the leads connected to the MR element 8 is placed in the grooves 3a, being insulated from the bottom shield layer 3 by the insulating film 4. As a result, according to the embodiment of the invention, an extremely high insulation property is achieved between the conductive layers 5 and the bottom shield layer 3. It is therefore possible to prevent magnetic and electrical insulation faults between the conductive layers 5 and the bottom shield layer 3.

Part of the conductive layers 5 faces the top shield layer 10 with the bottom shield gap film 7a and the top shield gap film 7b in between. However, the most part of the conductive layers 5 does not face the top shield layer 10. As a result, the insulation property is extremely high between the conductive layers 5 and the top shield layer 10. It is therefore possible to prevent magnetic and electrical insulation faults between the conductive layers 5 and the bottom shield layer 10.

According to the invention, the conductive layers 5 are not inserted between the bottom shield gap film 7a and the top shield gap film 7b. As a result, it is impossible that large areas of the conductive layers 5 face the bottom shield layer 3 and the top shield layer 10 with the bottom shield gap film 7a and the top shield gap film 7b in between. Therefore, although the bottom shield gap film 7a and the top shield gap film 7b are made thin, the insulation property is maintained at a high level between the conductive layers 5 and the bottom shield layer 3 and between the conductive layers 5 and the top shield layer 10.

According to the embodiment described so far, the insulation property is improved between the conductive layers connected to the MR element 8 and the bottom shield layer 3 and between the conductive layers and the top shield layer 10 without increasing the thickness of the bottom shield gap film 7a and the top shield gap film 7b.

According to the embodiment, the bottom shield gap film 7a and the top shield gap film 7b are made thin enough to improve the thermal asperity. The property of the reproducing head is thereby improved.

According to the embodiment, the conductive layer 5 is made thick enough so that the wiring resistance of the conductive layer connected to the MR element 8 is low. As a result, it is possible to detect with sensitivity a minute change in the output signal corresponding to a minute change in resistance of the MR element 8. The property of the reproducing head is improved in this respect, too.

In the embodiment, lateral surfaces of part of the conductive layers 5 placed in the grooves 3a of the bottom shield layer 3 are shielded, being placed in the middle of the bottom shield layer 3 along the direction of length. As a result, it is possible to reduce the effects of noises caused by internal factors such as magnetism and the like generated by the coil of the induction-type recording head or external factors such as the motor of the hard disk drive. In the neighborhood of the MR element 8, in particular, both sides of the conductive layers 5 are shielded by the bottom shield layer 3 and the top surfaces of the conductive layers 5 are shielded by the top shield layer 10. The effects of noises on the conductive layers 5 are thereby reduced. The property of the reproducing head is improved in this respect, too.

According to the embodiment, the thick insulating layer 11 is formed between the coils 15 and 17 and the top shield layer 10, in addition to the thin recording gap layer 12. As a result, a high insulation strength is achieved between the coils 15 and 17 and the top shield layer 10. Magnetic flux leakage from the coils 15 and 17 is reduced as well.

[Second Embodiment]

Figure 15:
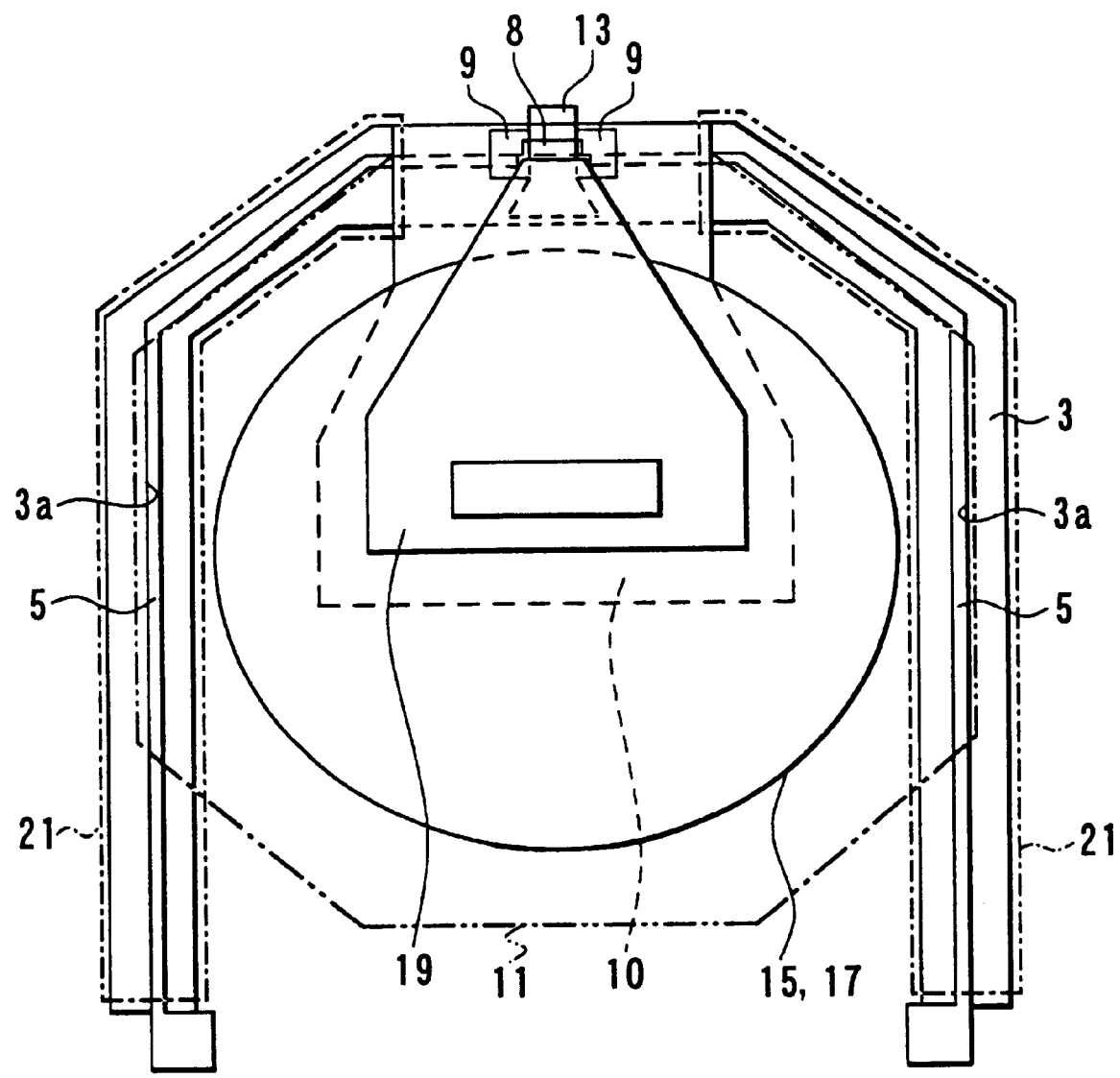
FIG. 15 is a top view of a thin-film magnetic head of a second embodiment of the invention.

Reference is now made to FIG. 15 to describe a second embodiment of the invention. FIG. 15 is a top view of a thin-film magnetic head of the embodiment. The overcoat layer 20 is omitted in FIG. 15. FIG. 15 shows the state before mechanical processing of the slider is performed.

The thin-film magnetic head of the embodiment includes shield layers 21 for the conductive layers. The shield layers 21 face the portions of the conductive layers 5 in the grooves 3a of the bottom shield layer 3 that are exposed from the grooves 3. The shield layers 21 cover at least portions of the conductive layers 5 in the grooves 3a that do not face the top shield layer 10. Where the insulating layer 11 is provided, the shield layers 21 are formed on the insulating layer 11. The shield layers 21 are formed on the top shield gap film 7b where the insulating layer 11 is not provided.

In the step of making the top yoke layer 19, the shield layers 21 may be formed at the same time through the use of the same magnetic material.

According to the embodiment, the shield layers 21 shield the top surfaces of the portions of the conductive layers 5 in the grooves 3a that do not face the top shield layer 10. As a result, the effects of noises on the conductive layers 5 are more greatly reduced, compared to the first embodiment.

The remainder of configuration, functions and effects of the embodiment are similar to those of the first embodiment.

[Third Embodiment]

Figures 16A, 16B:
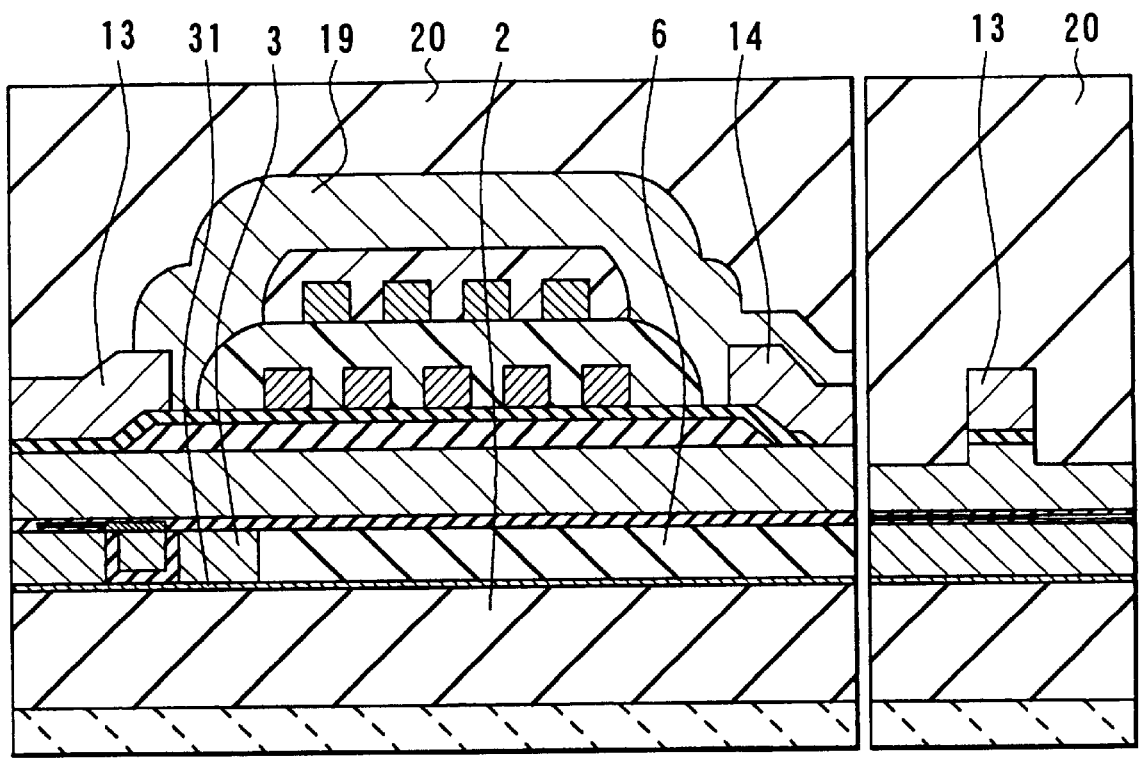
FIG. 16A and FIG. 16B are cross sections of a thin-film magnetic head of a third embodiment of the invention.

Reference is now made to FIG. 16A and FIG. 16B to describe a third embodiment of the invention. FIG. 16A is a cross section of a thin-film magnetic head of the embodiment orthogonal to the air bearing surface. FIG. 16B is a cross section of the pole portion of the thin-film magnetic head of the embodiment parallel to the air bearing surface. FIG. 16A shows the state before mechanical processing of the slider is performed.

The thin-film magnetic head of the embodiment comprises a seed layer 31 used for forming the bottom shield layer 3 and electrically connected to the bottom shield layer 3. The seed layer 31 is formed in a region larger than the region where the bottom shield layer 3 is formed. The seed layer 31 is formed in the almost entire region between the pair of conductive layers 5, for example.

The seed layer 31 is made of Permalloy (NiFe) through sputtering, for example, on the insulation layer 2 and has a thickness of 50 to 100 nm. The bottom shield layer 3 is selectively formed through plating on the seed layer 31 with a photoresist film as a mask.

According to the embodiment, the seed layer 31 is connected to the bottom shield layer 3. The seed layer 3 is formed in the region larger than the region where the bottom shield layer 3 is formed. The seed layer 31 thus functions as a shield together with the bottom shield layer 3. As a result, the shield region provided for the MR element 8 is larger than that of the first embodiment. The influence of noises from an external source is thereby more greatly reduced.

As in the second embodiment, the shield layers 21 facing the part of the conductive layers 5 in the grooves 3a of the bottom shield layer 3 that is exposed from the grooves 3a may be provided as well in this embodiment.

The remainder of configuration, functions and effects of the embodiment are similar to those of the first embodiment.

[Fourth Embodiment]

Figures 17A, 17B:
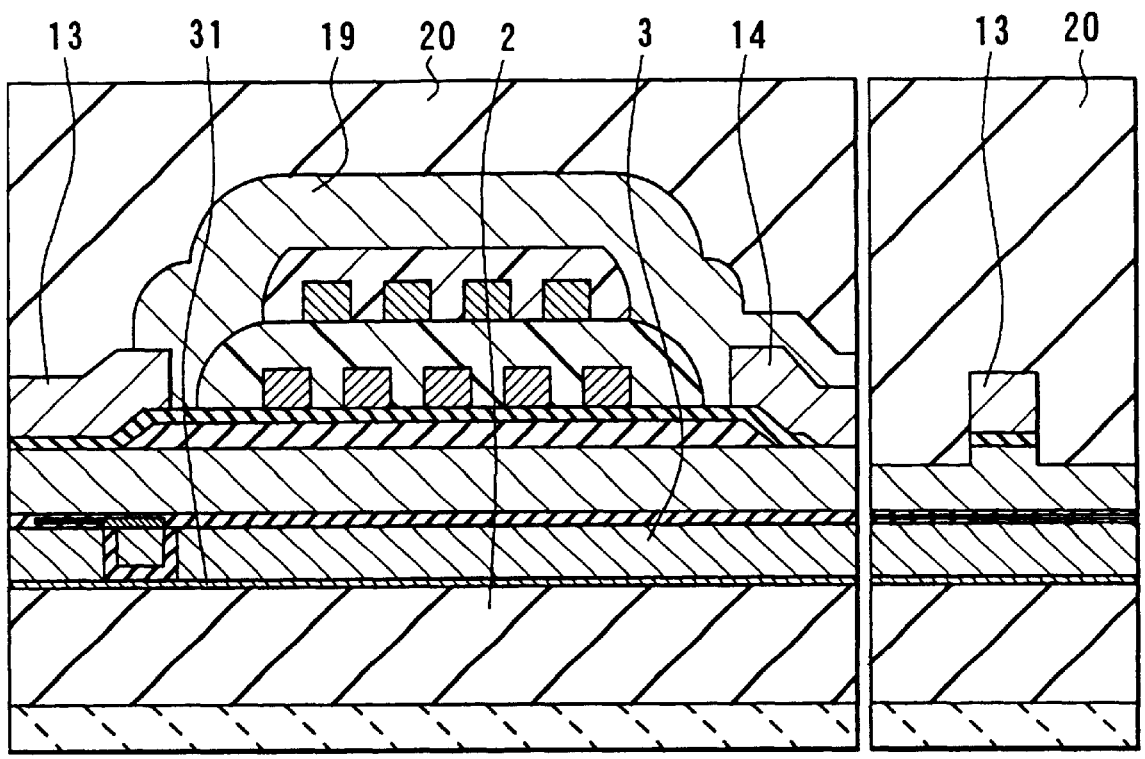
FIG. 17A and FIG. 17B are cross sections of a thin-film magnetic head of a fourth embodiment of the invention.

Reference is now made to FIG. 17A and FIG. 17B to describe a fourth embodiment of the invention. FIG. 17A is a cross section of a thin-film magnetic head of the embodiment orthogonal to the air bearing surface. FIG. 17B is a cross section of the pole portion of the thin-film magnetic head of the embodiment parallel to the air bearing surface. FIG. 17A shows the state before mechanical processing of the slider is performed.

In the thin-film magnetic head of the embodiment, the area in which the bottom shield layer 3 is formed is greater than that of the first embodiment. The bottom shield layer 3 of the fourth embodiment may be formed in the almost entire region between the pair of conductive layers 5, for example, in addition to the region where the bottom shield layer 3 of the first embodiment is formed. The bottom shield layer 3 is selectively formed on the seed layer 31 through plating with a photoresist film as a mask. In the embodiment the seed layer 31 is formed in the almost entire region between the pair of conductive layers 5 as in the third embodiment.

According to the embodiment, the area in which the bottom shield layer 3 is formed is greater than that of the first embodiment. The shield region for the MR element 8 is thereby made greater and the influence of noises from an external source is more greatly reduced.

The remainder of configuration, functions and effects of the embodiment are similar to those of the first embodiment.

[Fifth Embodiment]

Figure 18:
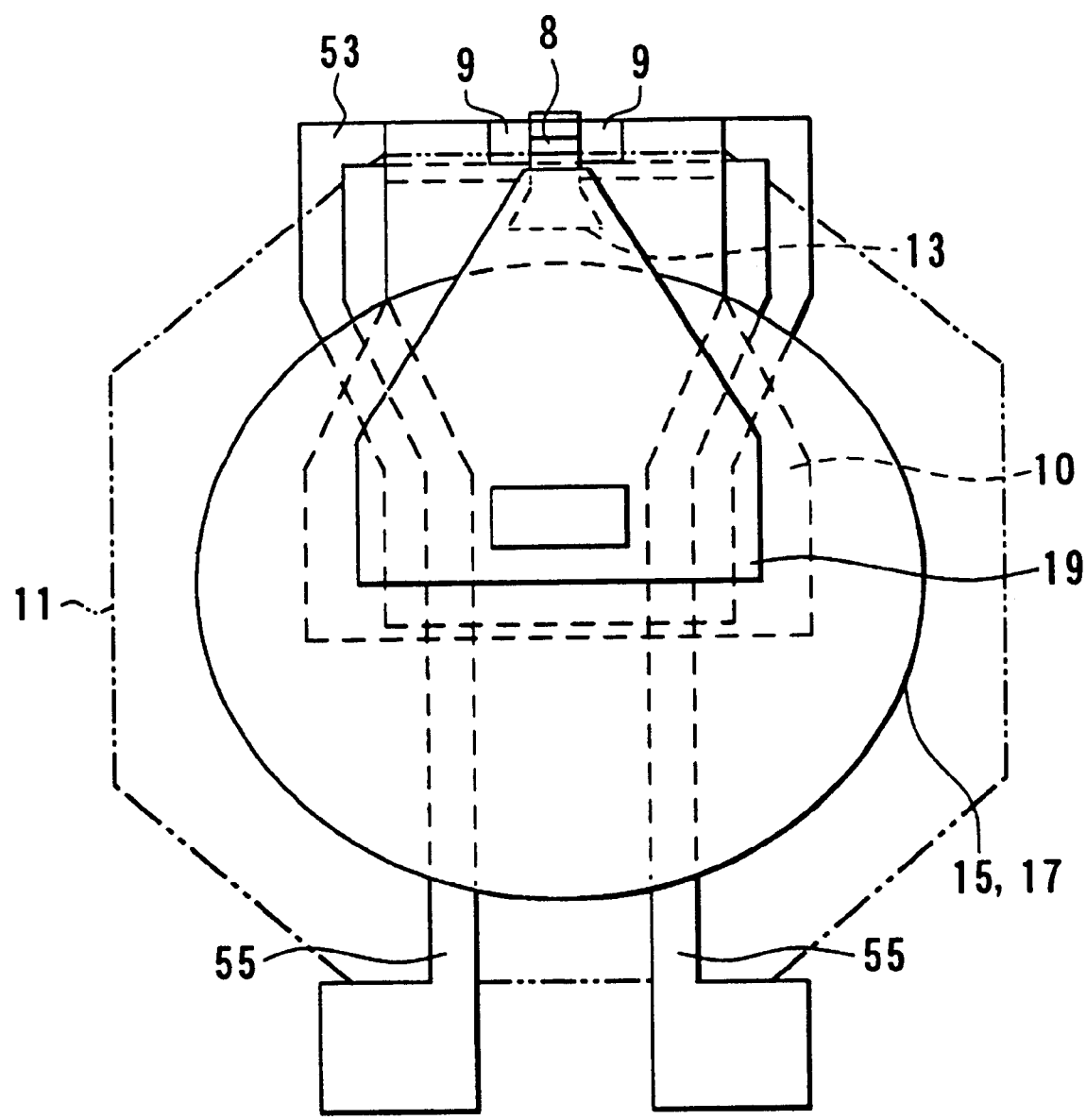
FIG. 18 is a top view of a thin-film magnetic head of a fifth embodiment of the invention.
Figure 19:
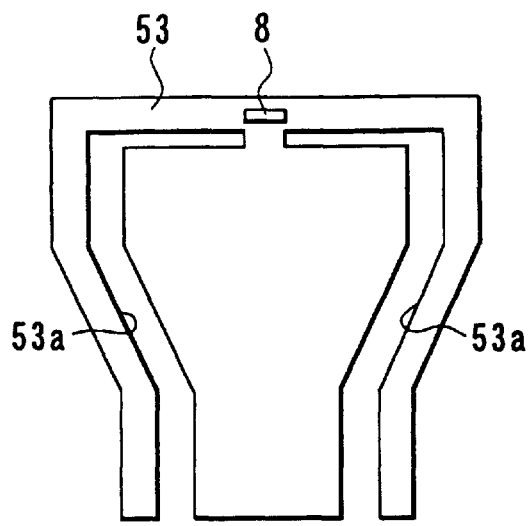
FIG. 19 is a top view of a bottom shield layer of the thin-film magnetic head of the fifth embodiment of the invention.
Figure 20:
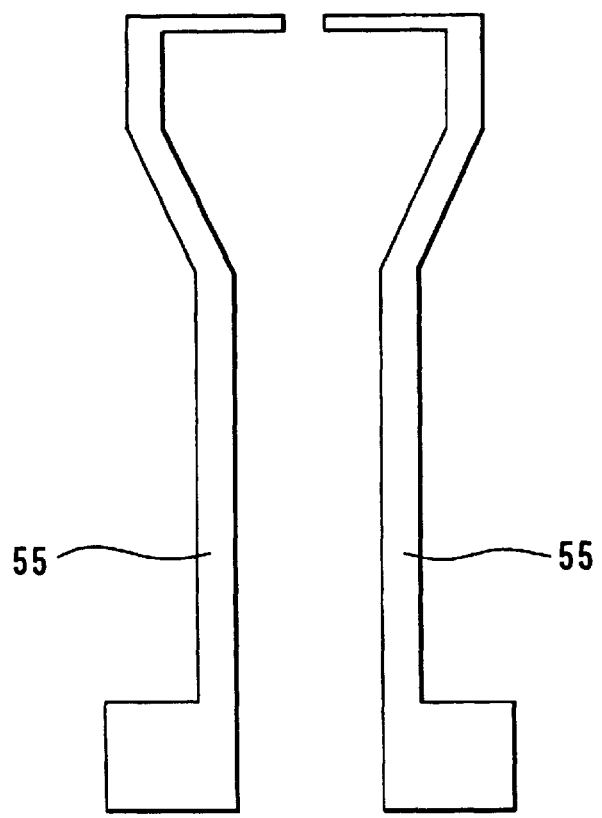
FIG. 20 is a top view of conductive layers of the fifth embodiment of the invention.

Reference is now made to FIG. 18 to FIG. 20 to describe a fifth embodiment of the invention. FIG. 18 is a top view of a thin-film magnetic head of the embodiment. The overcoat layer is omitted in FIG. 18. FIG. 18 shows the state before mechanical processing of the slider is performed. FIG. 19 is a top view of a bottom shield layer of the embodiment. FIG. 20 is a top view of conductive layers of the embodiment.

In the embodiment a bottom shield layer 53 is provided in place of the bottom shield layer 3 of the first embodiment. The bottom shield layer 53 extends from the region facing the MR element 8 and its periphery to the region facing the neighborhood of the center of the coils 15 and 17. In the embodiment a pair of conductive layers 55 are provided in place of the conductive layers 5 of the first embodiment. In the bottom shield layer 53 a pair of grooves 53a are formed in which portions of the conductive layers 5 are placed. The grooves 53a extend from the neighborhood of ends of the MR element 8 to sides of the MR element 8. The grooves 53a then extend along the neighborhood of the periphery of the bottom shield layer 53 and reach the end of the bottom shield layer 53 opposite to the pole portion. Therefore, in the embodiment the grooves 53a of the bottom shield layer 53 pass through the region facing the two magnetic layers and the thin-film coils 15 and 17 of the induction-type magnetic transducer.

Portions of the conductive layers 55 closer to the MR element 8 are placed in the grooves 53a of the bottom shield layer 53, being insulated. The remaining portions of the conductive layers 55 are placed outside the bottom shield layer 53 and extend from the end of the bottom shield layer 53 opposite to the pole portion to the region further away from the pole portion. The end of each of the conductive layers 55 is greater than each of the grooves 53a in width.

The remainder of configuration, functions and effects of the embodiment are similar to those of the first embodiment.

[Sixth Embodiment]

Figure 21:
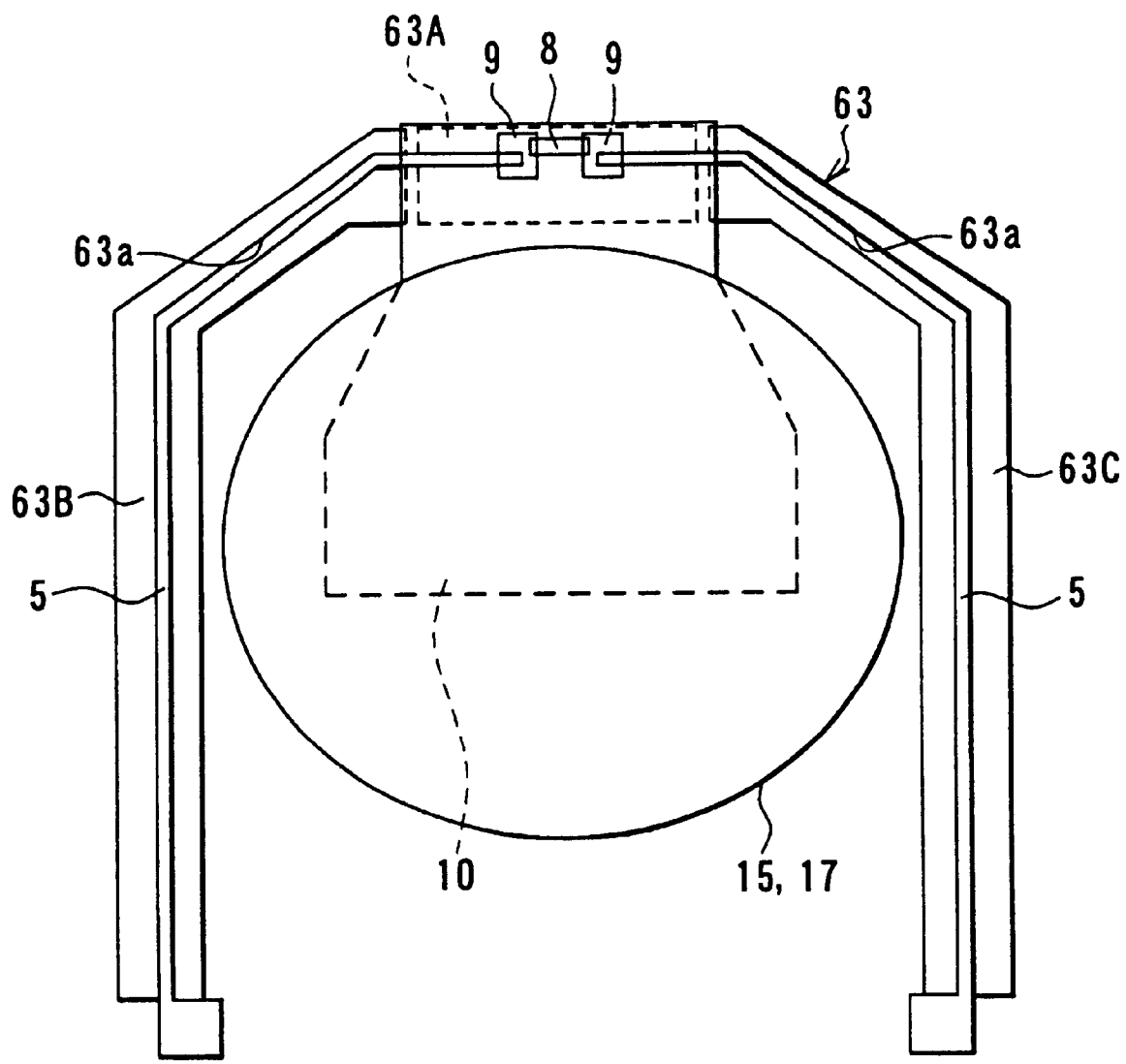
FIG. 21 is a top view of a bottom shield layer and conductive layers of a sixth embodiment of the invention.
Figure 22:
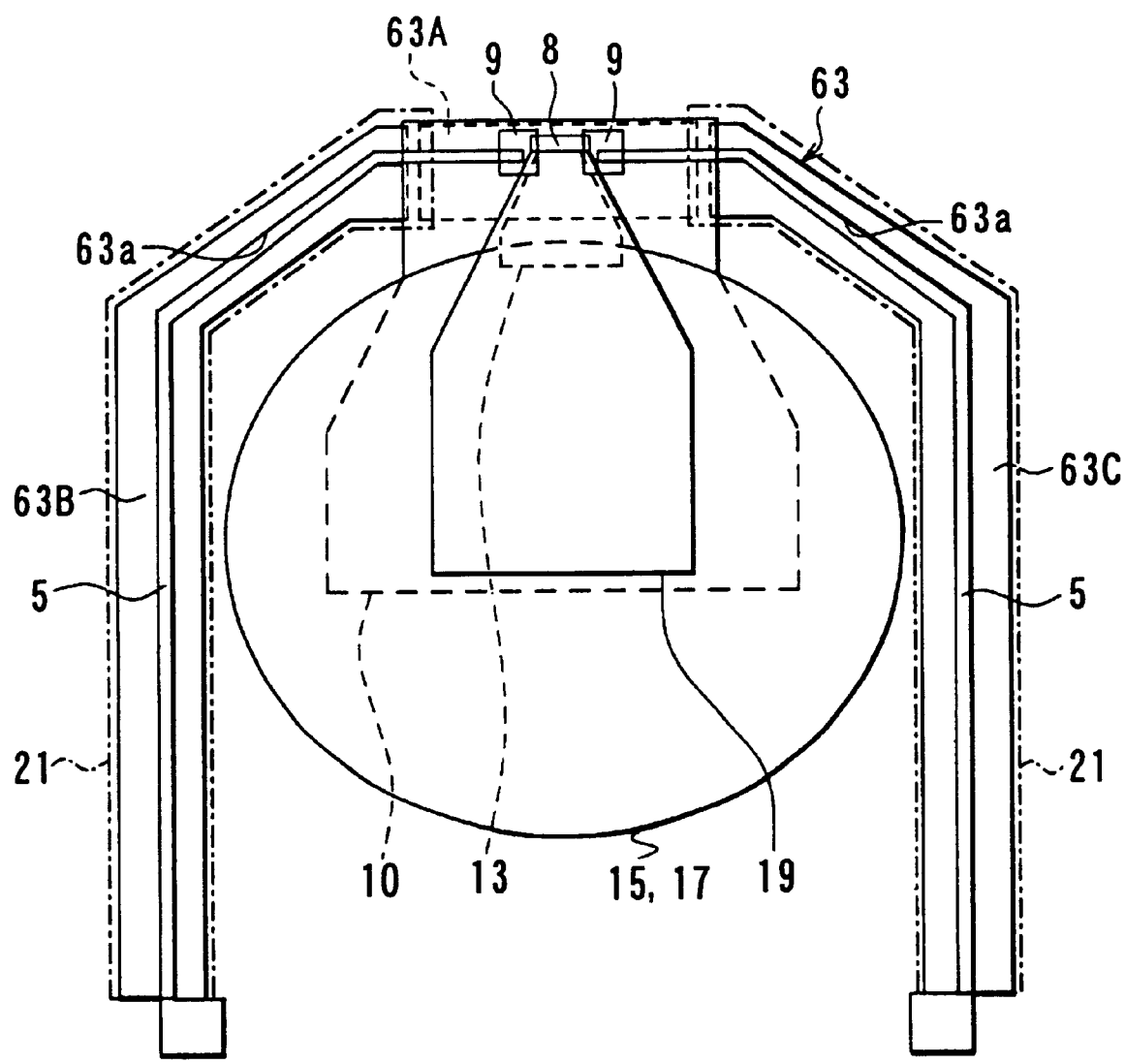
FIG. 22 is a top view of the main part of a thin-film magnetic head of the sixth embodiment of the invention.

Reference is now made to FIG. 21 and FIG. 22 to describe a sixth embodiment of the invention. FIG. 21 is a top view of a bottom shield layer and conductive layers of the embodiment. FIG. 22 is a top view of the main part of a thin-film magnetic head of the embodiment.

In the embodiment a bottom shield layer 63 is provided in place of the bottom shield layer 3 of the first embodiment. The bottom shield layer 63 is divided into a portion 63A facing the MR element 8 and portions 63B and 63C not facing the MR element 8. Specific gaps are provided each between the portion 63A and the portion 63B and between the portion 63A and the portion 63C. As the grooves 3a of the bottom shield layer 3 of the first embodiment, grooves 63a are formed in the bottom shield layer 63. Portions of the conductive layers 5 are placed in the grooves 63a. The portions 63B and 63C are each divided into two parts by the grooves 63a. Therefore the bottom shield layer 63 is actually divided into the five portions. Such a bottom shield layer 63 may be selectively formed through plating with a photoresist film as a mask on part of the seed layer selectively left through etching that corresponds to the bottom shield layer 63.

As in the second embodiment, the shield layers 21 are provided in this embodiment. The shield layers 21 face the portions of the conductive layers 5 in the grooves 63a of the bottom shield layer 63 that are exposed from the grooves 63a.

According to the embodiment, the bottom shield layer 63 is divided into the five portions. Therefore, the area of each portion is small and the shield property in a high frequency range is improved.

The remainder of configuration, functions and effects of the embodiment are similar to those of the second embodiment.

In the first to sixth embodiments one of the two shield layers facing each other with the MR element in between has the grooves in which at least part of the conductive layers connected to the MR element is placed. At least part of the conductive layers is placed in the grooves, being insulated form the shield layer. As a result, according to the embodiments, the insulation property is improved between the conductive layers and each shield layer. Furthermore, since the conductive layers are not placed between the shield layers with insulating layers in between, the insulation property is improved between each shield layer and the conductive layers connected to the MR element without increasing the thickness of the insulating layer between the MR element and each shield layer. According to the embodiments, it is possible to fabricate the conductive layers sufficiently thick. The wiring resistance of the conductive layers is thereby reduced. According to the embodiments, part of the conductive layers placed in the grooves is shielded, being held in the middle of one of the shield layers. The effects of noises on the conductive layers are thereby reduced.

If the shield layers for shielding at least part of the conductive layers are provided, the effects of noises on the conductive layers are further reduced.

The seed layer may be provided that is used for fabricating the one of the shield layers and formed in the region larger than the region where the one of the shield layers is formed. The seed layer is electrically connected to the one of the shield layers. The shield region for the MR element is thereby increased and the effects of noises from an external source are further reduced.

The one of the shield layers may be divided into the portion facing the MR element and the portions not facing the MR element. The shield property in a high frequency range is thereby improved.

[Seventh Embodiment]

Reference is now made to FIG. 23A to FIG. 31A, FIG. 23B to FIG. 31B, FIG. 32 and FIG. 33 to describe a composite thin-film magnetic head and a method of manufacturing the same of a seventh embodiment of the invention. FIG. 23A to FIG. 31A are cross sections each orthogonal to the air bearing surface of the thin-film magnetic head. FIG. 23B to FIG. 31B are cross sections each parallel to the air bearing surface of the pole portion of the head.

Figures 23A, 23B:
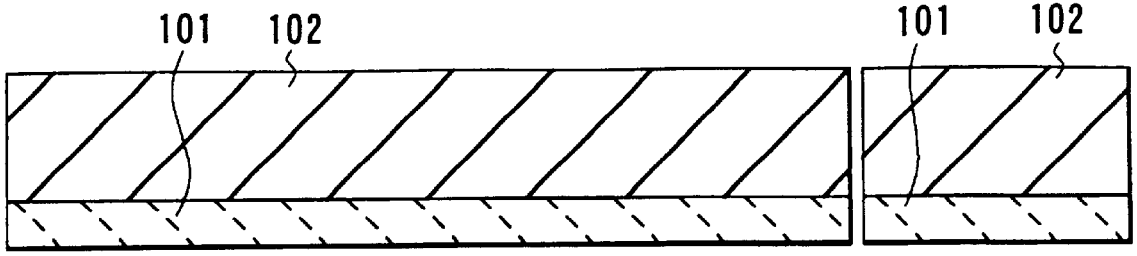
FIG. 23A and FIG. 23B are cross sections for illustrating a step in a method of manufacturing a thin-film magnetic head of a seventh embodiment of the invention.

In the method of the embodiment, as shown in FIG. 23A and FIG. 23B, an insulating layer 102 made of alumina ($Al_2O_3$), for example, of about 5 to 10 $\mu$m in thickness is deposited on a substrate 101 made of aluminum oxide and titanium carbide ($Al_2O_3$—TiC), for example.

Although not shown, a seed layer is made on the insulating layer 102 through sputtering Permalloy (NiFe). The seed layer is used for forming a bottom shield layer and a pair of conductive layers to be leads connected to an MR element through plating.

Figures 24A, 24B:
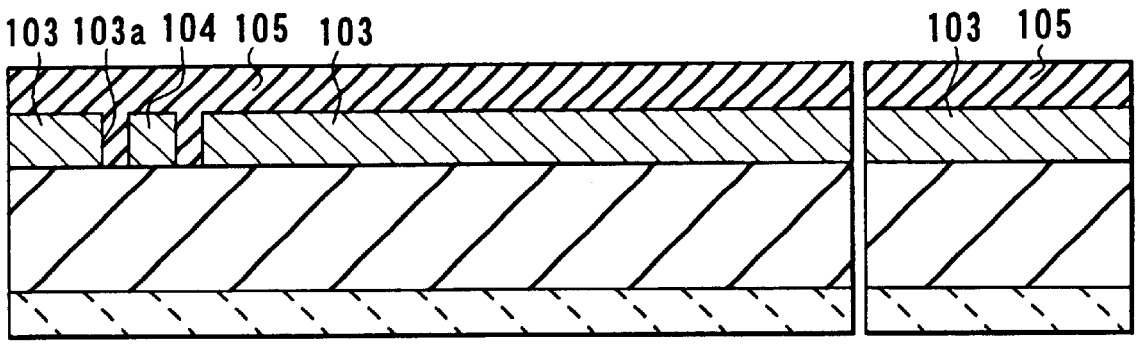
FIG. 24A and FIG. 24B are cross sections for illustrating a step that follows FIG. 23A and FIG. 23B.

Next, as shown in FIG. 24A and FIG. 24B, part of the seed layer is selectively etched through ion milling, for example, with a photoresist film as a mask. The part of the seed layer thereby removed is the region except the regions where the bottom shield layer and the conductive layers are to be formed. The region where the bottom shield layer is to be formed includes grooves in which the conductive layers are to be placed. The regions where the conductive layers are to be formed are located in the grooves. The regions where the conductive layers are to be formed are each 1 to 3 $\mu$m in width, for example. The space is 1 $\mu$m, for example, between the regions where the conductive layers are to be formed and the region where the bottom shield layer is to be formed.

Next, a magnetic material such as Permalloy (NiFe) of about 2 to 3 $\mu$m in thickness is selectively deposited on the seed layer by plating with a photoresist film as a mask to form the conductive layers 104 and the bottom shield layer 103 for a reproducing head. In such a manner the bottom shield layer 103 and the conductive layers 104 are made of the same material at the same time. The bottom shield layer 103 corresponds to the first shield layer of the invention. The bottom shield layer 103 thus formed has the grooves 103a in which the conductive layers 104 are placed. The conductive layer 104 is placed in the groove 103a with a specific space from the other conductive layer 104. The conductive layers 104 are each 1 to 3 $\mu$m in width, for example. The space is 1 $\mu$m, for example, between the conductive layer 104 and the bottom shield layer 103. The conductive layers 104 are electrically insulated from the bottom shield layer 103 since the seed layer between the conductive layers 104 and the bottom shield layer 103 has been removed.

Alternatively, the bottom shield layer 103 and the conductive layers 104 may be fabricated through forming layers by sputtering and selectively etching the layers by dry etching.

Next, an insulating film 105 of alumina, for example, whose thickness is 3 to 4 $\mu$m is formed in the gap between the bottom shield layer 103 and the conductive layers 104 and over the entire surface of the bottom shield layer 103 and the conductive layers 104.

Figures 25A, 25B:
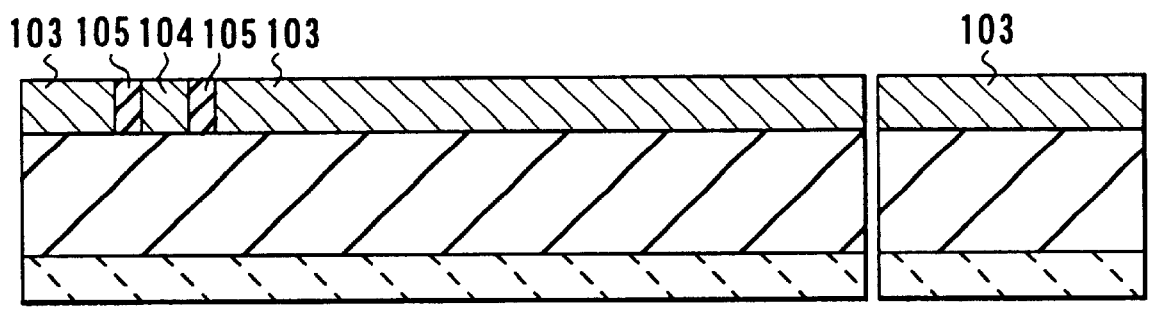
FIG. 25A and FIG. 25B are cross sections for illustrating a step that follows FIG. 24A and FIG. 24B.

Next, as shown in FIG. 25A and FIG. 25B, the insulating film 105 is polished to the surfaces of the bottom shield layer 103 and the conductive layers 104 and flattened. The polishing method may be mechanical polishing or CMP. Through this flattening process, the surfaces of the bottom shield layer 103 and the conductive layers 104 are exposed.

As thus described, the conductive layers 104 are formed in the grooves 103a of the bottom shield layer 103, being insulated from the bottom shield layer 103 by the insulating layer 105 of 1 μm in thickness, for example. As a result, an extremely high insulation property is obtained between the conductive layers 104 and the bottom shield layer 103. It is therefore possible to prevent magnetic and electrical insulation faults between the conductive layers 104 and the bottom shield layer 103 due to particles or pinholes in the layers.

Figures 26A, 26B:
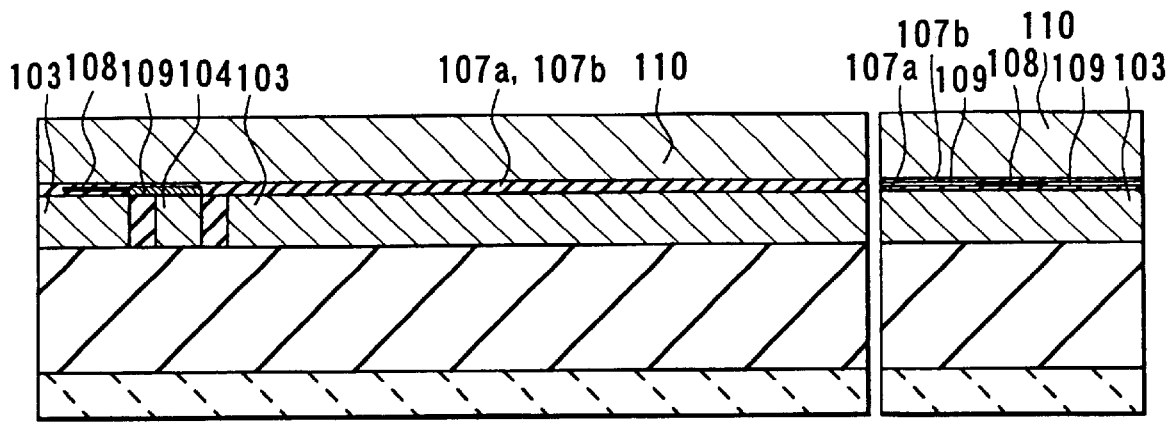
FIG. 26A and FIG. 26B are cross sections for illustrating a step that follows FIG. 25A and FIG. 25B.

Next, as shown in FIG. 26A and FIG. 26B, an insulating material such as aluminum nitride or alumina is sputtered to a thickness of about 50 to 100 nm over the bottom shield layer 103, the conductive layers 104 and the insulating film 105. A bottom shield gap film 107a as an insulating layer is thus formed. Before forming the bottom shield gap film 107a, a photoresist pattern in a T-shape, for example, is formed to facilitate liftoff where contact holes are to be formed for electrically connecting the conductive layers 104 to other conductive layers described later. After the bottom shield gap film 107a is formed, the contact holes are formed through lifting off the photoresist patterns. The contact holes may be formed by selectively etching the bottom shield gap film 107a through the use of photolithography.

Next, an MR film of tens of nanometers in thickness for forming an MR element 108 for reproduction is deposited through sputtering on the bottom shield gap film 107a. A photoresist pattern (not shown) is then selectively formed where the MR element 108 is to be formed on the MR film. The photoresist pattern may be T-shaped, for example, to facilitate liftoff. Next, the MR film is etched through argon-base ion milling with the photoresist pattern as a mask to form the MR element 108. The MR element 108 may be either a GMR element or an AMR element.

Next, on the bottom shield gap film 107a, a pair of conductive layers 109 of 80 to 150 nm in thickness are formed through sputtering with the same photoresist pattern as a mask. The conductive layers 109 are to be electrically connected to the MR element 108. The conductive layers 109 may be formed through stacking TiW, CoPt, TiW, Ta, and Au, for example. The conductive layers 109 are electrically connected to the conductive layers 104 through the contact holes provided in the bottom shield gap film 107a. The conductive layers 109 and 104 make up the leads connected to the MR element 108.

Next, on the bottom shield gap film 107a, the MR element 108 and the conductive layers 109, an insulating material such as aluminum nitride or alumina is sputtered to a thickness of about 50 to 100 nm to form a top shield gap film 107b as an insulating layer. The MR element 108 is thus embedded in the shield gap films 107a and 107b.

Next, a top shield layer-cum-bottom pole layer (called top shield layer in the following description) 110 made of a magnetic material is formed on the top shield gap film 107b. The top shield layer 110 is used for both reproducing and recording heads. The top shield layer 110 may be made of NiFe or a high saturation flux density material such as FeN or a compound thereof or an amorphous of Fe—Co—Zr. The top shield layer 110 may be made of layers of NiFe and a high saturation flux density material.

Next, an alumina film or a silicon dioxide film of 4 to 6 μm in thickness is formed over the entire surface. The entire surface is then flattened so that the surface of the top shield layer 110 is exposed. The flattening may be performed through mechanical polishing or CMP. Such a flattening process prevents formation of a rise in the top shield layer 110 caused by the pattern of the MR element 108. The surface of the top shield layer 110 is thus made flat, and a recording gap layer of the magnetic pole of the recording head to be formed is made flat. As a result, the writing property in a high frequency range is improved.

Figures 27A, 27B:
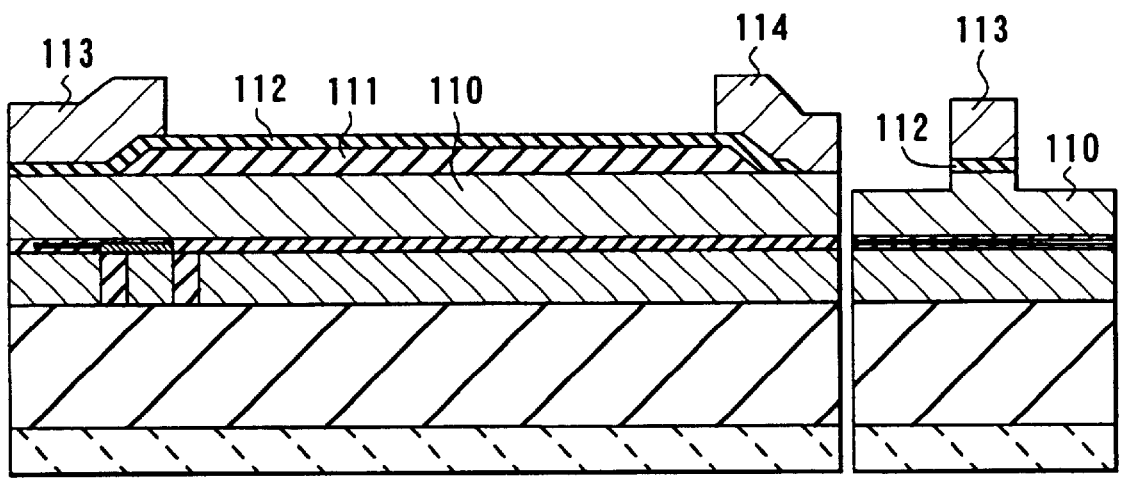
FIG. 27A and FIG. 27B are cross sections for illustrating a step that follows FIG. 26A and FIG. 26B.

Next, as shown in FIG. 27A and FIG. 27B, an insulating film of alumina or silicon dioxide of 1 to 2 μm in thickness is formed on the flattened top shield layer 110. The insulating film is then selectively etched through photolithography to form an insulating layer 111 that defines the throat height. A taper is formed in the edge on the pole portion side of the insulating layer 111. The tapered edge defines the throat height.

Next, a recording gap layer 112 made of an insulating film of alumina, for example, is formed on the top shield layer 110 and the insulating layer 111. The rearward (the right side of FIG. 27A) portion of the recording gap layer 112 is then selectively etched to form a magnetic path. Next, a top pole tip 113 and a magnetic layer 114 whose thickness is about 3 μm are formed on the recording gap layer 112. The top pole tip 113 determines the track width of the induction recording head. The magnetic layer 114 makes up a magnetic path. The top pole tip 113 and the magnetic layer 114 may be formed through plating with NiFe (50 weight % Ni and 50 weight % Fe), or through sputtering a high saturation flux density material such as FeN or a compound thereof and then patterning. Besides the above examples, the material of the top pole tip 112 may be NiFe (80 weight % Ni and 20 weight % Fe) or a high saturation flux density material such as an amorphous of Fe—Co—Zr. Alternatively, the top pole tip 113 may be layers of two or more of the above materials. The top pole tip 113 made of a high saturation flux density material allows the magnetic flux generated by the coil described later to effectively reach the pole portion without saturating before reaching the pole. The recording head that achieves high recording density is therefore obtained.

Next, part of the recording gap layer 112 on both sides of the top pole tip 113 is removed through dry etching. The exposed top shield layer 110 is then etched through ion milling by about 0.4 μm, for example, with the top pole tip 113 as a mask so as to form a trim structure.

Figures 28A, 28B:
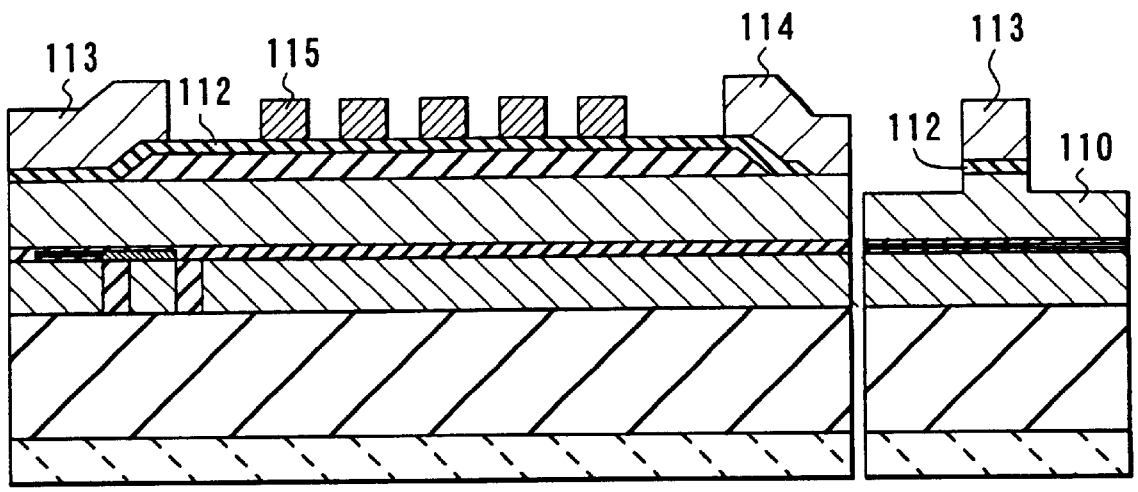
FIG. 28A and FIG. 28B are cross sections for illustrating a step that follows FIG. 27A and FIG. 27B.

Next, as shown in FIG. 28A and FIG. 28B, on the recording gap layer 112 in the region where the insulating layer 111 is formed, a thin film coil 115 of a first layer for the recording head is formed through plating, for example, whose thickness is 2 to 3 μm.

Figures 29A, 29B:
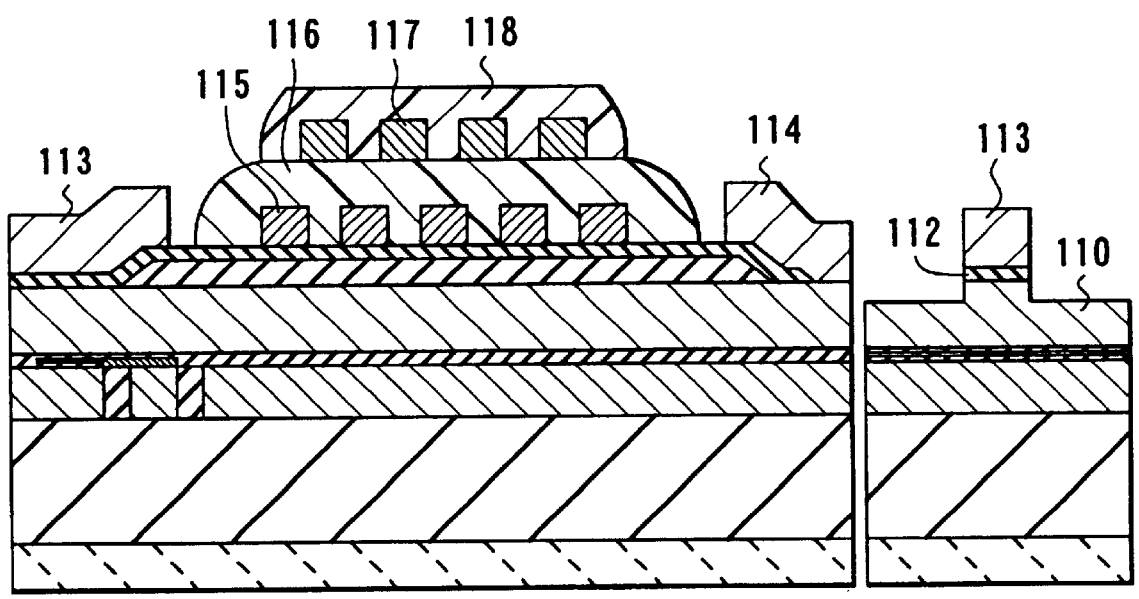
FIG. 29A and FIG. 29B are cross sections for illustrating a step that follows FIG. 28A and FIG. 28B.

Next, as shown in FIG. 29A and FIG. 29B, an insulating layer 116 made of photoresist is formed into a specific pattern on the insulating layer 111 and the coil 115. Next, a thin film coil 117 of a second layer whose thickness is 2 to 3 μm is formed on the insulating layer 116. An insulating layer 118 made of photoresist is then formed into a specific pattern on the insulating layer 118 and the coil 117. Next, the entire structure is cured at a temperature in the range between 200 to 250° C., such as about 200° C.

Figures 30A, 30B:
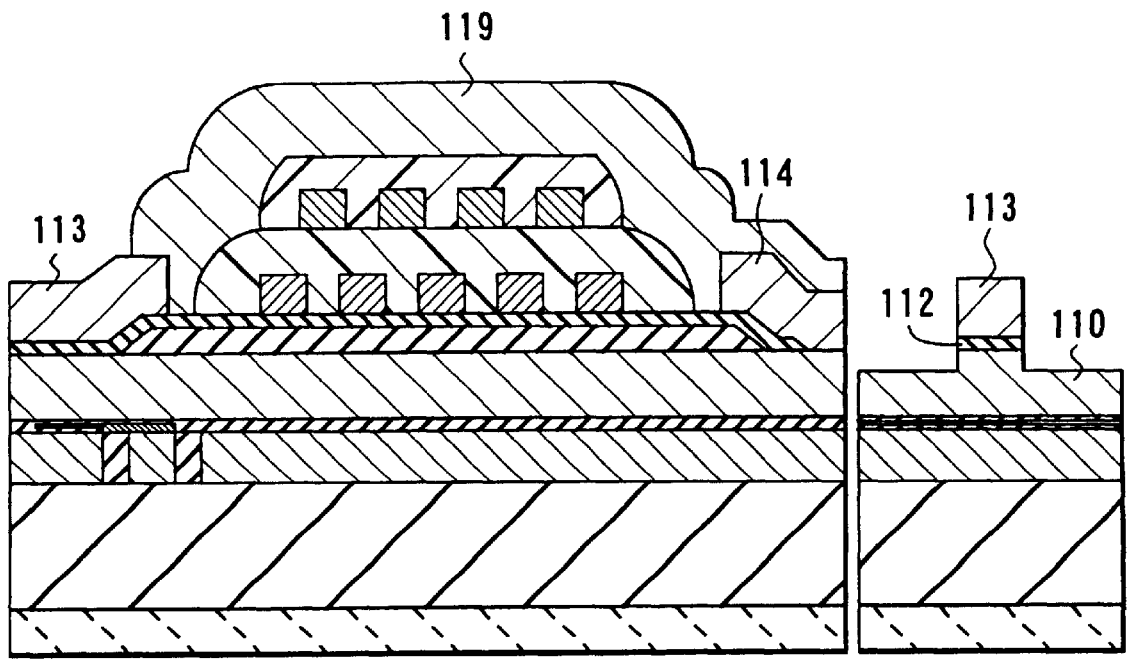
FIG. 30A and FIG. 30B are cross sections for illustrating a step that follows FIG. 29A and FIG. 29B.

Next, as shown in FIG. 30A and FIG. 30B, a top yoke layer 119 of about 3 to 4 μm in thickness is formed through plating to cover the magnetic layer 114, the insulating layers 116 and 118, and a rearward portion of the top pole tip 113.

The upper one of the magnetic layers of the recording head is thus divided into the top pole tip 113 and the top yoke layer 119. As a result, the microstructured top pole tip 113 is obtained and the recording head with the submicron track width is easily achieved. The top yoke layer 119 is brought to contact with the top pole tip 113 on the total of four surfaces including the top surface and the three lateral surfaces of the top pole tip 113. As a result, the magnetic flux passing through the top yoke layer 119 efficiently flows into the top pole tip 113 without saturation. The recording head that achieves high recording density is therefore obtained. The top pole layer is made up of the top pole tip 113, the top yoke layer 119 and the magnetic layer 114 in combination.

The trim structure is obtained by etching the top shield layer 110 with the microstructured top pole tip 113 as a mask. The trim structure suppresses an increase in the effective track width due to expansion of the magnetic flux generated during writing in the narrow track.

Figures 31A, 31B:
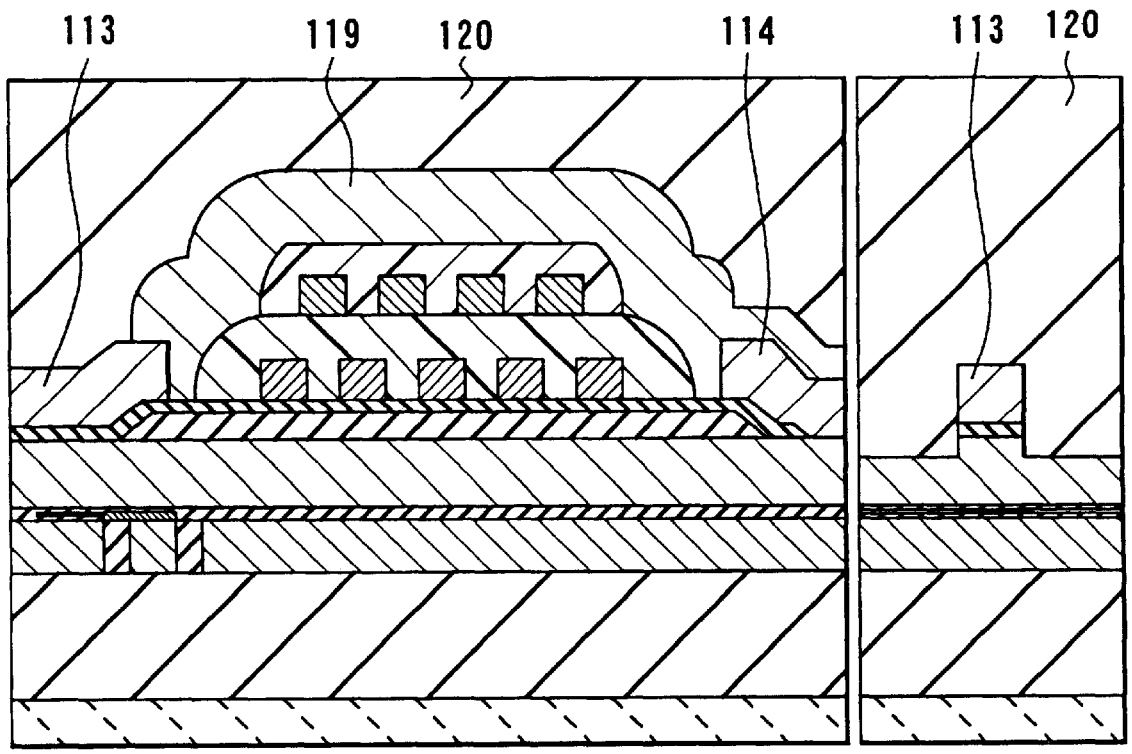
FIG. 31A and FIG. 31B are cross sections of the thin-film magnetic head of the seventh embodiment of the invention.

Next, as shown in FIG. 31A and FIG. 31B, an overcoat layer 120 of alumina, for example, is formed to cover the top yoke layer 119. Finally, machine processing of the slider is performed and the air bearing surface of the recording head and the reproducing head is formed. The thin-film magnetic head is thus completed.

The top shield layer (bottom pole layer) 110, the top pole tip 113, the magnetic layer 114, the top yoke layer 119 and the thin-film coils 115 and 117 correspond to the induction-type magnetic transducer of the invention. That is, the top shield layer (bottom pole layer) 110 corresponds to one of the two magnetic layers of the recording head of the invention. The top pole tip 113, the magnetic layers 114 and the top yoke layer 119 correspond to the other of the two magnetic layers. The top shield layer 110 corresponds to the second shield layer of the invention as well.

Figure 32:
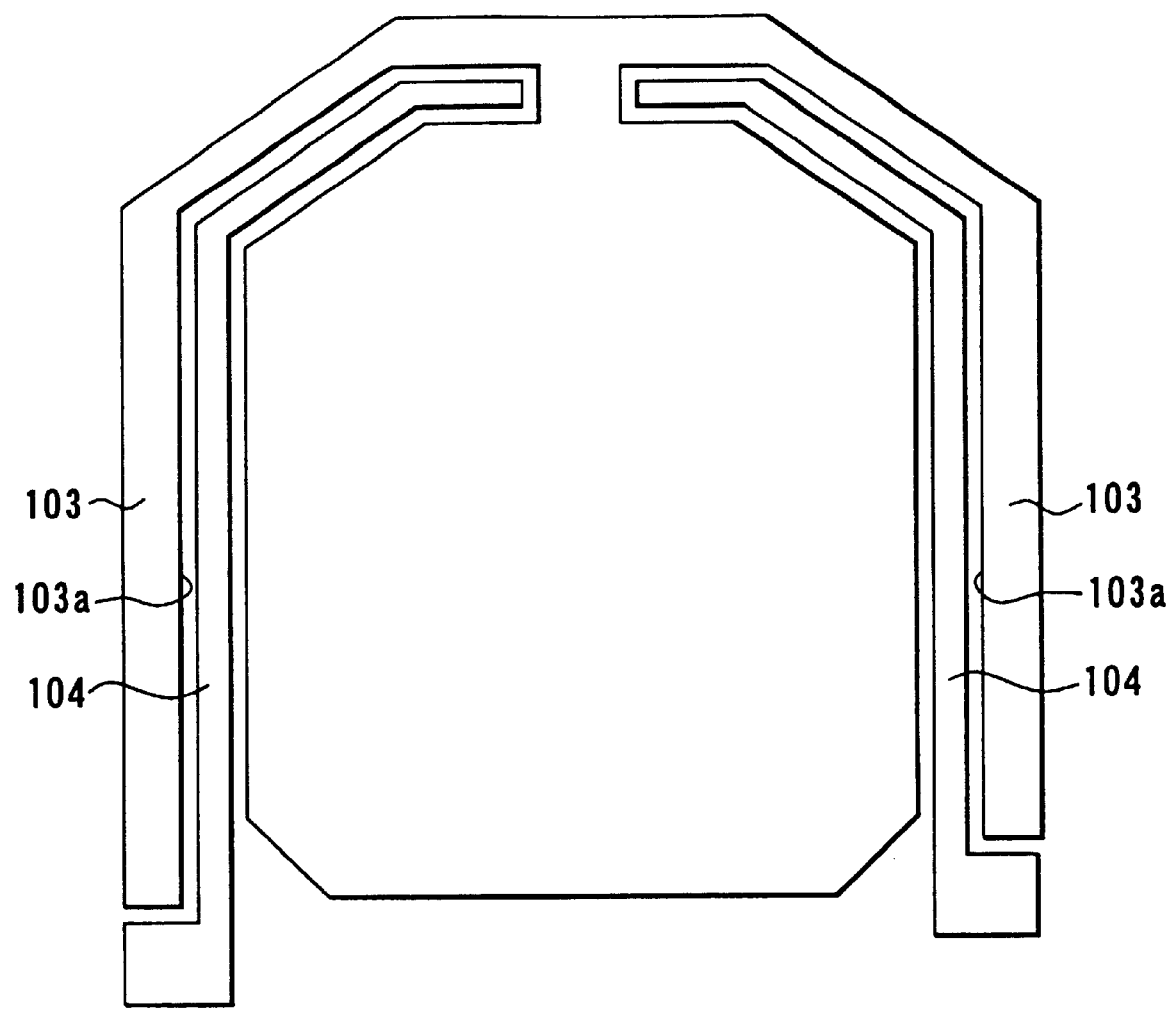
FIG. 32 is a top view of a bottom shield layer and conductive layers of the thin-film magnetic head of the seventh embodiment of the invention.

FIG. 32 is a top view of the bottom shield layer 103 and the conductive layers 104. FIG. 33 is a top view of the thin-film magnetic head of the embodiment manufactured through the foregoing process. In FIG. 33 the overcoat layer 120 is omitted. FIG. 33 shows the state before mechanical processing of the slider is performed. FIG. 23A to FIG. 31A are cross sections taken along line 31A—31A of FIG. 33. FIG. 23B to FIG. 31B are cross sections taken along line 31B—31B of FIG. 33. As shown in the drawings, the bottom shield layer 103 is placed in the region including the region facing the MR element 108 and its periphery and the region facing the two magnetic layers of the induction-type magnetic transducer (the top shield layer 110; and the top pole tip 113, the magnetic layer 114 and the top yoke layer 119) and the thin-film coils 115 and 117. The grooves 103a of the bottom shield layer 103 extend from the positions near both ends of the MR element 108 to both sides of the MR element 108. Portions of the grooves 103a pass through the region facing the top shield layer 110. Most of the remaining portions is placed around the region facing the two magnetic layers of the induction-type magnetic transducer and the thin-film coils 115 and 117. The conductive layers 104 making up the leads connected to the MR element 108 are placed in the grooves 103a of the bottom shield layer 103, being insulated. The ends of the conductive layers 104 opposite to the MR element 108 are greater in width than the grooves 103a and placed outside the bottom shield layer 103.

In the embodiment, the bottom shield layer 103 has the grooves 103a. The most part of the conductive layers 104 making up the lead connected to the MR element 108 is placed in the grooves 103a, being insulated from the bottom shield layer 103 by the insulating film 105. As a result, according to the embodiment of the invention, an extremely high insulation property is achieved between the conductive layers 104 and the bottom shield layer 103. It is therefore possible to prevent magnetic and electrical insulation faults between the conductive layers 104 and the bottom shield layer 103.

Part of the conductive layers 104 faces the top shield layer 110 with the bottom shield gap film 107a and the top shield gap film 107b in between. However, the most part of the conductive layers 104 does not face the top shield layer 110. As a result, the insulation property is extremely high between the conductive layers 104 and the top shield layer 110. It is therefore possible to prevent magnetic and electrical insulation faults between the conductive layers 104 and the bottom shield layer 110.

According to the invention, the conductive layers 104 are not inserted between the bottom shield gap film 107a and the top shield gap film 107b. As a result, it is impossible that large areas of the conductive layers 104 face the bottom shield layer 103 and the top shield layer 110 with the bottom shield gap film 107a and the top shield gap film 107b in between. Therefore, although the bottom shield gap film 107a and the top shield gap film 107b are thin, the insulation property is maintained at a high level between the conductive layers 104 and the bottom shield layer 103 and between the conductive layers 104 and the top shield layer 110.

According to the embodiment described so far, the insulation property is improved between the conductive layers connected to the MR element 108 and the bottom shield layer 103 and between the conductive layers and the top shield layer 110 without increasing the thickness of the bottom shield gap film 107a and the top shield gap film 107b.

According to the embodiment, the bottom shield gap film 107a and the top shield gap film 107b are made thin enough to improve the thermal asperity. The property of the reproducing head is thereby improved.

According to the embodiment, the conductive layers 104 are made thick enough so that the wiring resistance of the conductive layers connected to the MR element 108 is reduced. As a result, it is possible to detect with sensitivity a minute change in the output signal corresponding to a minute change in resistance of the MR element 108. The property of the reproducing head is improved in this respect, too.

In the embodiment, the sides of part of the conductive layers 104 placed in the grooves 103a of the bottom shield layer 103 are shielded, being placed in the middle of the bottom shield layer 103 along the direction of length. As a result, it is possible to reduce the effects of noises caused by internal factors such as magnetism and the like generated by the coil of the induction-type recording head or external factors such as the motor of the hard disk drive. In the neighborhood of the MR element 108, in particular, both sides of the conductive layers 104 are shielded by the bottom shield layer 103 and the top surface of the conductive layers 104 is shielded by the top shield layer 110. The effects of noises on the conductive layers 104 are thereby reduced. The property of the reproducing head is improved in this respect, too.

According to the embodiment, the bottom shield layer 103 and the conductive layers 104 are made of the same material at the same time. As a result, the number of manufacturing steps is reduced, compared to the case in which the bottom shield layer 103 and the conductive layers 104 are made in different steps.

According to the embodiment, the thick insulating layer 111 is formed between the coils 115 and 117 and the top shield layer 110, in addition to the thin recording gap layer 112. As a result, a high insulation strength is achieved between the coils 115 and 117 and the top shield layer 110. Magnetic flux leakage from the coils 115 and 117 is reduced as well.

[Eighth Embodiment]

Figure 34:
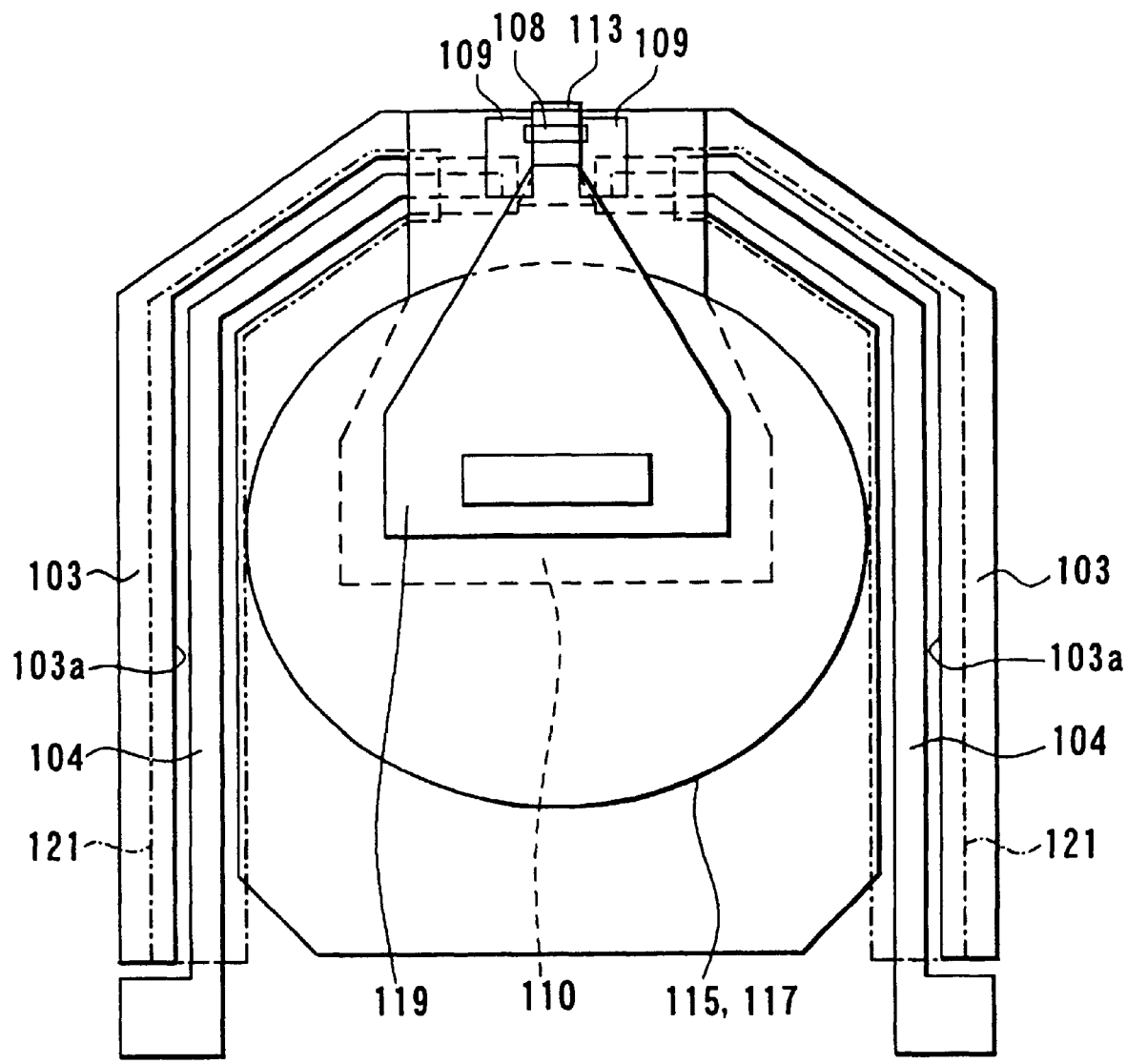
FIG. 34 is a top view of a thin-film magnetic head of an eighth embodiment of the invention.

Reference is now made to FIG. 34 to describe an eighth embodiment of the invention. FIG. 34 is a top view of a thin-film magnetic head of the embodiment. The overcoat layer is omitted in FIG. 34. FIG. 34 shows the state before mechanical processing of the slider is performed.

The thin-film magnetic head of the embodiment includes shield layers 121 for the conductive layers. The shield layers 121 face the portions of the conductive layers 104 in the grooves 103a of the bottom shield layer 103 that are exposed from the grooves 103. The shield layers 121 cover at least portions of the conductive layers 104 in the grooves 3a that do not face the top shield layer 110. Where the insulating layer 111 is provided, the shield layers 121 are formed on the insulating layer 111. The shield layers 121 are formed on the top shield gap film 107b where the insulating layer 111 is not provided.

In the step of making the top yoke layer 119, the shield layers 121 may be formed at the same time through the use of the same magnetic material.

According to the embodiment, the shield layers 121 shield the top surfaces of the portions of the conductive layers 104 in the grooves 103a that do not face the top shield layer 110. As a result, the effects of noises on the conductive layers 104 are more greatly reduced, compared to the seventh embodiment.

The remainder of configuration, functions and effects of the embodiment are similar to those of the seventh embodiment.

[Ninth Embodiment]

Figures 35A, 35B:
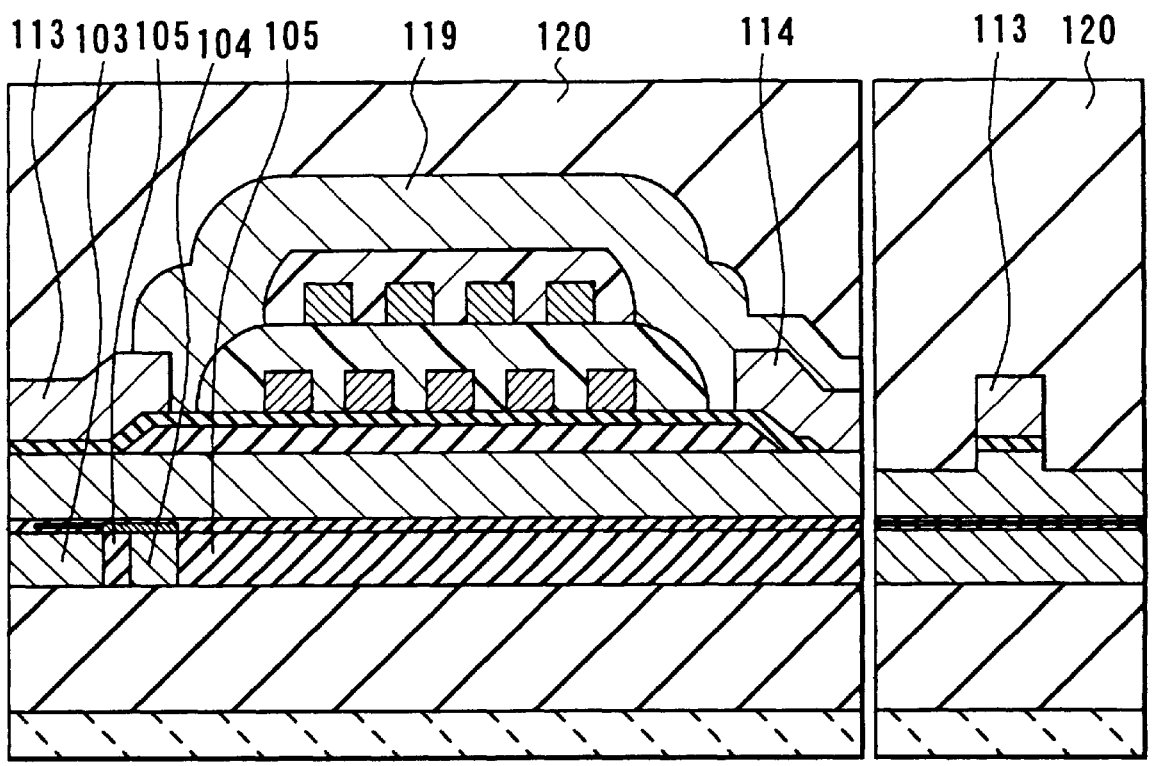
FIG. 35A and FIG. 35B are cross sections of a thin-film magnetic head of a ninth embodiment of the invention.
Figure 36:
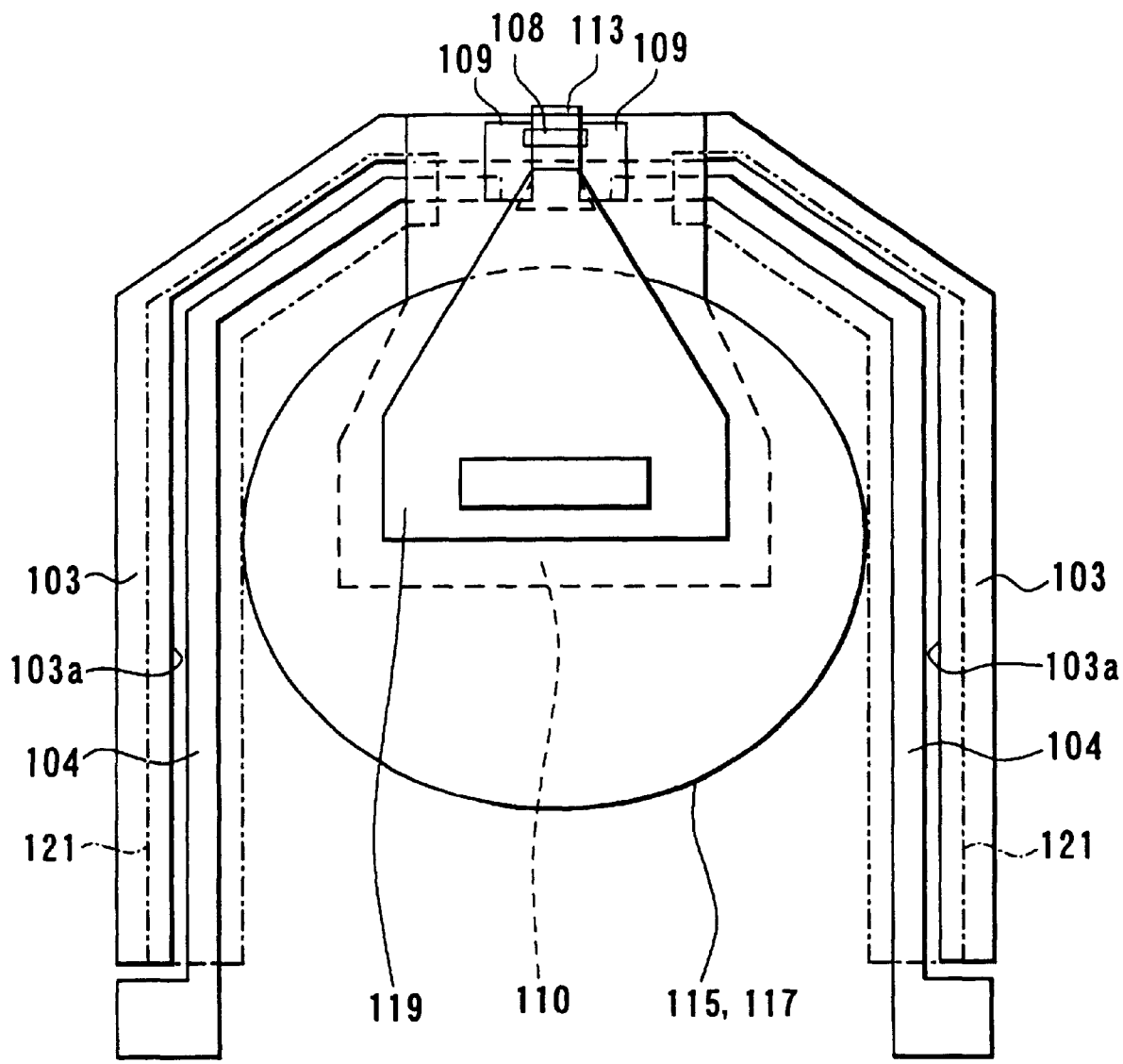
FIG. 36 is a top view of the thin-film magnetic head of the ninth embodiment of the invention.

Reference is now made to FIG. 35A, FIG. 35B and FIG. 36 to describe a ninth embodiment of the invention. FIG. 35A is a cross section of a thin-film magnetic head of the embodiment orthogonal to the air bearing surface. FIG. 35B is a cross section of the pole portion of the thin-film magnetic head parallel to the air bearing surface. FIG. 36 is a top view of the thin-film magnetic head. FIG. 35A and FIG. 36 show the state before mechanical processing of the slider is performed.

In the thin-film magnetic head of the embodiment, as shown in FIG. 36, the bottom shield layer 103 has a configuration similar to that of the bottom shield layer 103 of the seventh embodiment except that the portion between the pair of conductive layers 104 is removed. Therefore, in the ninth embodiment, as shown in FIG. 35A, the outer lateral surfaces of the conductive layers 104 face the bottom shield layer 103. The inner lateral surfaces of the conductive layers 104 do not face the bottom shield layer 103 but face the insulating film 105. As in the eighth embodiment, the shield layers 121 facing the conductive layers 104 are provided.

In the ninth embodiment, although the inner lateral surfaces of the conductive layers 104 do not face the bottom shield layer 103, the outer lateral surfaces of the conductive layers 104 are shielded by the bottom shield layer 103. The shield layers 121 shield the top surfaces of the portions of the conductive layers 104 not facing the top shield layer 110. As a result, the effects of noises on the conductive layers 104 are sufficiently reduced.

The remainder of configuration, functions and effects of the embodiment are similar to those of the eighth embodiment.

[Tenth Embodiment]

Figures 37A, 37B:
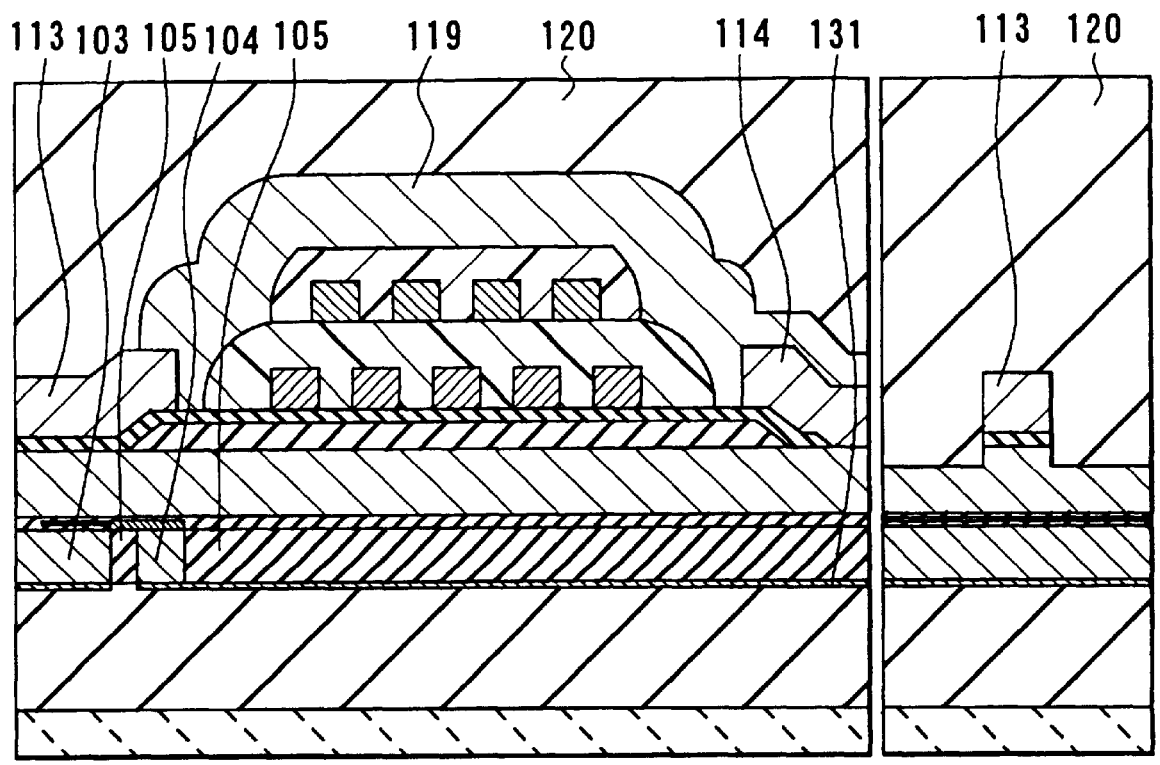
FIG. 37A and FIG. 37B are cross sections of a thin-film magnetic head of a tenth embodiment of the invention.
Figure 38:
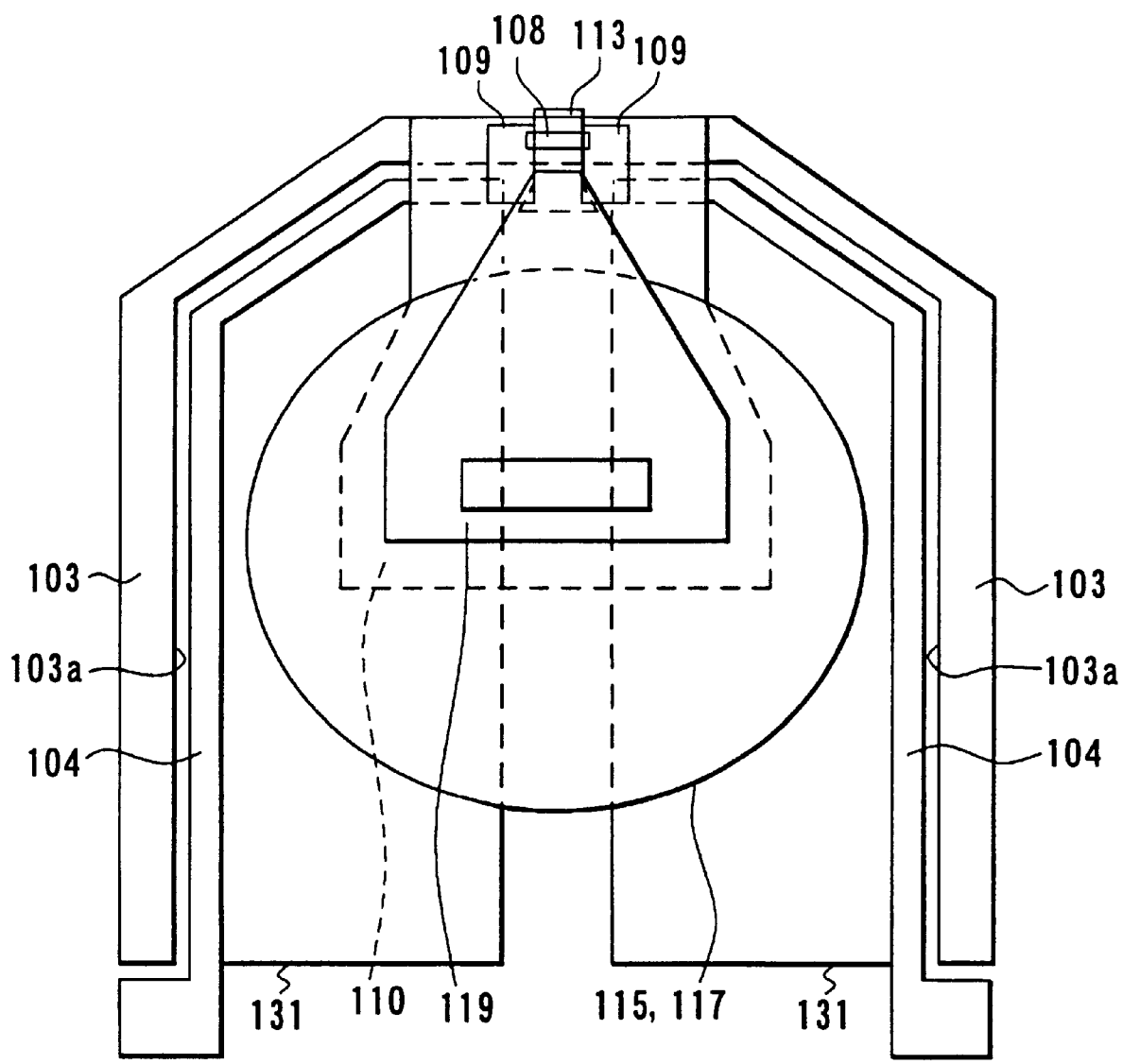
FIG. 38 is a top view of the thin-film magnetic head of the tenth embodiment of the invention.

Reference is now made to FIG. 37A, FIG. 37B and FIG. 38 to describe a tenth embodiment of the invention. FIG. 37A is a cross section of a thin-film magnetic head of the embodiment orthogonal to the air bearing surface. FIG. 37B is a cross section of the pole portion of the thin-film magnetic head parallel to the air bearing surface. FIG. 38 is a top view of the thin-film magnetic head. FIG. 37A and FIG. 38 show the state before mechanical processing of the slider is performed.

As in the ninth embodiment, the bottom shield layer 103 has a configuration similar to that of the bottom shield layer 103 of the seventh embodiment except that the portion between the pair of conductive layers 104 is removed.

The thin-film magnetic head of the embodiment comprises seed layers 131 used for forming the conductive layers 104 and electrically connected to the conductive layers 104. The seed layers 131 are formed in a region larger than the region where the conductive layers 104 are formed. The seed layers 131 may be formed in a large region between the pair of conductive layers 104, for example. As shown in FIG. 38, one of the seed layers 131 electrically connected to one of the conductive layers 104 is separated and insulated from the other seed layer 131 connected to the other conductive layer 104.

The seed layers 131 are made of Permalloy (NiFe) through sputtering, for example, on the insulation layer 102 and has a thickness of 50 to 100 nm.

According to the embodiment, although the inner lateral surfaces of the conductive layers 104 do not face the bottom shield layer 103, the outer lateral surfaces of the conductive layers 104 are shielded by the bottom shield layer 103. As a result, the effects of noises on the conductive layers 104 are sufficiently reduced.

According to the embodiment, the seed layers 131 are provided that are used for forming the conductive layers 104 and electrically connected to the conductive layers 104. The seed layers 131 are formed in a region larger than the region where the conductive layers 104 are formed. As a result, the wiring resistance of the conductive layers connected to the MR element 108 is more greatly reduced.

As shown in FIG. 32, if the conductive layers 104 form part of a ring, the conductive layers 104 may function as a coil and receive noises. In the embodiment, however, the seed layers 131 electrically connected to the conductive layers 104 are formed in a region larger than the region where the conductive layers 104 are formed. Consequently, the shape of the conductor including the conductive layers 104 and the seed layers 131 does not form part of a ring. As a result, the influence of noises on the conductive layers 104 is reduced.

The remainder of configuration, functions and effects of the embodiment are similar to those of the seventh embodiment.

[Eleventh Embodiment]

Figure 39:
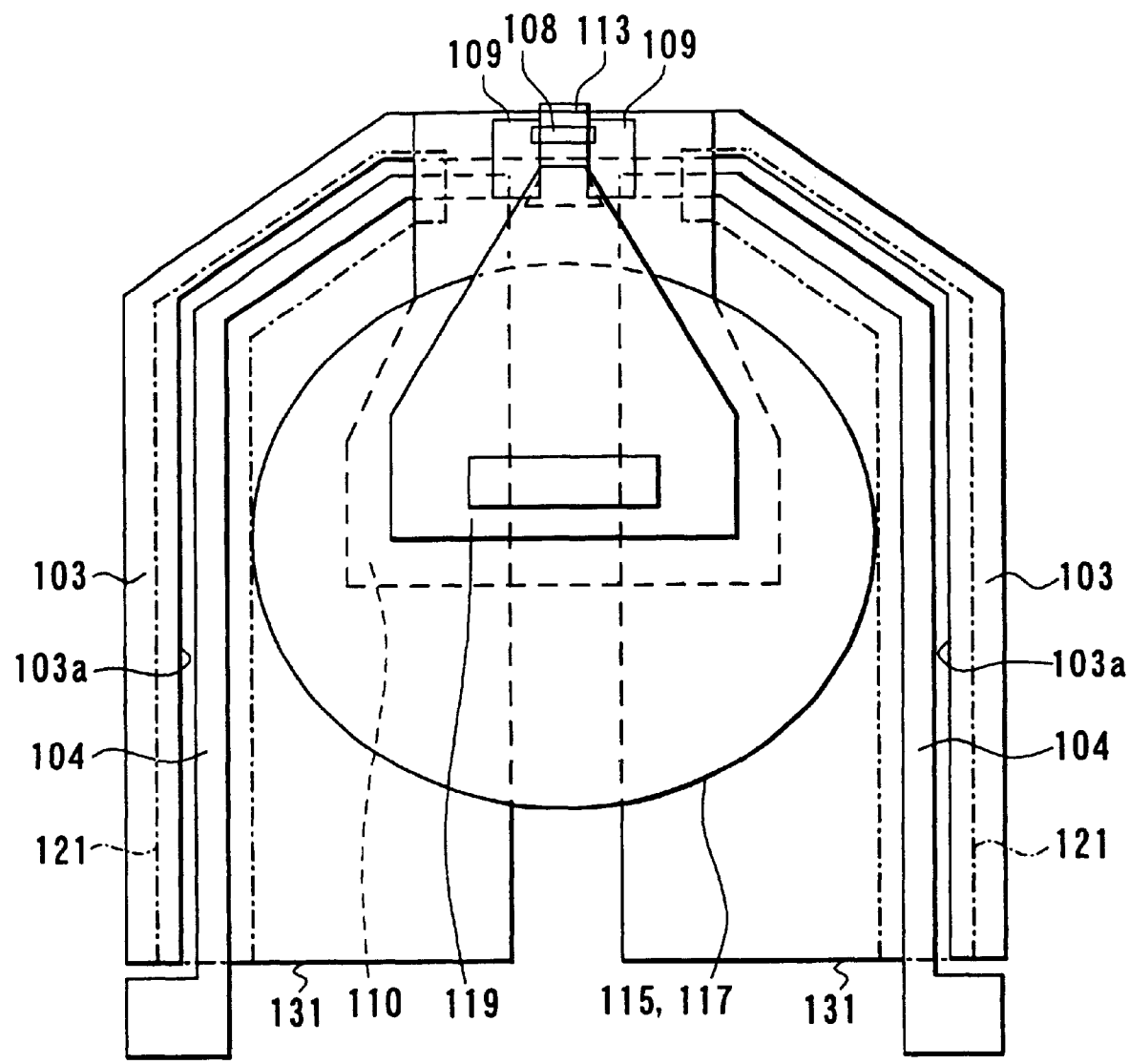
FIG. 39 is a top view of a thin-film magnetic head of an eleventh embodiment of the invention.

Reference is now made to FIG. 39 to describe a eleventh embodiment of the invention. FIG. 39 is a top view of a thin-film magnetic head of the embodiment. FIG. 39 shows the state before mechanical processing of the slider is performed.

The thin-film magnetic head of the embodiment is similar to that of the tenth embodiment except that the shield layers 121 facing the conductive layers 104 are further provided as in the eighth embodiment.

The remainder of configuration, functions and effects of the embodiment are similar to those of the eighth or tenth embodiment.

[Twelfth Embodiment]

Figures 40A, 40B:
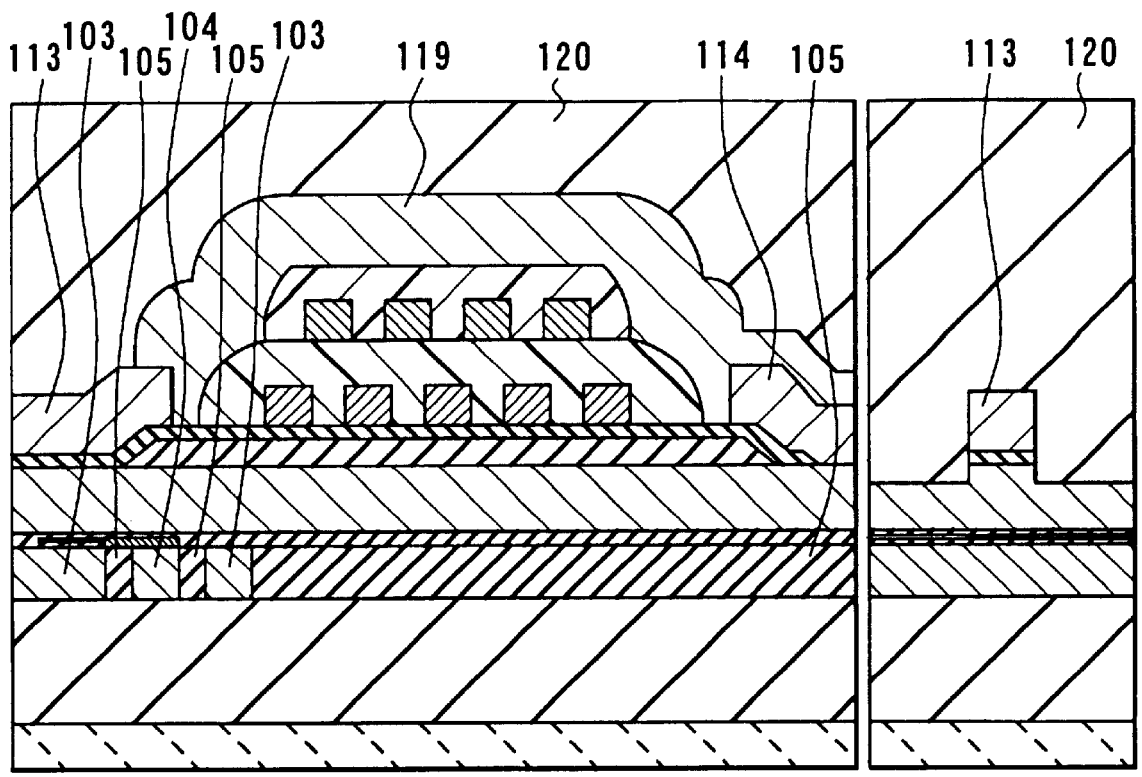
FIG. 40A and FIG. 40B are cross sections of a thin-film magnetic head of a twelfth embodiment of the invention.
Figure 41:
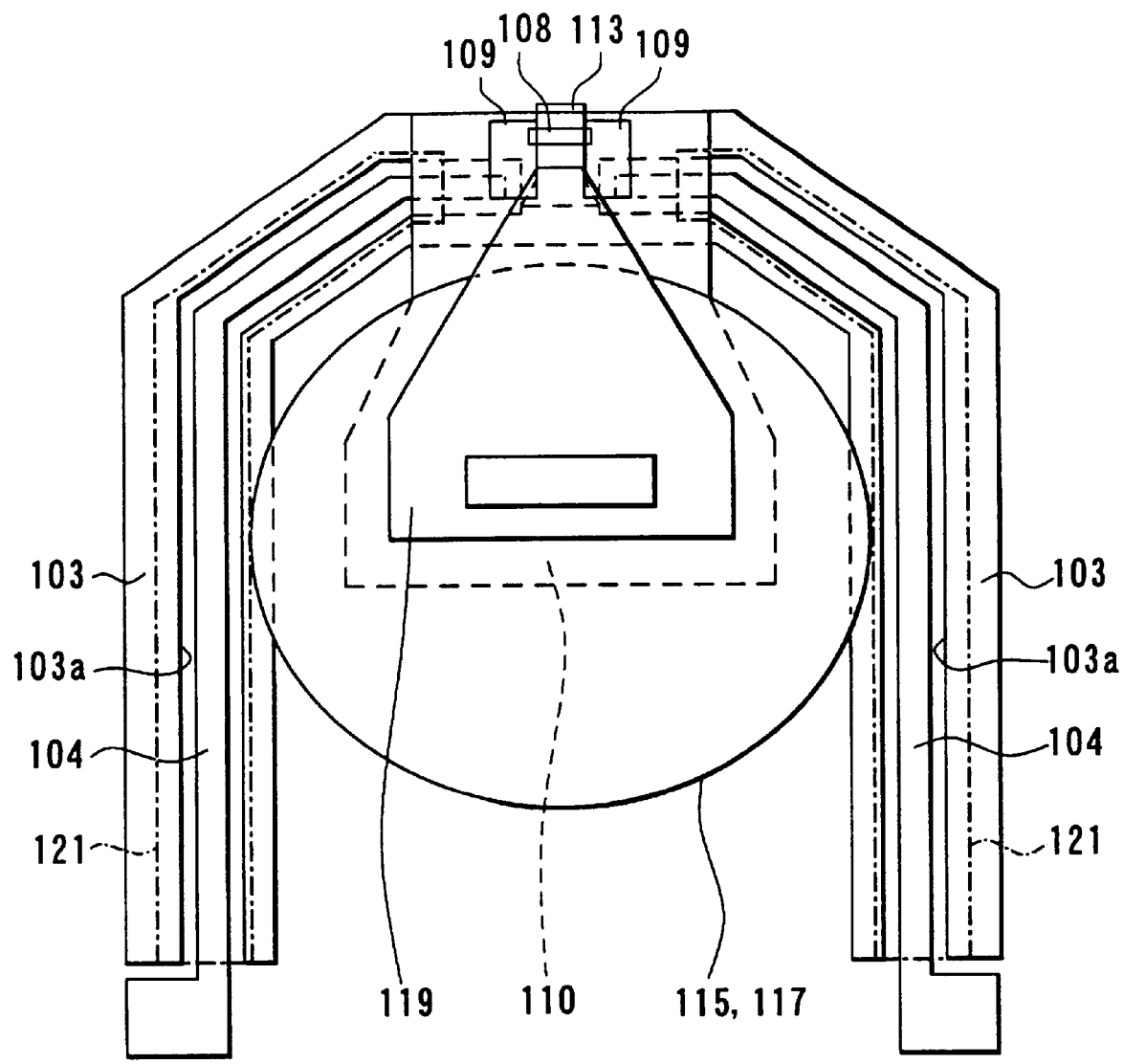
FIG. 41 is a top view of the thin-film magnetic head of the twelfth embodiment of the invention.

Reference is now made to FIG. 40A, FIG. 40B and FIG. 41 to describe a twelfth embodiment of the invention. FIG. 40A is a cross section of a thin-film magnetic head of the embodiment orthogonal to the air bearing surface. FIG. 40B is a cross section of the pole portion of the thin-film magnetic head of the embodiment parallel to the air bearing surface. FIG. 41 is a top view of the thin-film magnetic head.

FIG. 40A and FIG. 41 show the state before mechanical processing of the slider is performed.

In the thin-film magnetic head of the embodiment, as shown in FIG. 41, the bottom shield layer 103 has a configuration similar to that of the bottom shield layer 103 of the seventh embodiment except that a portion between the pair of conductive layers 104 is removed while portions having a specific width along the conductive layers 104 are only left. Therefore, in the twelfth embodiment, the bottom shield layer 103 faces the inner lateral surfaces of the conductive layers 104. The portions of the bottom shield layer 103 of the embodiment that face the inner lateral surfaces of the conductive layers 104 have a thickness similar to that of the conductive layers 104, for example. In the embodiment, the shield layers 121 facing the conductive layers 104 are provided as in the eighth embodiment.

The remainder of configuration, functions and effects of the embodiment are similar to those of the eighth embodiment.

[Thirteenth Embodiment]

Figure 42:
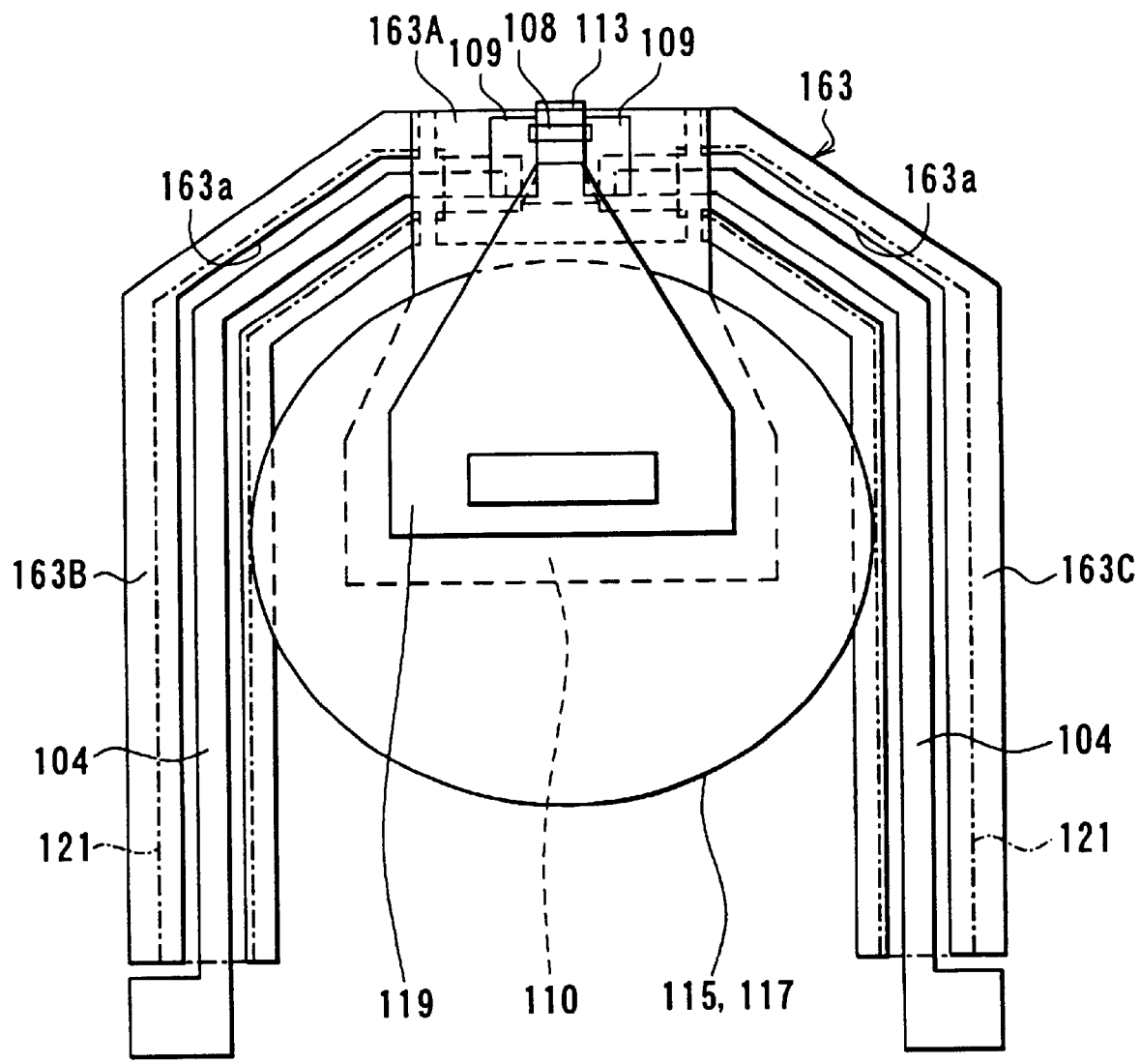
FIG. 42 is a top view of a thin-film magnetic head of a thirteenth embodiment of the invention.

Reference is now made to FIG. 42 to describe a thirteenth embodiment of the invention. FIG. 42 is a top view of a thin-film magnetic head of the embodiment. FIG. 42 shows the state before mechanical processing of the slider is performed.

In the embodiment a bottom shield layer 163 is provided in place of the bottom shield layer 103 of the twelfth embodiment. The entire shape of the bottom shield layer 163 is similar to that of the bottom shield layer 103 of the twelfth embodiment except that the bottom shield layer 163 is divided into a portion 163A facing the MR element 8 and portions 163B and 163C not facing the MR element 8. Specific gaps are each provided between the portion 163A and the portion 163B and between the portion 163A and the portion 163C. The bottom shield layer 163 has grooves 163a in which portions of the conductive layers 104 are placed, as the grooves 103a of the bottom shield layer 103 of the seventh embodiment. The portions 163B and 163C are each divided into two portions by the grooves 163a. Therefore, the bottom shield layer 163 is actually divided into the five portions.

The bottom shield layer 163 and the conductive layers 104 of the embodiment are selectively formed through plating with a photoresist film as a mask on part of the seed layer selectively left through etching, the part of the seed layer corresponding to the bottom shield layer 163 and the conductive layers 104.

In the embodiment the shield layers 121 facing the conductive layers 104 are provided as in the twelfth embodiment.

According to the embodiment, the bottom shield layer 163 is divided into the five portions. Therefore, the area of each portion is small and the shield property in a high frequency range is improved.

The remainder of configuration, functions and effects of the embodiment are similar to those of the twelfth embodiment.

In the seventh, eighth, twelfth and thirteenth embodiments one of the two shield layers facing each other with the MR element in between has the grooves in which at least part of the conductive layers connected to the MR element is placed. At least part of the conductive layers is made of the same material as the one of the shield layers. The part of the conductive layers is placed in the grooves, being insulated form the shield layer. As a result, according to the embodiments, the insulation property is improved between the conductive layers and each shield layer. Furthermore, since the conductive layers are not placed between the shield layers with the insulating layers in between, the insulation property is improved between each shield layer and the conductive layers connected to the MR element without increasing the thickness of the insulating layer between the MR element and each shield layer. According to the embodiments, it is possible to make the conductive layers sufficiently thick. The wiring resistance of the conductive layers is thereby reduced. According to the embodiments, part of the conductive layers placed in the grooves is shielded, being held in the middle of one of the shield layers. The effects of noises on the conductive layers are thereby reduced. According to the embodiments, at least part of the conductive layers is made of the same material as one of the shield layers so that these layers may be fabricated in the same manufacturing step. The number of manufacturing steps of the thin-film magnetic head is therefore reduced.

If the shield layers are provided for shielding at least part of the conductive layers, the effects of noises on the conductive layers are further reduced.

The one of the shield layers may be divided into the portion facing the MR element and the portions not facing the MR element. The shield property in a high frequency range is thereby improved.

In the ninth to eleventh embodiments one of the shield layers and at least part of the conductive layers are made of the same material and placed in one plane, being insulated from each other. Therefore, according to the embodiments, the insulation property is improved between the conductive layers and each shield layer. Furthermore, since the conductive layers are not placed between the shield layers with insulating layers in between, the insulation property is improved between each shield layer and the conductive layers connected to the MR element without increasing the thickness of the insulating layer between the MR element and each shield layer. In addition, it is possible to make the conductive layers sufficiently thick. The wiring resistance of the conductive layers is thereby reduced.

According to the ninth to eleventh embodiments, the shield layers are provided for shielding at least part of the conductive layers. The effects of -noises on the conductive layers are thereby reduced. According to the tenth and eleventh embodiments, the seed layer is provided that is used for fabricating at least part of the conductive layers and formed in the region larger than the region where at least part of the conductive layers is formed. The seed layer is electrically connected to at least part of the conductive layers. The wiring resistance of the conductive layers is thereby reduced and the effects of noises on the conductive layers are reduced.

[Fourteenth Embodiment]

Reference is now made to FIG. 43A to FIG. 51A, FIG. 43B to FIG. 51B, FIG. 52 and FIG. 53 to describe a composite thin-film magnetic head and a method of manufacturing the same of a fourteenth embodiment of the invention. FIG. 43A to FIG. 51A are cross sections each orthogonal to the air bearing surface of the thin-film magnetic head. FIG. 43B to FIG. 51B are cross sections each parallel to the air bearing surface of the pole portion of the head.

Figures 43A, 43B:
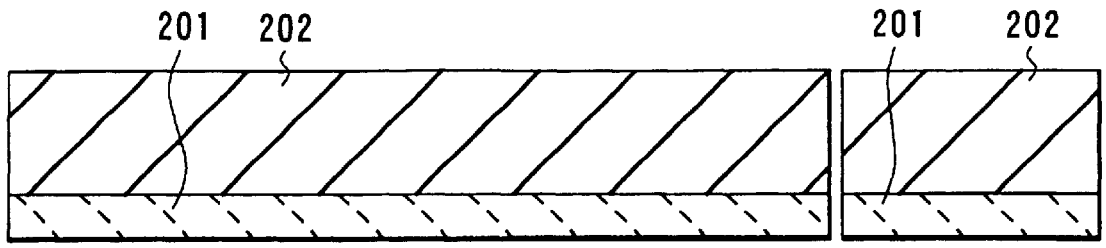
FIG. 43A and FIG. 43B are cross sections for illustrating a step in a method of manufacturing a thin-film magnetic head of a fourteenth embodiment of the invention.

In the method of the embodiment, as shown in FIG. 43A and FIG. 43B, an insulating layer 202 made of alumina ($Al_2O_3$), for example, of about 5 to 10 $\mu$m in thickness is deposited on a substrate 201 made of aluminum oxide and titanium carbide ($Al_2O_3$—TiC), for example.

Although not shown, a seed layer is made on the insulating layer 202 through sputtering Permalloy (NiFe). The seed layer is used for forming a bottom shield layer and part of a top shield layer-cum-bottom pole layer (called top shield layer in the following description) through plating.

Figures 44A, 44B:
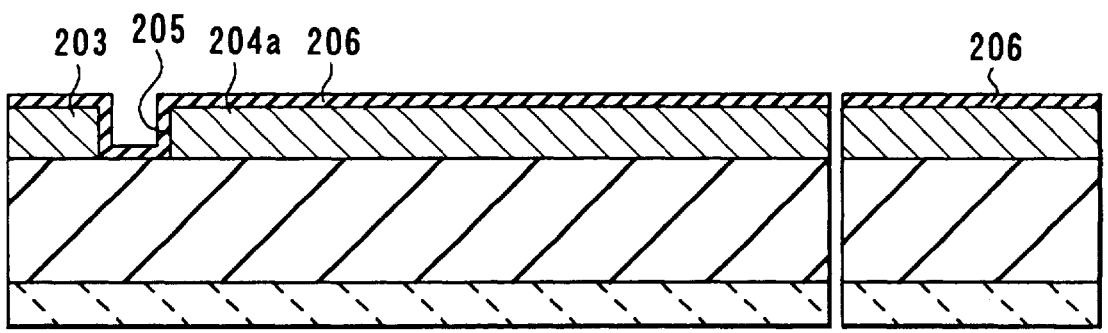
FIG. 44A and FIG. 44B are cross sections for illustrating a step that follows FIG. 43A and FIG. 43B.

Next, as shown in FIG. 44A and FIG. 44B, on the seed layer a magnetic material such as Permalloy (NiFe) is selectively deposited to a thickness of about 2 to 3 μm through plating with a photoresist film as a mask. A bottom shield layer 203 for the reproducing head and a portion (called a first portion in the following description) 204a of a top shield layer are thereby formed. Alternatively, the bottom shield layer 203 and the first portion 204a may be formed by sputtering a magnetic material and pattering the material through photolithography. The bottom shield layer 203 and the first portion 204a are formed in one plane, being insulated from each other by the photoresist. Between the bottom shield layer 203 and the first portion 204a, a pair of grooves 205 are formed in which at least portions of conductive layers to be connected to an MR element are placed. The bottom shield layer 203 corresponds to the first shield layer of the invention. The top shield layer corresponds to the second shield layer of the invention.

Next, part of the seed layer that covers the grooves 205 is selectively etched and removed. An insulating film 206 of alumina, for example, whose thickness is 500 nm or above is formed through sputtering, for example, on the bottom shield layer 203 and the first portion 204a of the top shield layer including inside the grooves 205.

Figures 45A, 45B:
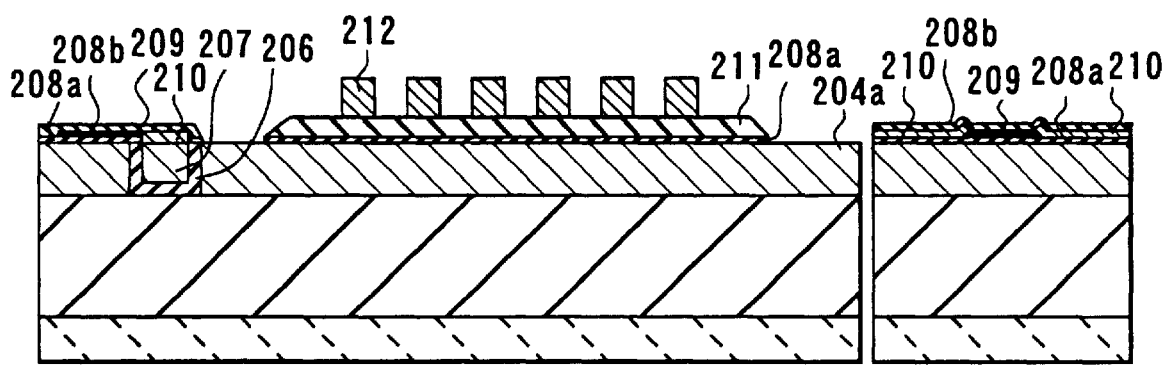
FIG. 45A and FIG. 45B are cross sections for illustrating a step that follows FIG. 44A and FIG. 44B.

Next, as shown in FIG. 45A and FIG. 45B, a pair of conductive layers 207 are made of coppers, for example, in the grooves 205 covered with the insulating film 206. The conductive layers 207 make up leads connected to the MR element. The conductive layers 207 may be formed by depositing copper to a thickness of about 2 to 3 μm through plating selectively in the grooves 205 with a photoresist film as a mask. Alternatively, the conductive layers 207 may be formed through sputtering.

Next, an insulating layer made of alumina or silicon dioxide, for example, whose thickness is 4 to 6 μm is formed on the entire surface. The insulating layer is then polished to the surfaces of the bottom shield layer 203, the first portion of the top shield layer and the conductive layers 207 and flattened. The polishing method may be mechanical polishing or CMP. Through this flattening process, the surfaces of the bottom shield layer 203, the first portion 204a and the conductive layers 207 are exposed.

As thus described, the conductive layers 207 are formed through plating and precisely embedded in the grooves 205 between the bottom shield layer 203 and the first portion 204a of the top shield layer, the grooves 205 being fully covered with the insulating film 206 of 500 nm or above in thickness. As a result, an extremely high insulation property is obtained between the conductive layers 207 and the bottom shield layer 203 and the first portion 204a. It is therefore possible to prevent magnetic and electrical insulation faults between the conductive layers 207 and the bottom shield layer 203 and the first portion 204a due to particles or pinholes in the layers.

Next, an insulating material such as aluminum nitride or alumina is sputtered to a thickness of about 50 to 100 nm over the bottom shield layer 203, the first portion 204a of the top shield layer, the insulating film 206 and the conductive layers 207. A bottom shield gap film 208a as an insulating layer is thus formed. Before forming the bottom shield gap film 208a, a photoresist pattern in a T-shape, for example, is formed to facilitate liftoff where contact holes are to be formed. Some of the contact holes are provided for electrically connecting the conductive layers 207 to other conductive layers described later. Another one of the contact hole is provided for connecting the first portion 204a to a second portion described later of the top shield layer. Still another one of the contact hole is provided for making a magnetic path behind (the right side of FIG. 45A) a thin-film coil described later. After the bottom shield gap film 208a is formed, the contact holes are formed through lifting off the photoresist patterns. Alternatively, the contact holes may be formed by selectively etching the bottom shield gap film 208a through the use of photolithography.

Next, an MR film of tens of nanometers in thickness for forming an MR element 209 for reproduction is deposited through sputtering on the bottom shield gap film 208a. A photoresist pattern (not shown) is then selectively formed where the MR element 209 is to be formed on the MR film. The photoresist pattern may be T-shaped, for example, to facilitate liftoff. Next, the MR film is etched through argon-base ion milling, for example, with the photoresist pattern as a mask to form the MR element 209. The MR element 209 may be either a GMR element or an AMR element.

Next, on the bottom shield gap film 208a, a pair of conductive layers 210 of 80 to 150 nm in thickness are formed through sputtering with the same photoresist pattern as a mask. The conductive layers 210 are to be electrically connected to the MR element 209. The conductive layers 210 may be formed through stacking TiW, CoPt, TiW, Ta, and Au, for example. The conductive layers 210 are electrically connected to the conductive layers 207 through the contact holes provided in the bottom shield gap film 208a. The conductive layers 210 and 207 make up the leads connected to the MR element 209.

Next, on the bottom shield gap film 208a, the MR element 209 and the conductive layers 210, an insulating material such as aluminum nitride or alumina is sputtered to a thickness of about 50 to 100 nm to form a top shield gap film 208b as an insulating layer. The MR element 209 is thus embedded in the shield gap films 208a and 208b.

Next, an insulating film made of alumina or silicon dioxide, for example, whose thickness is 1 to 2 μm is formed behind the contact hole provided in the bottom shield gap film 208a (that is, the right side of FIG. 45A) on the bottom shield gap film 208a. The insulating film is then selectively etched through photolithography to form an insulating layer 211. The edge of the insulating layer 211 close to the pole portion is tapered. Next, a thin-film coil 212 of a first layer for the recording head is made of copper, for example, through plating, for example.

Figures 46A, 46B:
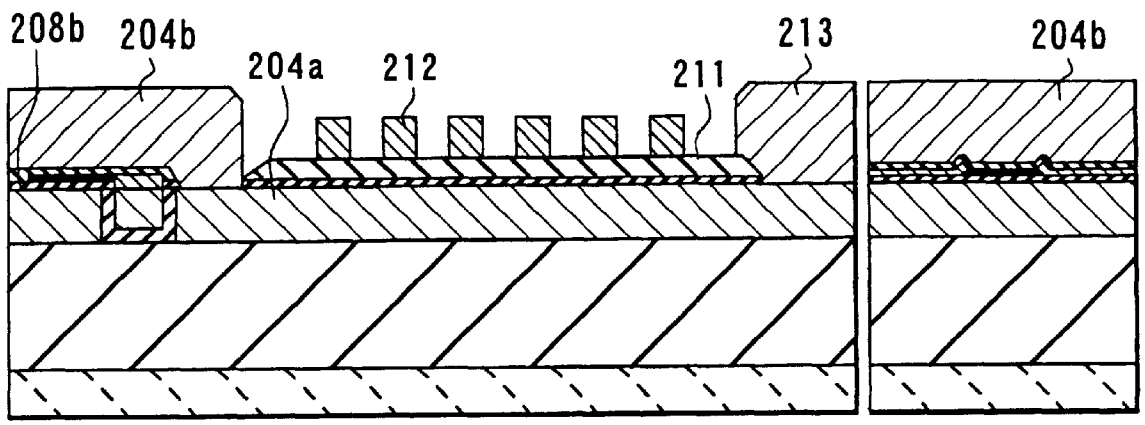
FIG. 46A and FIG. 46B are cross sections for illustrating a step that follows FIG. 45A and FIG. 45B.

Next, as shown in FIG. 46A and FIG. 46B, a second portion 204b of the top shield layer is formed on the top shield gap film 208b. The second portion 204b is made of a magnetic material and has a thickness of 2 to 3 μm and is connected to the first portion 204a of the top shield layer. The second portion 204b is placed to face the bottom shield layer 203 with the MR element 209 in between. At the same time, a magnetic layer 213 for making the magnetic path is formed on the contact hole for making the magnetic path behind the thin-film coil 212. The magnetic layer 213 is made of a magnetic material and has a thickness of 2 to 3 μm.

The bottom shield layer 203 and the top shield layer 204a and 204b may be made of NiFe (80 weight % Ni and 20 weight % Fe) or a high saturation flux density material such as NiFe (50 weight % Ni and 50 weight % Fe), Sendust, FeN or a compound thereof, or an amorphous of Fe—Co—Zr. The bottom shield layer 203 and the top shield layer 204a and 204b may be made of layers of two or more of those materials.

Figures 47A, 47B:
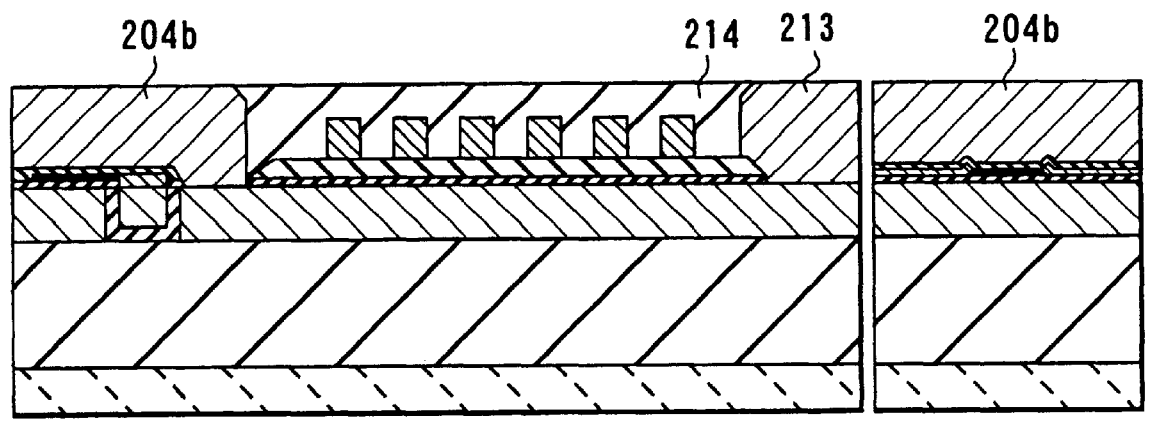
FIG. 47A and FIG. 47B are cross sections for illustrating a step that follows FIG. 46A and FIG. 46B.

Next, as shown in FIG. 47A and FIG. 47B, an alumina film or a silicon dioxide film of 4 to 6 μm in thickness is formed over the entire surface. The entire surface is then flattened so that the surfaces of the second portion 204b of the top shield layer and the magnetic layer 213 are exposed. The flattening may be performed through mechanical polishing or CMP. Such a flattening process prevents formation of a rise in the second portion 204b of the top shield layer caused by the pattern of the MR element 209. The surface of the second portion 204b is thus made flat, and a recording gap layer of the magnetic pole of the recording head to be formed is made flat. As a result, the writing property in a high frequency range is improved.

Figures 48A, 48B:
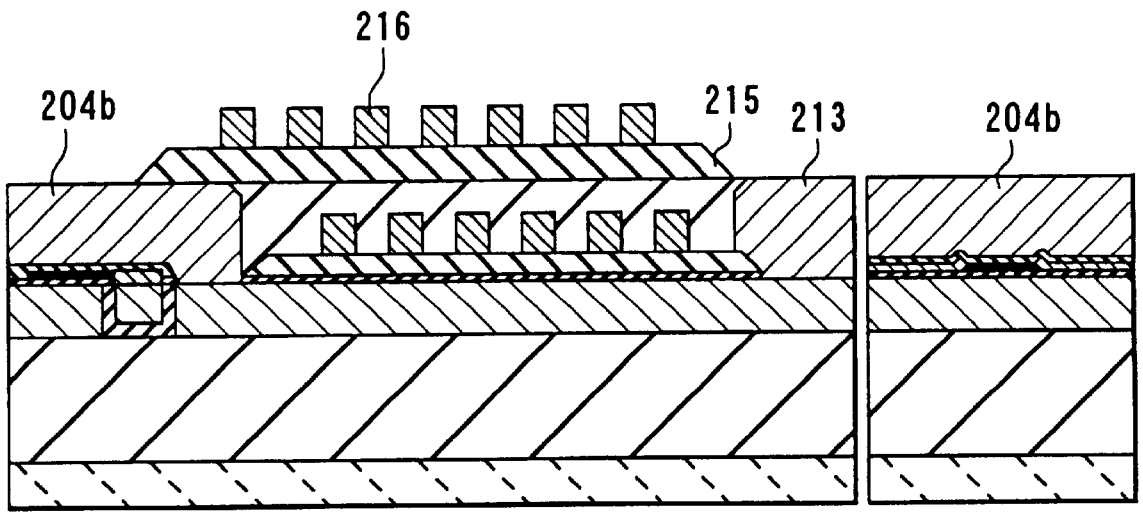
FIG. 48A and FIG. 48B are cross sections for illustrating a step that follows FIG. 47A and FIG. 47B.

Next, as shown in FIG. 48A and FIG. 48B, an insulating film 215 of alumina or silicon dioxide of 0.5 to 1 μm in thickness is formed on the flattened second portion 204b of the top shield layer and the insulating layer 214. The insulating film 215 defines the throat height. On the insulating film 215 a thin-film coil 216 of a second layer of the recording head is formed through plating. The thin-film coil 216 may be made of copper, for example.

Figures 49A, 49B:
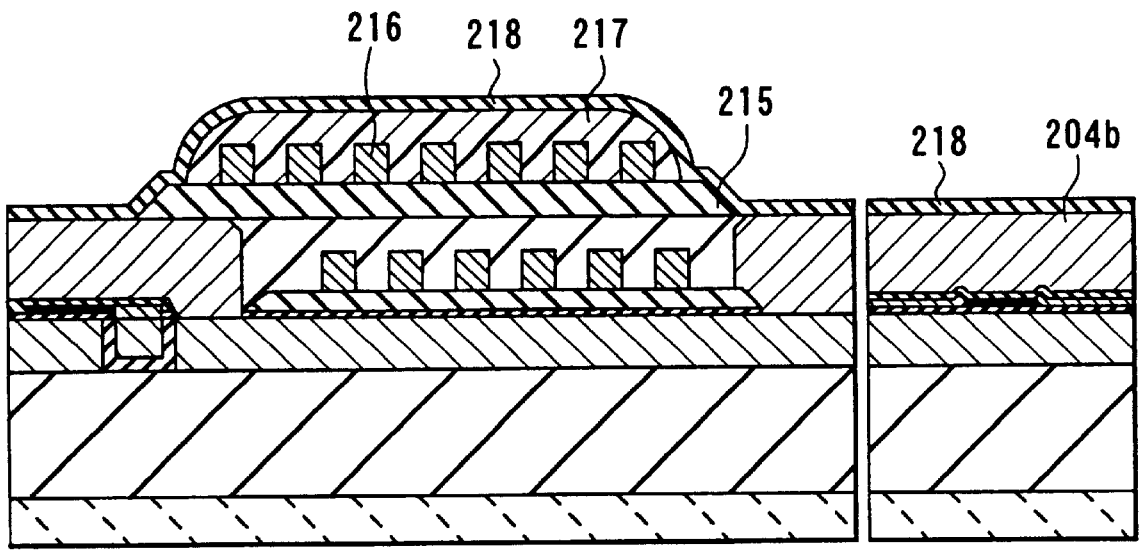
FIG. 49A and FIG. 49B are cross sections for illustrating a step that follows FIG. 48A and FIG. 48B.

Next, as shown in FIG. 49A and FIG. 49B, as insulating layer 217 made of photoresist is formed into a specific pattern on the insulating layer 215 and the coil 216. A recording gap layer 218 of 200 to 300 nm in thickness made of an insulating film of alumina, aluminum nitride, or silicon dioxide, for example, is formed on the entire surface.

Next, as shown in FIG. 50A and FIG. 50B, the recording gap layer 218 is then partially etched to form the magnetic path behind the thin-film coils 212 and 216. Next, a top pole layer 219 of about 3 μm in thickness is formed on the recording gap layer 218. The top pole layer 219 determines the track width of the induction recording head. The top pole layer 219 may be formed through plating with NiFe (50 weight % Ni and 50 weight % Fe), or through sputtering a high saturation flux density material such as FeN or a compound thereof and then patterning. Besides the above examples, the material of the top pole layer 219 may be a high saturation flux density material such as NiFe (80 weight % Ni and 20 weight % Fe) or an amorphous of Fe—Co—Zr. Alternatively, the top pole layer 219 may be layers of two or more of the above materials.

Next, as shown in FIG. 51A and FIG. 51B, part of the recording gap layer 218 on both sides of the top pole layer 219 is removed through dry etching. The exposed second portion 204b of the top shield layer is then etched through ion milling by about 0.5 μm, for example, with the top pole layer 219 as a mask so as to form a trim structure.

Next, an overcoat layer 220 of alumina, for example, whose thickness is about 30 to 40 μm is formed to cover the top pole layer 219. Finally, machine processing of the slider is performed and the air bearing surface of the recording head and the reproducing head is formed. The thin-film magnetic head is thus completed.

The top shield layer (bottom pole layer) 204a and 204b, the magnetic layer 213, the top pole layer 219, and the thin-film coils 212 and 216 correspond to the induction-type magnetic transducer of the invention. That is, the top shield layer (bottom pole layer) 204a and 204b and the magnetic layer 213 correspond to one of the two magnetic layers of the recording head of the invention. The top pole layer 219 corresponds to the other of the two magnetic layers.

Figure 52:
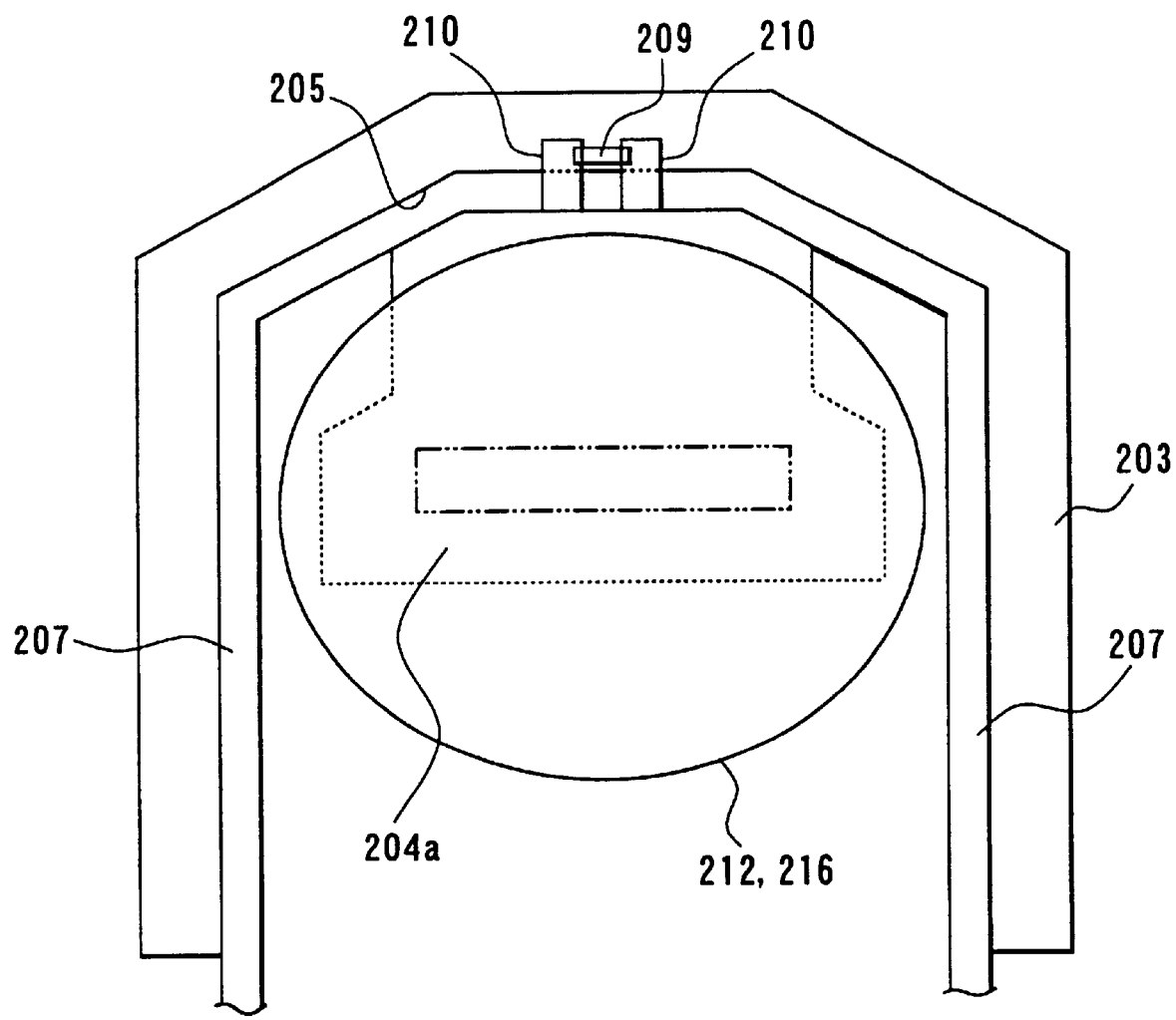
FIG. 52 is a top view of the thin-film magnetic head of the fourteenth embodiment of the invention in the state in one of the manufacturing steps.
Figure 53:
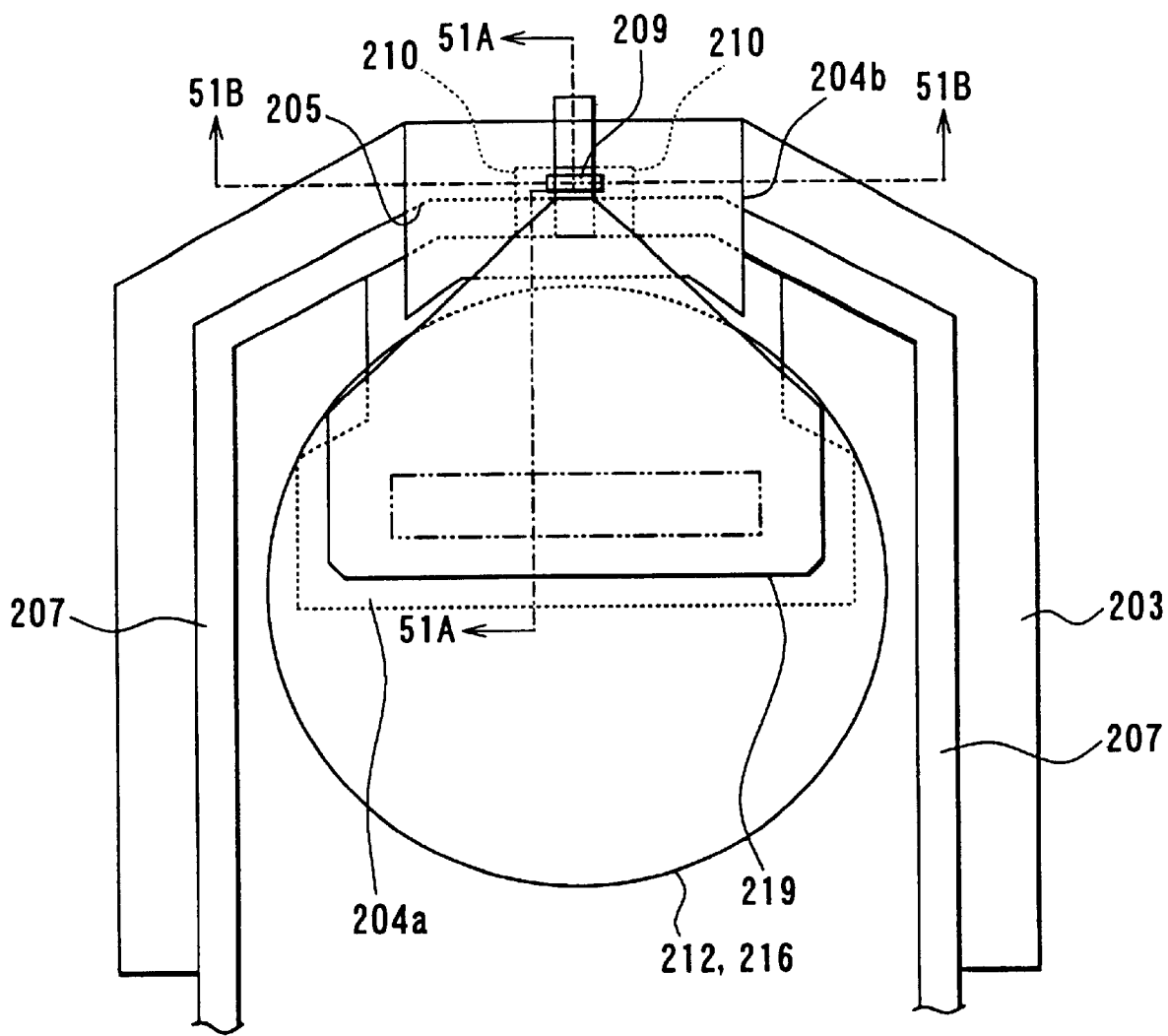
FIG. 53 is a top view of the thin-film magnetic head of the fourteenth embodiment of the invention.

FIG. 52 is a top view of the thin-film magnetic head of the embodiment manufactured through the foregoing process in the state in one of the manufacturing steps. FIG. 53 is a top view of the thin-film magnetic head of the embodiment manufactured through the foregoing process. FIG. 52 correspond to the state shown in FIG. 45A and FIG. 45B. In FIG. 53 the overcoat layer 220 is omitted. FIG. 53 shows the state before mechanical processing of the slider is performed. FIG. 43A to FIG. 51A are cross sections taken along line 51A—51A of FIG. 53. FIG. 43B to FIG. 51B are cross sections taken along line 51B—51B of FIG. 53.

As shown in FIG. 52 and FIG. 53, the bottom shield layer 203 extends from the regions facing the MR element 209 and their periphery to sides of the MR element 209. Portions of the bottom shield layer 203 pass through the regions facing the second region 204b of the top shield layer. Most of the remaining portions are placed around the region facing the two magnetic layers (the top shield layer 204a and 204b and the magnetic layers 213; and the top pole layer 219) of the induction-type magnetic transducer and the thin-film coils 212 and 216.

The bottom shield layer 203 and the first portion 204a of the top shield layer are placed in one plane, being insulated from each other. The grooves 205 are provided between the bottom shield layer 203 and the first portion 204a. Portions of the conductive layers 207 making up the leads connected to the MR element 209 that are close to the MR element 209 are placed in the grooves 205, being insulated. The remaining portions of the conductive layers 207 are placed along the inner lateral surface of the bottom shield layer 203, being insulated from the bottom shield layer 203.

In the embodiment, the bottom shield layer 203 and the first portion 204a of the top shield layer are placed in one plane, being insulated from each other. Portions of the conductive layers 207 making up the leads connected to the MR element 209 are placed in the grooves 205 provided between the bottom shield layer 203 and the first portion 204a, the portions of the conductive layers 207 being insulated by the insulating film 206 from the bottom shield layer 203 and the first portion 204a. As a result, according to the embodiment, an extremely high insulation property is achieved between the conductive layers 207 and the bottom shield layer 203 and the first portion 204a of the top shield layer. Although part of the conductive layers 207 faces the second portion 204b of the top shield layer with the bottom shield gap film 208a and the top shield gap film 208b in between, the most part of the conductive layers 207 does not face the top shield layer 204a and 204b. An extremely high insulation property is therefore achieved between the conductive layers 207 and the top shield layer 204a and 204b.

According to the embodiment, as thus described, an extremely high insulation property is achieved between the conductive layers 207 and the bottom shield layer 203 and the top shield layer 204a and 204b. It is therefore possible to prevent magnetic and electrical insulation faults between the conductive layers 207 and the bottom shield layer 203 and the top shield layer 204a and 204b.

According to the embodiment, the conductive layers 207 are not inserted between the bottom shield gap film 208a and the top shield gap film 208b. As a result, it is impossible that large areas of the conductive layers 207 face the bottom shield layer 203 and the top shield layer 204a and 204b with the bottom shield gap film 208a and the top shield gap film 208b in between. Therefore, although the bottom shield gap film 208a and the top shield gap film 208b are thin, the insulation property is maintained at a high level between the conductive layers 207 and the bottom shield layer 203 and between the conductive layers 207 and the top shield layer 204a and 204b.

According to the embodiment described so far, the insulation property is improved between the conductive layers connected to the MR element 209 and the bottom shield layer 203 and between the conductive layers and the top shield layer 204a and 204b without increasing the thickness of the bottom shield gap film 208a and the top shield gap film 208b.

According to the embodiment, the bottom shield gap film 208a and the top shield gap film 208b are made thin enough to improve the thermal asperity. The property of the reproducing head is thereby improved.

According to the embodiment, the conductive layers 207 are made thick enough so that the wiring resistance of the conductive layers connected to the MR element 209 is more greatly reduced. As a result, it is possible to detect with sensitivity a minute change in the output signal corresponding to a minute change in resistance of the MR element 209. The property of the reproducing head is improved in this respect, too.

In the embodiment, the lateral surfaces of the portions of the conductive layers 207 close to the MR element 209 and placed in the grooves 205 are shielded, being placed between the bottom shield layer 203 and the first portion 204a of the top shield layer. The top surfaces of the portions of the conductive layers 207 are shielded by the second portion 204b of the top shield layer. As a result, it is possible to reduce the effects of noises caused by internal factors such as magnetism and the like generated by the coil of the induction-type recording head or external factors such as the motor of the hard disk drive. The property of the reproducing head is improved in this respect, too.

According to the embodiment, the thin-film coil 212 of the first layer is placed between the first portion 204a of the top shield layer and the top pole layer 219, and placed next to the second portion 204b of the top shield layer, being parallel to the surfaces of the second portion 204b. As a result, the height of the apex, that is, the crest of the coil, is reduced and the pole layer (the top pole layer 219) that defines the track width of the recording head is reduced in size. The recording density is thereby increased and the recording head property is improved.

According to the embodiment, the thick insulating layer 211 is formed between the coils 212 and 216 and the first portion 204a of the top shield layer. As a result, a high insulation strength is achieved between the coils 212 and 216 and the top shield layer 204a and 204b. Magnetic flux leakage from the coils 212 and 216 is reduced as well.

[Fifteenth Embodiment]

Reference is now made to FIG. 54 to describe a fifteenth embodiment of the invention. FIG. 54 is a top view of a thin-film magnetic head of the embodiment. The overcoat layer is omitted in FIG. 54. FIG. 54 shows the state before mechanical processing of the slider is performed.

The thin-film magnetic head of the embodiment includes shield layers 221 for shielding at least portions of the conductive layers 207. The shield layers 221 cover the portions of the conductive layers 207 that do not face the second portion 204b of the top shield layer. Where the insulating layer 211 is provided, the shield layers 221 are formed on the insulating layer 211. The shield layers 221 are formed on the bottom shield gap film 208a where the insulating layer 211 is not provided.

In the step of making the top pole layer 219, the shield layers 221 may be formed at the same time through the use of the same magnetic material.

According to the embodiment, the shield layers 221 shield the top surfaces of the portions of the conductive layers 207 that do not face the second portion 204b of the top shield layer. As a result, the effects of noises on the conductive layers 207 are more greatly reduced, compared to the fourteenth embodiment.

The remainder of configuration, functions and effects of the embodiment are similar to those of the fourteenth embodiment.

[Sixteenth Embodiment]

Reference is now made to FIG. 55A to FIG. 60A, FIG. 55B to FIG. 60B, FIG. 61 and FIG. 62 to describe a composite thin-film magnetic head and a method of manufacturing the same of a sixteenth embodiment of the invention. FIG. 55A to FIG. 60A are cross sections each orthogonal to the air bearing surface of the thin-film magnetic head. FIG. 55B to FIG. 60B are cross sections each parallel to the air bearing surface of the pole portion of the head.

Figures 55A, 55B:
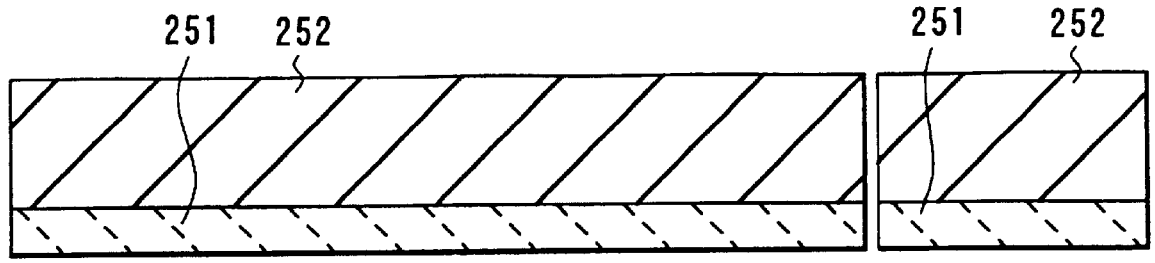
FIG. 55A and FIG. 55B are cross sections for illustrating a step in a method of manufacturing a thin-film magnetic head of a sixteenth embodiment of the invention.

In the method of the embodiment, as shown in FIG. 55A and FIG. 55B, an insulating layer 252 made of alumina ($Al_2O_3$), for example, of about 5 to 10 $\mu$m in thickness is deposited on a substrate 251 made of aluminum oxide and titanium carbide ($Al_2O_3$—TiC), for example.

Although not shown, a seed layer is made on the insulating layer 252 through sputtering Permalloy (NiFe). The seed layer is used for forming a bottom shield layer and part of a top shield layer-cum-bottom pole layer (called top shield layer in the following description) through plating.

Figures 56A, 56B:
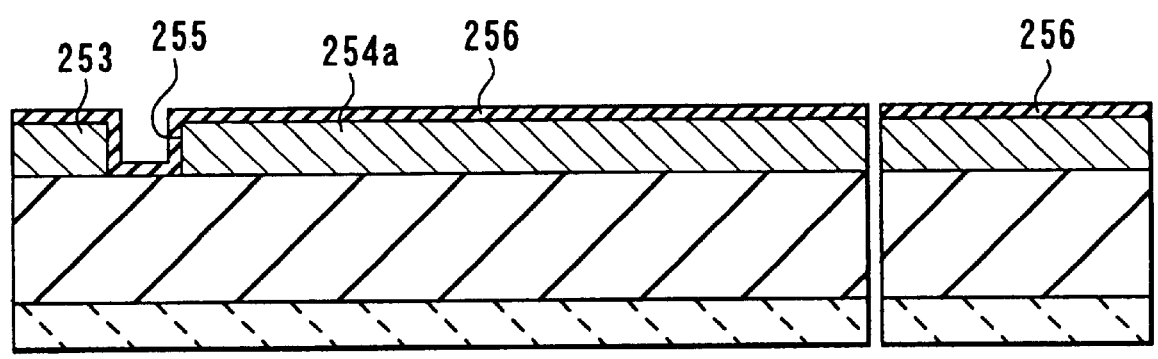
FIG. 56A and FIG. 56B are cross sections for illustrating a step that follows FIG. 55A and FIG. 55B.

Next, as shown in FIG. 56A and FIG. 56B, on the seed layer a magnetic material such as Permalloy (NiFe) is selectively deposited to a thickness of about 2 to 3 $\mu$m through plating with a photoresist film as a mask. A bottom shield layer 253 for the reproducing head and a portion (called a first portion in the following description) 254a of a top shield layer are thereby formed. Alternatively, the bottom shield layer 253 and the first portion 254a may be formed by sputtering a magnetic material and pattering the material through photolithography. The bottom shield layer 253 and the first portion 254a are formed in one plane, being insulated from each other by the photoresist. Between the bottom shield layer 253 and the first portion 254a, a pair of grooves 255 are formed in which at least portions of conductive layers to be connected to an MR element are placed. The bottom shield layer 253 corresponds to the first shield layer of the invention. The top shield layer corresponds to the second shield layer of the invention.

Next, part of the seed layer that covers the grooves 255 is selectively etched and removed. An insulating film 256 of alumina, for example, whose thickness is about 0.5 to 1 $\mu$m is formed through sputtering, for example, on the bottom shield layer 253 and the first portion 254a of the top shield layer including inside the grooves 255.

Figures 57A, 57B:
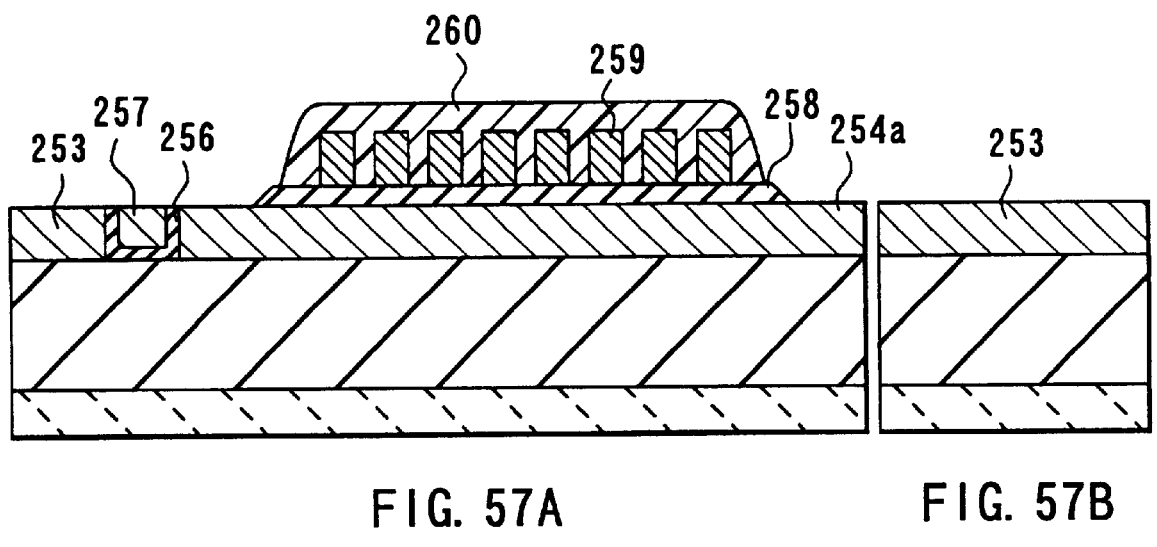
FIG. 57A and FIG. 57B are cross sections for illustrating a step that follows FIG. 56A and FIG. 56B.

Next, as shown in FIG. 57A and FIG. 55B, a pair of conductive layers 257 are made of coppers, for example, in the grooves 255 covered with the insulating film 256. The conductive layers 257 make up leads connected to the MR element. The conductive layers 257 may be formed by depositing copper to a thickness of about 3 $\mu$m through plating selectively in the grooves 255 with a photoresist film as a mask. Alternatively, the conductive layers 257 may be formed through sputtering.

Next, an insulating layer whose thickness is 2 to 3 $\mu$m made of alumina or silicon dioxide, for example, is formed on the entire surface. The insulating layer is then polished to the surfaces of the bottom shield layer 253, the first portion 254a of the top shield layer and the conductive layers 257 and flattened. The polishing method may be mechanical polishing or CMP. Through this flattening process, the surfaces of the bottom shield layer 253, the first portion 254a and the conductive layers 257 are exposed.

As thus described, the conductive layers 257 are formed through plating and precisely embedded in the grooves 255 between the bottom shield layer 253 and the first portion 254a of the top shield layer, the grooves 255 being fully covered with the insulating film 256 of 500 nm or above in thickness. As a result, an extremely high insulation property is obtained between the conductive layers 257 and the bottom shield layer 253 and the first portion 254a. It is therefore possible to prevent magnetic and electrical insulation faults between the conductive layers 257 and the bottom shield layer 253 and the first portion 254a due to particles or pinholes in the layers.

Next, an insulating film of alumina or silicon dioxide having a thickness of 0.5 to 1 $\mu$m is formed on the first portion 254a of the top shield layer. The insulating film is selectively etched through photolithography to form an insulating layer 258. The edge of the insulating layer 258 close to the pole portion is tapered. Next, a thin-film coil 259 for the recording head is made of copper, for example, through plating, for example, on the insulating layer 258. An insulating layer 260 of photoresist is formed into a specific pattern on the insulating layer 258 and the coil 259. The entire structure is then cured at a temperature of about 200° C.

Figures 58A, 58B:
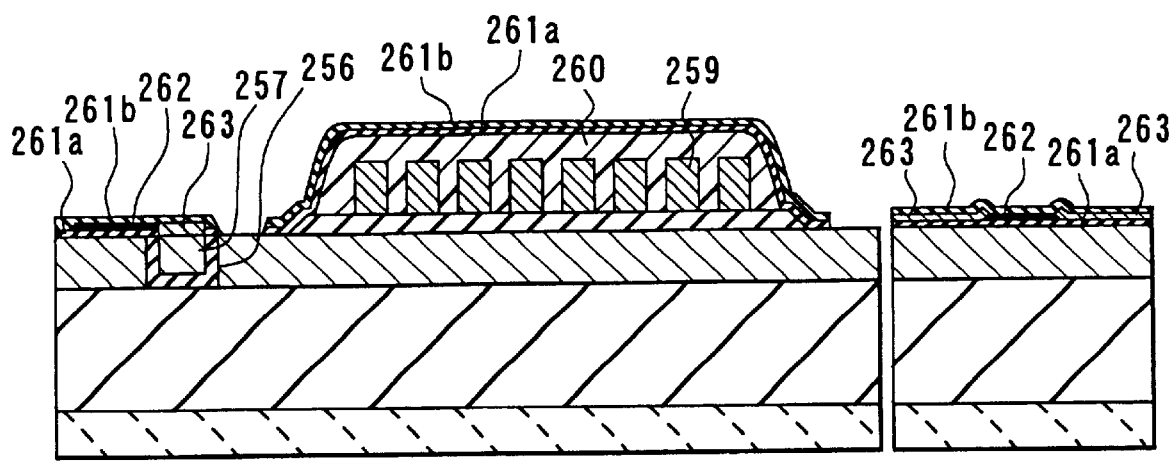
FIG. 58A and FIG. 58B are cross sections for illustrating a step that follows FIG. 57A and FIG. 57B.

Next, as shown in FIG. 58A and FIG. 58B, an insulating material such as aluminum nitride or alumina is sputtered to tens of nanometers over the entire surface to form a bottom shield gap film 261a. Before forming the bottom shield gap film 261a, a photoresist pattern in a T-shape, for example, is formed to facilitate liftoff where contact holes are to be formed for electrically connecting the conductive layers 257 to other conductive layers described later. After the bottom shield gap film 261a is formed, the contact holes are formed through lifting off the photoresist pattern. Alternatively, the contact holes may be formed by selectively etching the bottom shield gap film 261a through the use of photolithography.

Next, an MR film of tens of nanometers in thickness for forming an MR element 262 for reproduction is deposited through sputtering on the bottom shield gap film 261a. A photoresist pattern (not shown) is then selectively formed where the MR element 262 is to be formed on the MR film. The photoresist pattern may be T-shaped, for example, to facilitate liftoff. Next, the MR film is etched through argon-base ion milling, for example, with the photoresist pattern as a mask to form the MR element 262. The MR element 262 may be either a GMR element or an AMR element.

Next, on the bottom shield gap film 261a, a pair of conductive layers 263 of tens to hundreds of nanometers in thickness are formed through sputtering with the same photoresist pattern as a mask. The conductive layers 263 are to be electrically connected to the MR element 262. The conductive layers 263 may be formed through stacking TiW, CoPt, TiW, Ta, and Au, for example. The conductive layers 263 are electrically connected to the conductive layers 257 through the contact holes provided in the bottom shield gap film 261a. The conductive layers 263 and 257 make up the leads connected to the MR element 262.

Next, an insulating material such as aluminum nitride or alumina is sputtered to a thickness of tens of nanometers to form a top shield gap film 261b as an insulating layer. The MR element 262 is thus embedded in the shield gap films 261a and 261b. Next, the shield gap films 261a and 261b are selectively removed through dry etching with a photoresist pattern as a mask. A contact hole is thereby formed for connecting the first portion 254a to a second portion described later of the top shield layer. Another contact hole is thereby formed for making a magnetic path behind the coil 259 (that is, the right side of FIG. 58A).

Figures 59A, 59B:
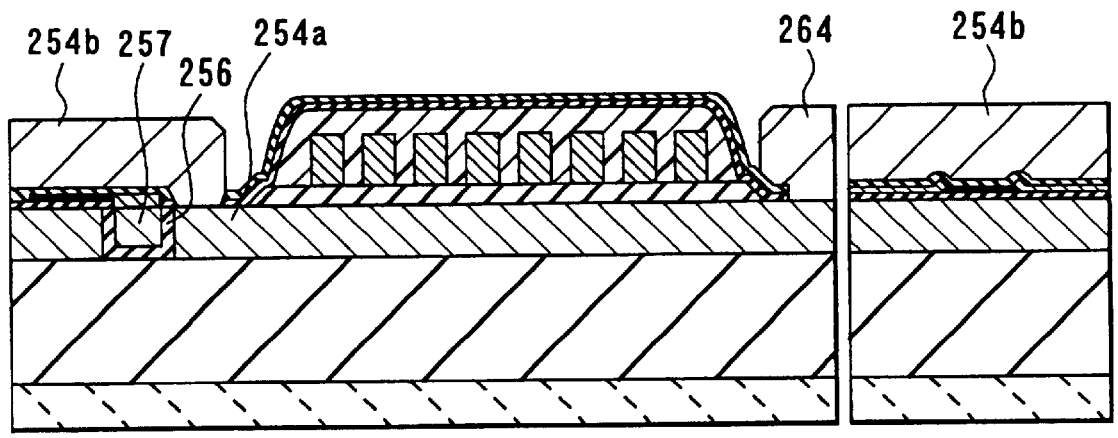
FIG. 59A and FIG. 59B are cross sections for illustrating a step that follows FIG. 58A and FIG. 58B.

Next, as shown in FIG. 59A and FIG. 59B, a second portion 254b of the top shield layer is formed on the side of the pole portion. The second portion 254b is made of a magnetic material and has a thickness of about 3.5 $\mu$m, for example, and is connected to the first portion 254a of the top shield layer. The second portion 254b is placed to face the bottom shield layer 253 with the MR element 262 in between. At the same time, a magnetic layer 264 for making the magnetic path is formed on the contact hole for making the magnetic path behind the thin-film coil 259. The magnetic layer 264 is made of a magnetic material and has a thickness of about 3.5 $\mu$m, for example. The second portion 254a of the top shield layer and the magnetic layer 264 are formed through plating, for example.

The bottom shield layer 253 and the top shield layer 254a and 254b may be made of NiFe (80 weight % Ni and 20 weight % Fe) or a high saturation flux density material such as NiFe (50 weight % Ni and 50 weight % Fe), Sendust, FeN or a compound thereof, or an amorphous of Fe—Co—Zr. The bottom shield layer 253 and the top shield layer 254a and 254b may be made of layers of two or more of those materials. Through the use of a high saturation flux density material for the bottom shield layer 253 and the top shield layer 254a and 254b, it is possible to reduce the effects of noises on the MR element 262 caused by internal factors such as magnetism and the like generated by the coil of the induction-type recording head or external factors such as the motor of the hard disk drive. A precise reproducing output is therefore achieved and a highly sensitive reproducing head is obtained.

Figures 60A, 60B:
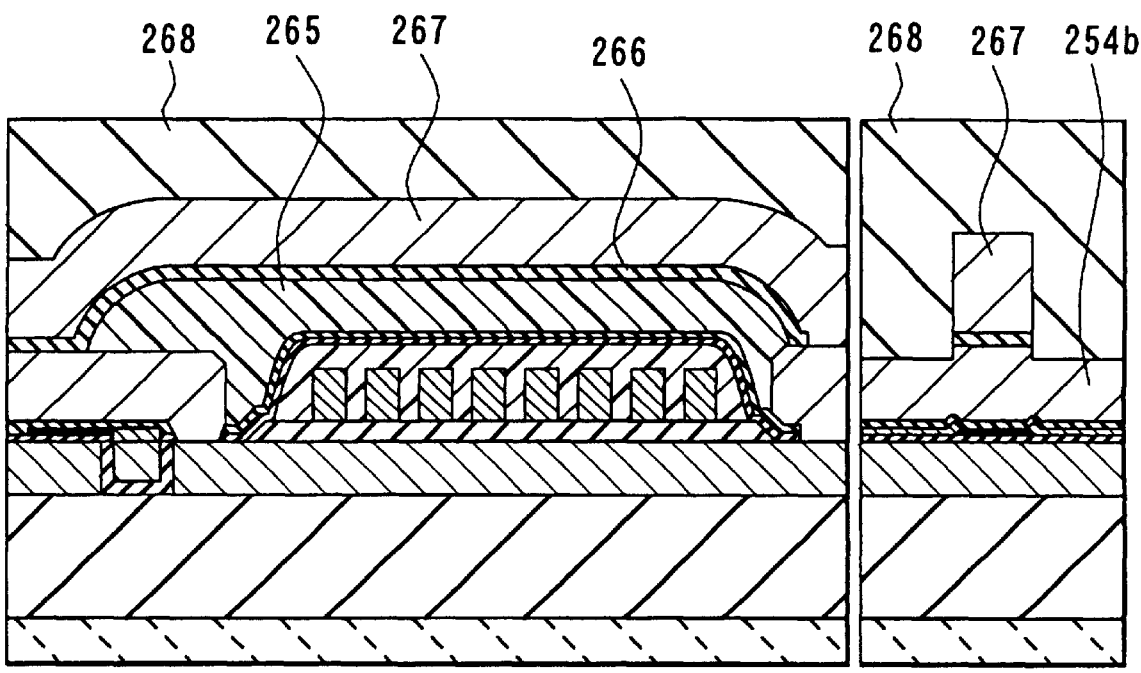
FIG. 60A and FIG. 60B are cross sections of the thin-film magnetic head of the sixteenth embodiment of the invention.

Next, as shown in FIG. 60A and FIG. 60B, an insulating layer 265 of photoresist is formed into a specific pattern over the coil 259. The entire structure is then cured at a temperature of about 200° C. The throat height is defined by the insulating layer 265 in the embodiment. Next, a recording gap layer 266 of about 300 nm in thickness made of an insulating film of alumina, aluminum nitride, or silicon dioxide, for example, is formed on the entire surface. The recording gap layer 266 on the top surface of the magnetic layer 264 is then partially etched to form a contact hole for making the magnetic path.

Next, a top pole layer 267 of about 3 to 4 $\mu$m in thickness is formed on the recording gap layer 266. The top pole layer 267 determines the track width of the induction recording head. The top pole layer 267 may be formed through plating with NiFe (50 weight % Ni and 50 weight % Fe), or through sputtering a high saturation flux density material such as FeN or a compound thereof and then patterning. Besides the above examples, the material of the top pole layer 267 may be NiFe (80 weight % Ni and 20 weight % Fe) or a high saturation flux density material such as an amorphous of Fe—Co—Zr. Alternatively, the top pole layer 267 may be layers of two or more of the above materials. The top pole layer 267 made of a high saturation flux density material allows the magnetic flux generated by the coil 259 to effectively reach the pole portion without saturating before reaching the pole. A recording head that achieves high recording density is therefore obtained.

Next, part of the recording gap layer 266 on both sides of the top pole layer 267 is removed through dry etching. The exposed second portion 254b of the top shield layer is then etched through ion milling by about 0.5 $\mu$m, for example, with the top pole layer 267 as a mask so as to form a trim structure.

Next, an overcoat layer 268 of alumina, for example, whose thickness is about 30 to 40 $\mu$m is formed to cover the top pole layer 267. Finally, machine processing of the slider is performed and the air bearing surface of the recording head and the reproducing head is formed. The thin-film magnetic head is thus completed.

The top shield layer (bottom pole layer) 254a and 254b, the magnetic layer 264, the top pole layer 267, and the thin-film coil 259 correspond to the induction-type magnetic transducer of the invention. That is, the top shield layer (bottom pole layer) 254a and 254b and the magnetic layer 264 correspond to one of the two magnetic layers of the recording head of the invention. The top pole layer 267 corresponds to the other of the two magnetic layers.

Figure 61:
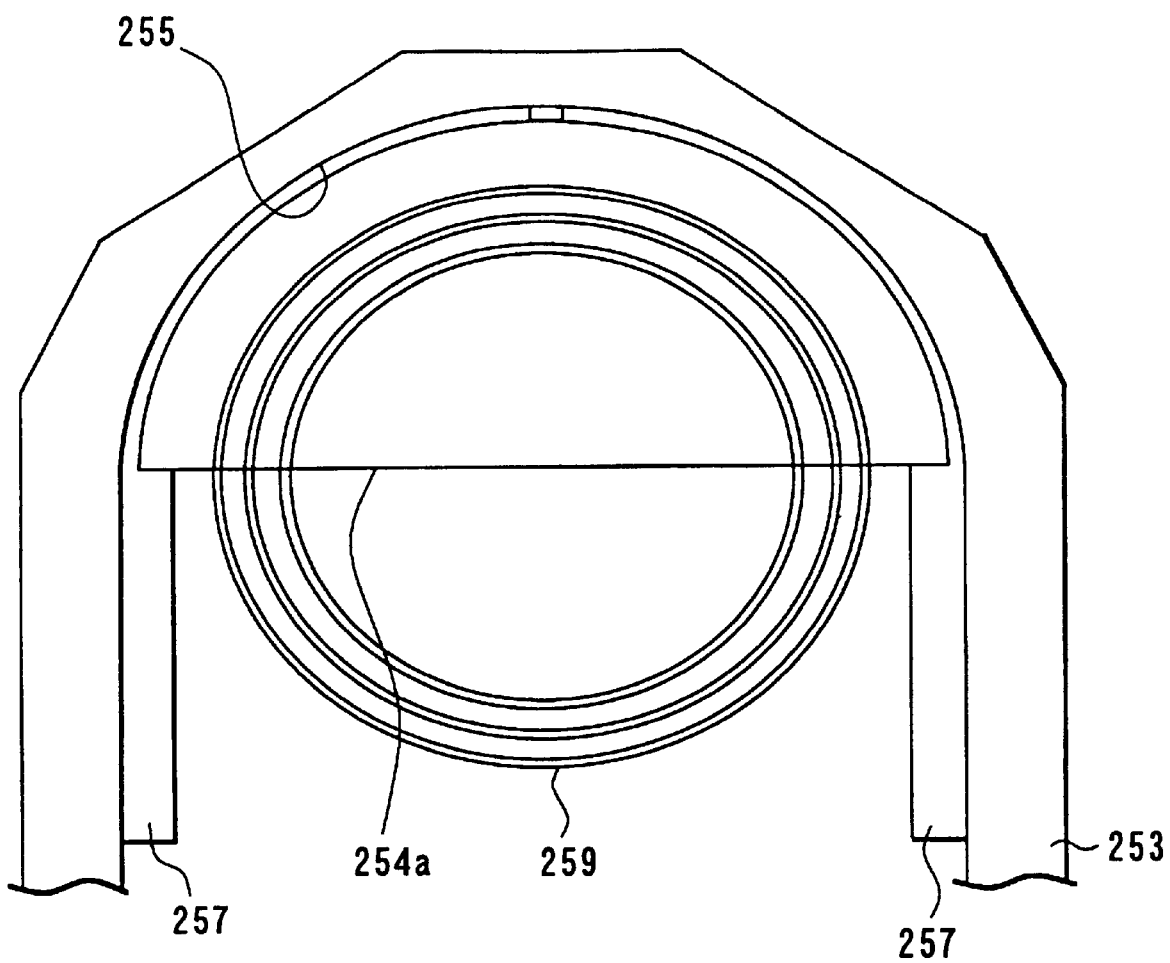
FIG. 61 is a top view of the thin-film magnetic head of the sixteenth embodiment of the invention in the state in one of the manufacturing steps.
Figure 62:
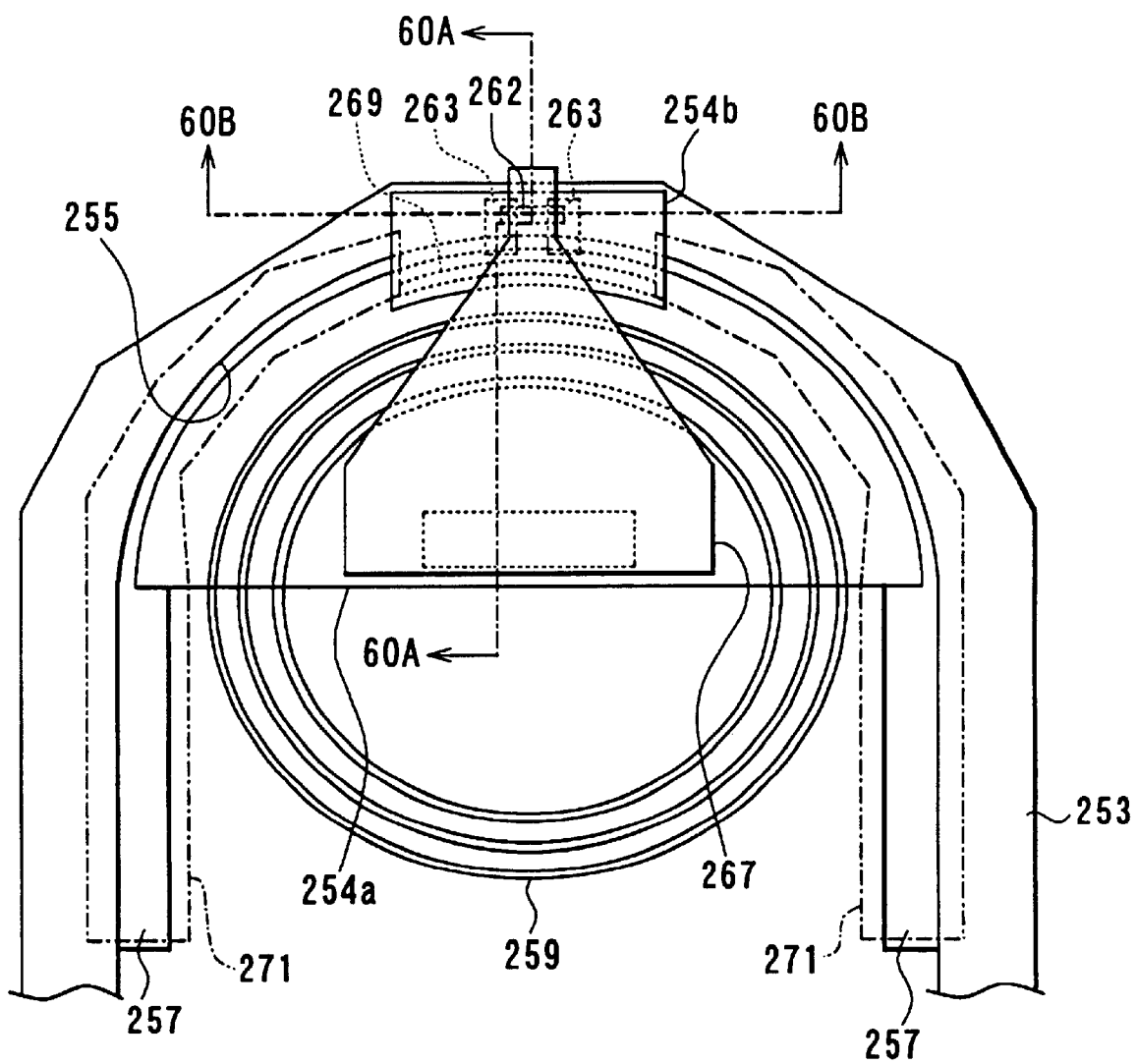
FIG. 62 is a top view of the thin-film magnetic head of the sixteenth embodiment of the invention.

FIG. 61 is a top view of the thin-film magnetic head of the embodiment manufactured through the foregoing process in the state in one of the manufacturing steps. FIG. 62 is a top view of the thin-film magnetic head of the embodiment manufactured through the foregoing process. FIG. 61 corresponds to the state shown in FIG. 57A and FIG. 57B. In FIG. 62 the overcoat layer 268 is omitted. FIG. 62 shows the state before mechanical processing of the slider is performed. Numeral 269 of FIG. 62 indicates the contact hole for connecting the second portion 254b to the first portion 254a of the top shield layer. FIG. 55A to FIG. 60A are cross sections taken along line 60A—60A of FIG. 62. FIG. 55B to FIG. 60B are cross sections taken along line 60B—60B of FIG. 62.

As shown in FIG. 62, in this embodiment, too, as in the fifteenth embodiment, shield layers 271 may be provided for shielding at least portions of the conductive layers 257. The shield layers 271 cover portions of the conductive layers 257 that do not face the second portion 254b of the top shield layer. In the step of forming the top pole layer 267, for example, the shield layers 271 may be made of the same material as the top pole layer 267 at the same time.

As in the fourteenth embodiment, the bottom shield layer 253 and the first portion 254a of the top shield layer are placed in one plane, being insulated from each other. The portions of the conductive layers 257 making up the leads connected to the MR element 262 are placed in the grooves 255 provided between the bottom shield layer 253 and the first portion 254a, being insulated by the insulating film 256 from the bottom shield layer 253 and the first portion 254a. As a result, the embodiment provides the effects similar to those of the fourteenth embodiment.

Many customers of thin-film magnetic heads order the track width of a reproducing head and the throat height and the track width of a recording head that suit their own products. However, if thin-film magnetic heads that meet the specifications a customer requires are manufactured after an order is received, it is difficult to supply the products in a short time after the receipt of the order.

According to the embodiment, as shown in FIG. 57A and FIG. 57B, the common base body of the thin-film magnetic head is completed in the step of forming the coil 259 (the formation of the insulating layer 260 in the embodiment). Therefore, according to the embodiment, the intermediate product having gone through the manufacturing steps as far as the step of forming the coil 259 may be mass-produced so that many intermediate products in stock are obtained. Such intermediate products in stock having been increased so that they are plentiful enough to be supplied to customers, the specifications of the thin-film magnetic heads may be determined to meet different customers' demands. Therefore, the embodiment allows the appropriate number of intermediate products in stock to be obtained. Such intermediate products have gone through 50 to 60 percent of the entire manufacturing steps and many of them have passed an inspection as conforming products. It is therefore possible to produce thin-film magnetic heads that meet the specifications required by the customer in a short time after receipt of an order. According to the embodiment, noncorforming intermediate products have been already eliminated so that it is possible to make conforming intermediate products into complete products as soon as possible in accordance with customers' demands. High quality of the products is therefore achieved and the yields of the finished products improve.

The remainder of configuration, functions and effects of the embodiment are similar to those of the fourteenth or fifteenth embodiment.

[Seventeenth Embodiment]

Figures 63A, 63B:
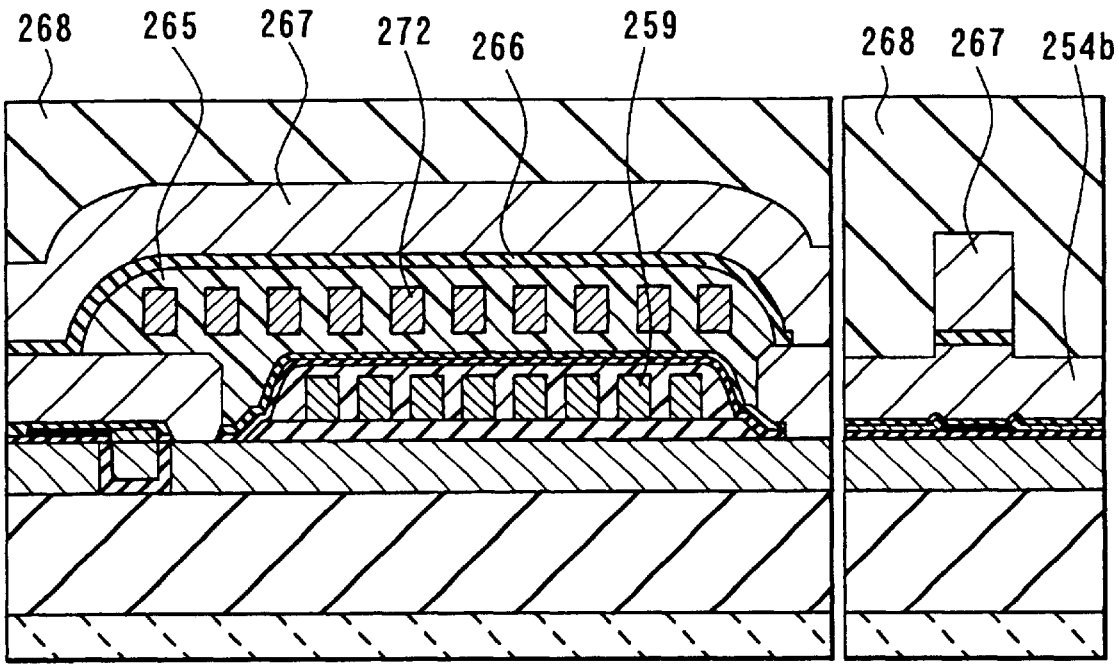
FIG. 63A and FIG. 63B are cross sections of a thin-film magnetic head of a seventeenth embodiment of the invention.

Reference is now made to FIG. 63A and FIG. 63B to describe a seventeenth embodiment of the invention. FIG. 63A is a cross section of a thin-film magnetic head of the embodiment orthogonal to the air bearing surface. FIG. 63B is a cross section of the pole portion of the thin-film magnetic head parallel to the air bearing surface. FIG. 63A shows the state before mechanical processing of the slider is performed.

In the thin-film magnetic head of the embodiment, a thin-film coil 272 of a second layer is formed in the insulating layer 265 made of photoresist of the thin-film magnetic head of the sixteenth embodiment. In this case, the insulating layer 265 of photoresist having a specific thickness is formed over the coil 259. The coil 272 is then formed through plating, for example. The insulating layer 265 is further formed to cover the coil 272. The throat height is defined by the insulating layer 265 in the embodiment.

The remainder of configuration, functions and effects of the embodiment are similar to those of the sixteenth embodiment.

[Eighteenth Embodiment]

Reference is now made to FIG. 64A to FIG. 66A, FIG. 64B to FIG. 66B, FIG. 67 and FIG. 68 to describe a composite thin-film magnetic head and a method of manufacturing the same of an eighteenth embodiment of the invention. FIG. 64A to FIG. 66A are cross sections each orthogonal to the air bearing surface of the thin-film magnetic head. FIG. 64B to FIG. 66B are cross sections each parallel to the air bearing surface of the pole portion of the head. The method of manufacturing the thin-film magnetic head of the embodiment is similar to that of the sixteenth embodiment as far as the step of forming the coil 259. The intermediate products having reached the step are mass-produced and gone through an inspection. An appropriate amount of conforming intermediate products are obtained.

Figures 64A, 64B:
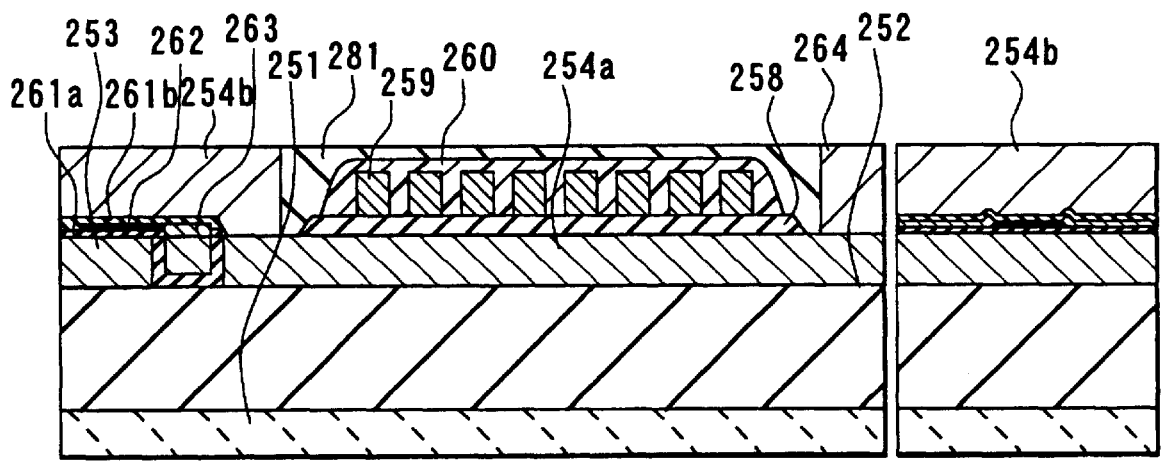
FIG. 64A and FIG. 64B are cross sections for illustrating a step in a method of manufacturing a thin-film magnetic head of an eighteenth embodiment of the invention.

In this embodiment, in order to complete the product to meet the customer's demands, the MR element (an AMR element or a GMR element, and so on) and the material of the shield gap film (alumina, aluminum nitride or boron nitride and so on) are selected and the track width of the reproducing head and the throat height and the track width of the recording head are determined in accordance with the customer's requests. As shown in FIG. 64A and FIG. 64B, the shield gap films 261a and 261b, the MR element 262 and the conductive layers 263 are then formed. Next, the second portion 254b of the top shield layer and the magnetic layer 264 are formed. An insulating layer 281 of alumina, for example, having a thickness of 3 to 4 μm is then formed over the entire surface. The entire surface is then polished through CMP, for example, so that the surfaces of the second portion 254b and the magnetic layer 264 are exposed.

Figures 65A, 65B:
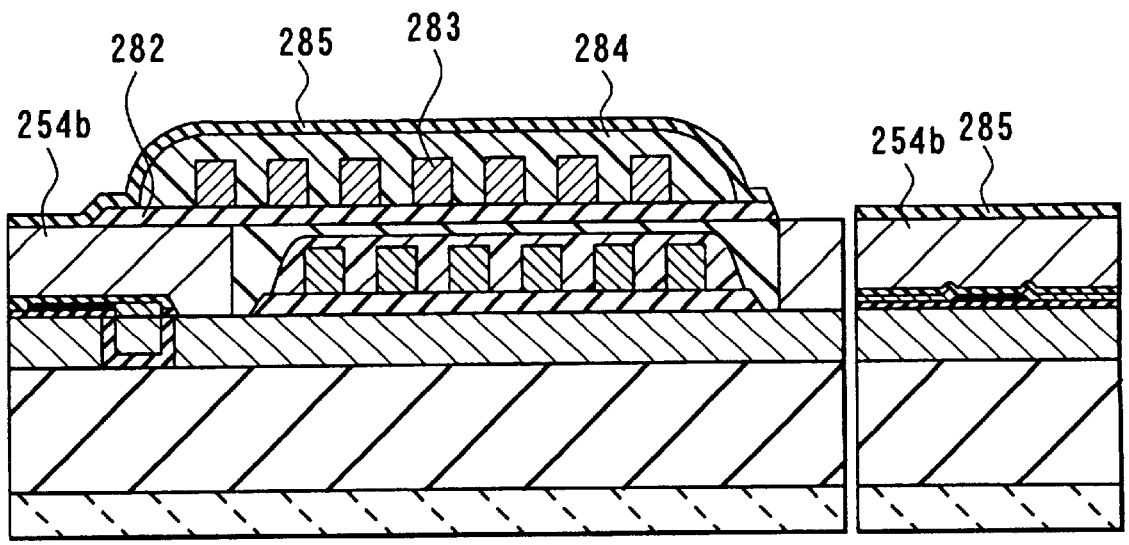
FIG. 65A and FIG. 65B are cross sections for illustrating a step that follows FIG. 64A and FIG. 64B.

Next, as shown in FIG. 65A and FIG. 65B, on the second portion 254b of the top shield layer and the insulating layer 281, an insulating layer 282 of alumina, for example, that defines the throat height of the recording head is formed. Next, a thin-film coil 283 of a second layer is formed on the insulating layer 282. An insulating layer 284 of photoresist is then formed into a specific pattern on the insulating layer 282 and the coil 283. Next, a recording gap layer 285 made of an insulating film of alumina, for example, is formed. The portion of the recording gap layer 285 on the magnetic layer 264 is then selectively removed to form a contact hole for making a magnetic path.

Figures 66A, 66B:
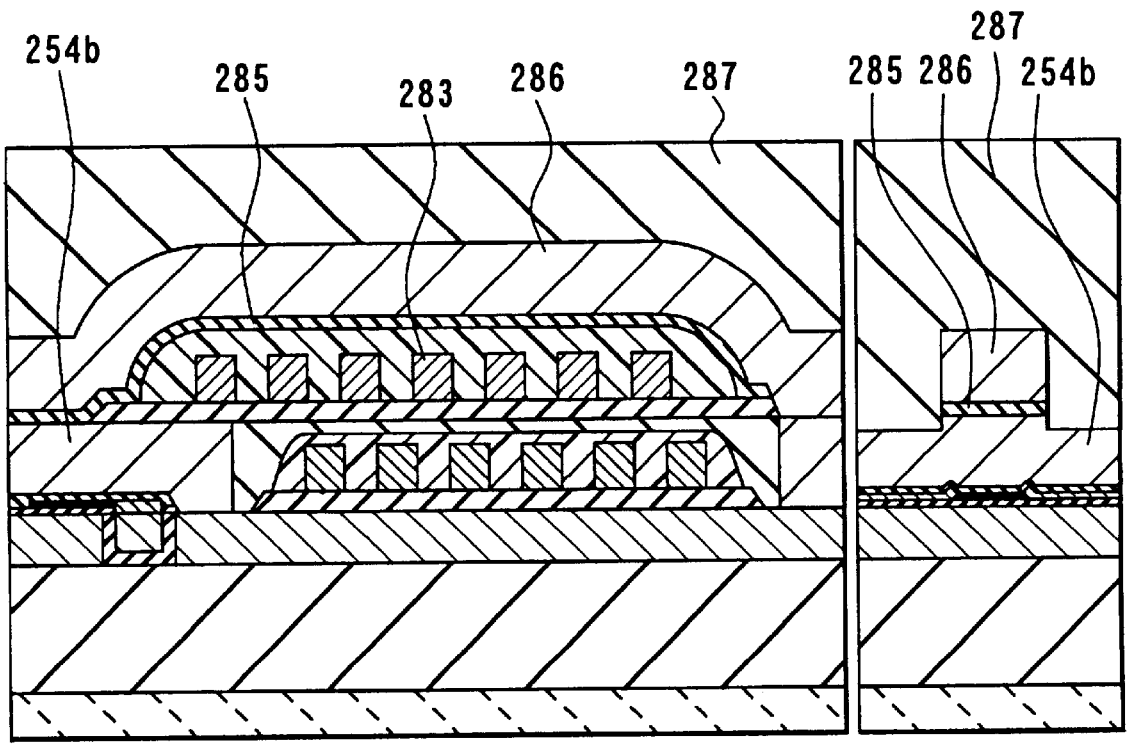
FIG. 66A and FIG. 66B are cross sections of the thin-film magnetic head of the eighteenth embodiment of the invention.

Next, as shown in FIG. 66A and FIG. 66B, a top pole layer 286 is formed on the recording gap layer 285. The top pole layer 286 defines the track width of the induction-type recording head. Next, the recording gap layer 285 on sides of the top pole layer 286 is removed through dry etching such as reactive ion etching. The exposed second portion 254b of the top shield layer is etched through ion milling and the like with the top pole layer 286 as a mask. A trim structure is thereby formed.

Next, an overcoat layer 287 of alumina, for example, whose thickness is about 3 to 5 $\mu$m is formed to cover the top pole layer 286. Finally, machine processing of the slider is performed and the air bearing surface of the recording head and the reproducing head is formed. The thin-film magnetic head is thus completed.

Figure 67:
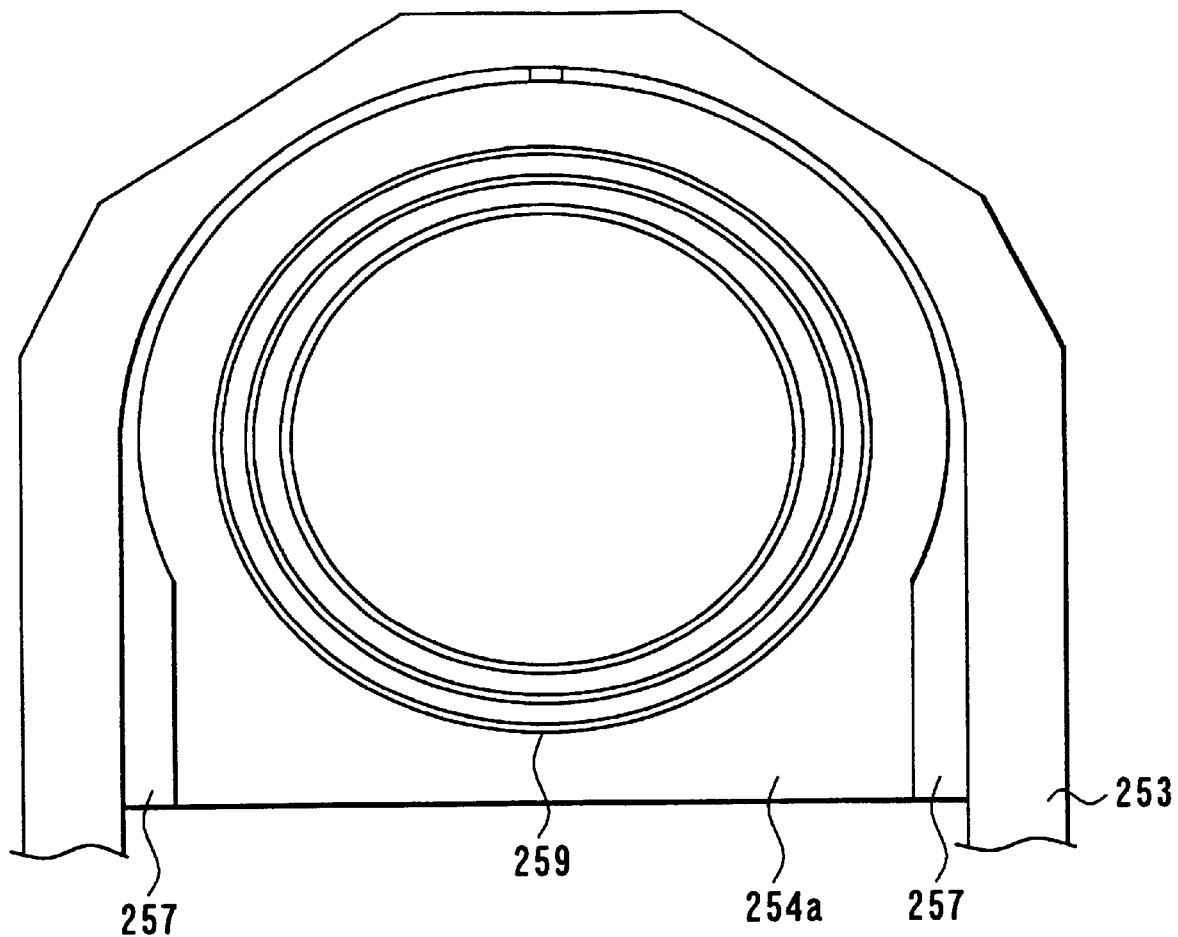
FIG. 67 is a top view of the thin-film magnetic head of the eighteenth embodiment of the invention in the state in one of the manufacturing steps.

FIG. 67 is a top view of the thin-film magnetic head of the embodiment manufactured through the foregoing process in the state in one of the manufacturing steps. In the embodiment, as shown in FIG. 67, the first portion 254a of the top shield layer is provided in the region corresponding to the entire coil 259.

Figure 68:
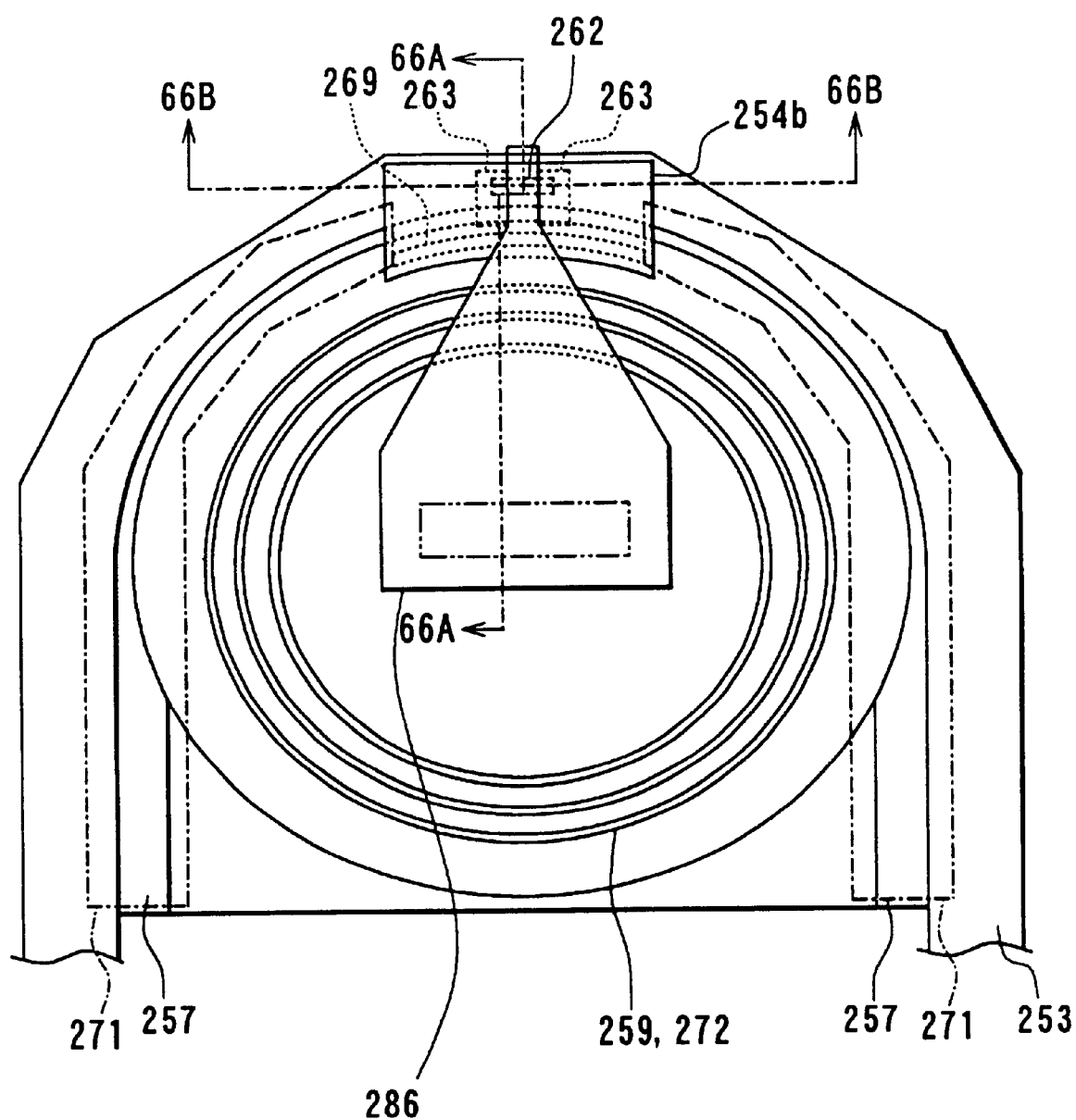
FIG. 68 is a top view of the thin-film magnetic head of the eighteenth embodiment of the invention.

FIG. 68 is a top view of the thin-film magnetic head of the embodiment manufactured through the foregoing process. In FIG. 68 the overcoat layer 287 is omitted. FIG. 68 shows the state before mechanical processing of the slider is performed. Numeral 269 of FIG. 68 indicates the contact hole for connecting the second portion 254b to the first portion 254a of the top shield layer. FIG. 64A to FIG. 66A are cross sections taken along line 66A—66A of FIG. 68. FIG. 64B to FIG. 66B are cross sections taken along line 66B—66B of FIG. 68.

As shown in FIG. 68, in this embodiment, too, as in the fifteenth embodiment, the shield layers 271 may be provided for shielding at least portions of the conductive layers 257. The shield layers 271 cover the portions of the conductive layers 257 that do not face the second portion 254b of the top shield layer. In the step of forming the top pole layer 286, for example, the shield layers 271 may be made of the same material as the top pole layer 286 at the same time.

The remainder of configuration, functions and effects of the embodiment are similar to those of the sixteenth embodiment.

In the fourteenth to eighteenth embodiments the first shield layer and part of the second shield layer are formed in one plane. At least portions of the conductive layers connected to the MR element are placed in the grooves provided between the first shield layer and part of the second shield layer, being insulated form the first and second shield layers. As a result, according to the embodiments, the insulation property is improved between the conductive layers and each shield layer. Furthermore, since the conductive layers are not placed between the shield layers with insulating layers in between, the insulation property is improved between each shield layer and the conductive layers connected to the MR element without increasing the thickness of the insulating layer between the MR element and each shield layer. According to the embodiments, it is possible to make the conductive layers sufficiently thick. The wiring resistance of the conductive layers is thereby reduced. According to the embodiments, the portions of the conductive layers placed in the grooves are shielded, being placed between the shield layers. The effects of noises on the conductive layers are thereby reduced.

The second shield layer may also function as one of the two magnetic layers of the induction magnetic transducer for writing. At the same time, at least part of the thin-film coil may be placed between the first portion of the second shield layer and the other of the two magnetic layers, and placed next to the second portion of the second shield layer, being parallel to the surfaces of the second portion. In this case the height of the crest of the coil is reduced and the pole that defines the track width of the recording head is reduced in size.

If the shield layers are provided for shielding at least portions of the conductive layers, the effects of noises on the conductive layers are further reduced.

[Nineteenth Embodiment]

Reference is now made to FIG. 69A to FIG. 80A, FIG. 69B to FIG. 80B, FIG. 81 and FIG. 82 to describe a composite thin-film magnetic head and a method of manufacturing the same of a nineteenth embodiment of the invention. FIG. 69A to FIG. 80A are cross sections each orthogonal to the air bearing surface of the thin-film magnetic head. FIG. 69B to FIG. 80B are cross sections each parallel to the air bearing surface of the pole portion of the head. The following description applies to a magnetic head material and a method of manufacturing the same of the embodiment as well.

Figures 69A, 69B:
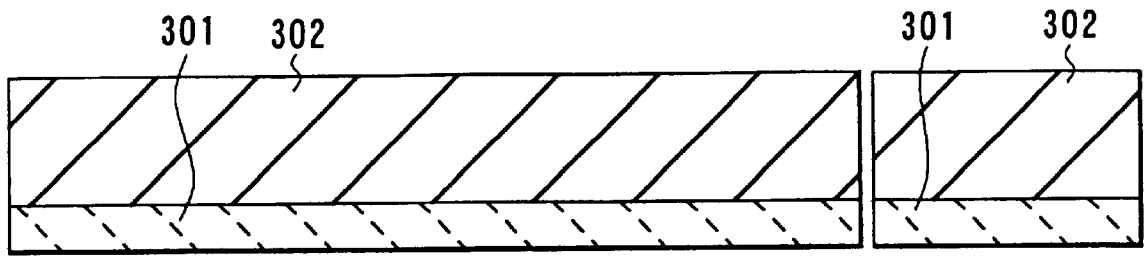
FIG. 69A and FIG. 69B are cross sections for illustrating a step in a method of manufacturing a thin-film magnetic head of a nineteenth embodiment of the invention.

In the method of the embodiment, as shown in FIG. 69A and FIG. 69B, an insulating layer 302 made of alumina ($Al_2O_3$), for example, of about 10 $\mu$m in thickness is deposited on a substrate 301 made of aluminum oxide and titanium carbide ($Al_2O_3$—TiC), for example. The substrate 301 and the insulating layer 302 correspond to a base body of the invention.

Figures 70A, 70B:
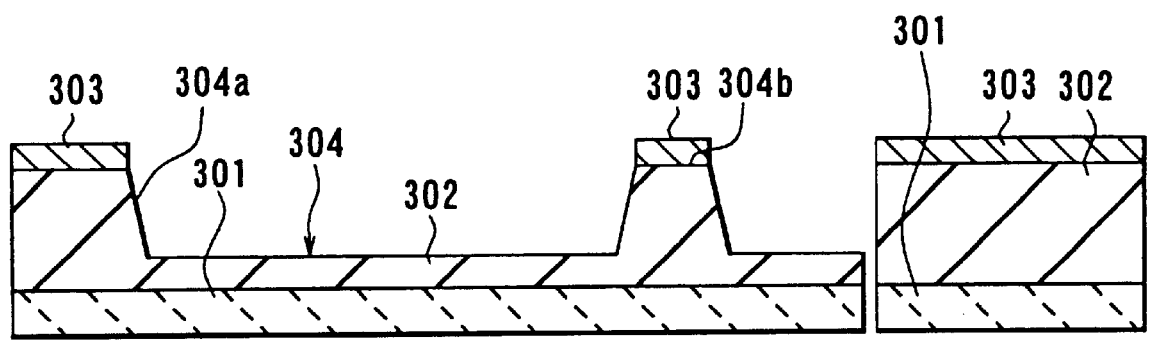
FIG. 70A and FIG. 70B are cross sections for illustrating a step that follows FIG. 69A and FIG. 69B.

Next, as shown in FIG. 70A and FIG. 70B, a metal mask 303 of a specific pattern is formed on the insulating layer 302 to form a concave in the insulating layer 302. The metal mask 303 may be made of Permalloy (NiFe) through plating. The insulating layer 302 is then etched by about 7 to 8 $\mu$m through dry etching such as reactive ion etching with the metal mask 303 as a mask to form a concave 304. An etching gas used for reactive ion etching may be any of $BCl_3$, $Cl_2$, $CF_4$, $SF_6$ and so on. In the embodiment, the angle of the pole-portion-side slope 304a of the concave 304 defines the apex angle that influences the property of the recording head. The angle of the slope 304a is defined by the etching profile of the insulating layer 302. The angle of the slope 304a is preferably 45 to 70 degrees.

The concave 304 is formed into the shape of a ring where a thin-film coil described later will be placed. Therefore, in the insulating layer 302, an insular portion 304b surrounded by the concave 304 is formed.

Figures 71A, 71B:
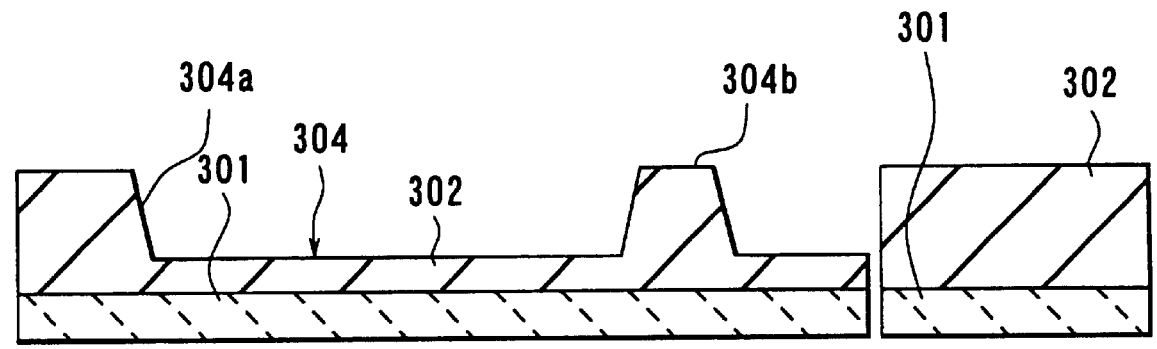
FIG. 71A and FIG. 71B are cross sections for illustrating a step that follows FIG. 70A and FIG. 70B.

Next, as shown in FIG. 71A and FIG. 71B, the metal mask 303 is removed. Next, although not shown, a seed layer is made on the insulating layer 302 through sputtering Permalloy (NiFe). The seed layer is used for forming a bottom shield layer and part of a top shield layer-cum-bottom pole layer (called top shield layer in the following description) through plating.

Next, as shown in FIG. 72A and FIG. 72B, on the seed layer a magnetic material such as Permalloy (NiFe) is selectively deposited to a thickness of about 2 to 4 $\mu$m through plating with a photoresist film as a mask. A bottom shield layer 305 for the reproducing head and a portion (called a first portion in the following description) 306a of a top shield layer are thereby formed at the same time in one manufacturing step.

On the insulating layer 302 the bottom shield layer 305 is placed in the portion including at least the pole portion except the concave 304. On the insulating layer 302 the first portion 306a of the top shield layer is placed along the inner surface of the concave 304 and outside the concave 304 around the edge of the concave 304 and on the insular portion 304b. A pair of grooves 307 are formed between the bottom shield layer 305 and the first portion 306a of the top shield layer. In the grooves 307 at least portions of a pair of conductive layers to be connected to an MR element are to be placed. The seed layer in the grooves is removed by dry etching such as ion milling so as to electrically and magnetically insulate the bottom shield layer 305 from the first portion 306a. Alternatively, the bottom shield layer 305 and the first portion 306a may be formed by sputtering a magnetic material over the entire surface of the insulating layer 302 and performing dry etching such as argon-base ion milling with a photoresist film as a mask. The bottom shield layer 305 corresponds to the first shield layer of the invention. The top shield layer corresponds to the second shield layer of the invention.

Next, as shown in FIG. 73A and FIG. 73B, an insulating film 308 of alumina, for example, whose thickness is about 0.5 to 1 μm is formed through sputtering, for example, on the bottom shield layer 305 and the first portion 306a of the top shield layer including inside the grooves 307. Next, in one manufacturing step through the use of the same material such as copper, for example, a pair of conductive layers 309 to make up leads connected to the MR element are made in the grooves 307 covered with the insulating film 308 and a thin-film coil 310 of a first layer for the recording head is formed on the insulating layer 308 in the concave 304. The conductive layers 309 and the coil 310 may be formed by plating copper with a photoresist film as a mask. Alternatively, the conductive layers 309 and the coil 310 may be formed through sputtering.

As thus described, the conductive layers 309 are formed through plating and precisely embedded in the grooves 307 between the bottom shield layer 305 and the first portion 306a of the top shield layer, the grooves 307 being fully covered with the insulating film 308 of 500 nm or above in thickness. As a result, an extremely high insulation property is obtained between the conductive layers 309 and the bottom shield layer 305 and the first portion 306a. It is therefore possible to prevent magnetic and electrical insulation faults between the conductive layers 309 and the bottom shield layer 305 and the first portion 306a due to particles or pinholes in the layers.

Next, an insulating layer 311 made of photoresist is formed on the insulating film 308 and the coil 310 in the concave 304. Next, a thin-film coil 312 of a second layer is formed on the insulating layer 311 in the concave 304. The coil 312 may be made of copper through plating with a photoresist film as a mask. Alternatively, the coil 312 may be formed through sputtering. Next, an insulating layer 313 of photoresist is formed on the insulating layer 311 and the coil 312 in the concave 304. The entire structure is then annealed at a temperature of about 200 to 250° C.

Although the conductive layers 309 are formed at the same time as the thin-film coil 310 of the first layer in the above description, the conductive layers 309 may be formed at the same time as the thin-film coil 312 of the second layer.

Next, as shown in FIG. 74A and FIG. 74B, an insulating layer 314 of alumina or silicon dioxide, for example, whose thickness is about 3 to 4 μm is formed on the entire surface.

Next, as shown in FIG. 75A and FIG. 75B, the insulating layer 314 and the insulating film 308 below are then polished to the surfaces of the bottom shield layer 305, the first portion 306a of the top shield layer, the conductive layers 309 and part (not shown) of the coil 312 and flattened. The polishing method may be mechanical polishing or CMP. Through this flattening process, the surfaces of the bottom shield layer 305, the first portion 306a, the conductive layers 309 and the part of the coil 312 are exposed and brought to the same plane as the surface of the insulating layer 314. Through the flattening process, the thickness of the insulating layer 314 covering the coils 310 and 312 in the concave 304 is controlled so that the thickness is about 3 μm.

Through the flattening process, the surface of the bottom shield layer 305 is made smooth. It is thereby possible to precisely form the MR element. As a result, the high frequency characteristic of reproducing output is improved, for example.

The intermediate product shown in FIG. 75A and FIG. 75B is the thin-film magnetic head material of the embodiment. The intermediate product includes the bottom shield layer 305, the first portion 306a of the top shield layer, the conductive layers 309 and the thin-film coils 310 and 312.

Next, as shown in FIG. 76A and FIG. 76B, an insulating material such as aluminum nitride or alumina is sputtered to tens of nanometers over the entire surface to form a bottom shield gap film 315a as an insulating layer. Before forming the bottom shield gap film 315a, a photoresist pattern in a T-shape, for example, is formed to facilitate liftoff where contact holes are to be formed for electrically connecting the conductive layers 309 to other conductive layers described later. After the bottom shield gap film 315a is formed, the contact holes are formed through lifting off the photoresist pattern. Alternatively, the contact holes may be formed by selectively etching the bottom shield gap film 315a through the use of photolithography.

Next, an MR film of tens of nanometers in thickness for forming an MR element 316 for reproduction is deposited through sputtering on the bottom shield gap film 315a. A photoresist pattern (not shown) is then selectively formed where the MR element 316 is to be formed on the MR film. The photoresist pattern may be T-shaped, for example, to facilitate liftoff. Next, the MR film is etched through argon-base ion milling, for example, with the photoresist pattern as a mask to form the MR element 316. The MR element 316 may be either a GMR element or an AMR element.

Next, on the bottom shield gap film 315a, a pair of conductive layers 317 of tens to hundreds of nanometers in thickness are formed through sputtering with the same photoresist pattern as a mask. The conductive layers 317 are to be electrically connected to the MR element 316. The conductive layers 317 may be formed through stacking TiW, CoPt, TiW, Ta, and Au, for example. The conductive layers 317 are electrically connected to the conductive layers 309 through the contact holes provided in the bottom shield gap film 315a. The conductive layers 317 and 309 make up the leads connected to the MR element 316.

Next, an insulating material such as aluminum nitride or alumina is sputtered to a thickness of 50 to 100 nanometers to form a top shield gap film 315b as an insulating layer. The MR element 316 is thus embedded in the shield gap films 315a and 315b. Next, the shield gap films 315a and 315b are selectively removed through dry etching such as reactive ion etching using a $BCl_3$-base gas or a $CF_4$-base gas with a photoresist pattern as a mask. A contact hole is thereby formed for connecting the first portion 306a to a second portion described later of the top shield layer. Another contact hole is thereby formed for making a magnetic path on the insular portion 304b. Alternatively, the contact hole for connecting the first portion 306a to the second portion of the top shield layer and the contact hole for making the magnetic path may be formed through a liftoff process by forming photoresist patterns where the contact holes are to be formed, in the step of forming the shield gap films 315a and 315b.

Next, as shown in FIG. 77A and FIG. 77B, a second portion 306b of the top shield layer is formed on the side of the pole portion. The second portion 306b is made of a magnetic material and has a thickness of about 3.5 µm, for example, and is connected to the first portion 306a of the top shield layer. The second portion 306b is placed to face the bottom shield layer 305 with the MR element 316 in between. At the same time, a magnetic layer 318 for making the magnetic path is formed in the contact hole for making the magnetic path on the insular portion 304b. The magnetic layer 318 is made of a magnetic material and has a thickness of about 3.5 µm. The second portion 306b of the top shield layer and the magnetic layer 318 are formed through plating, for example.

The bottom shield layer 305 and the top shield layer 306a and 306b may be made of NiFe (80 weight % Ni and 20 weight % Fe) or a high saturation flux density material such as NiFe (50 weight % Ni and 50 weight % Fe), Sendust, FeN or a compound thereof, or an amorphous of Fe—Co—Zr. The bottom shield layer 305 and the top shield layer 306a and 306b may be made of layers of two or more of those materials. Through the use of a high saturation flux density material for the bottom shield layer 305 and the top shield layer 306a and 306b, it is possible to reduce the effects of noises on the MR element 316 caused by internal factors such as magnetism and the like generated by the coil of the induction-type recording head or external factors such as the motor of the hard disk drive. A precise reproducing output is therefore achieved and a highly sensitive reproducing head is obtained.

Next, a thin-film coil 319 of a third layer is formed on the bottom shield gap film 315a on the coils 310 and 312. The coil 319 may be made of copper through plating with a photoresist film as a mask. Alternatively, the coil 319 may be formed through sputtering.

Next, in the second portion 306b of the top shield layer, a step 320 is formed by etching a portion behind the point defining the throat height (that is, a portion far from the air bearing surface) by about 0.5 to 1 µm. In the embodiment the throat height is defined by the edge of the step 320 closer to the air bearing surface.

Figures 78A, 78B:
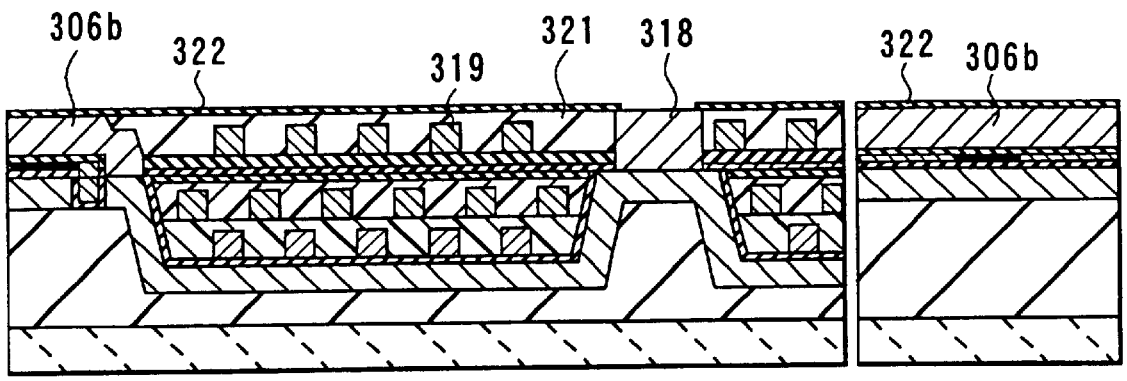
FIG. 78A and FIG. 78B are cross sections for illustrating a step that follows FIG. 77A and FIG. 77B.

Next, as shown in FIG. 78A and FIG. 78B, an insulating layer 321 of alumina or silicon dioxide, for example, whose thickness is about 3 to 4 µm is formed on the entire surface. The insulating layer 321 is then polished to the surfaces of the second portion 306b of the top shield layer, the conductive layers 318 and part (not shown) of the coil 319 and flattened. The polishing method may be mechanical polishing or CMP. Through this flattening process, the surfaces of the second portion 306b, the conductive layers 318 and the part of the coil 319 are exposed and brought to the same plane as the surface of the insulating layer 321.

Next, a recording gap layer 322 of about 150 to 250 nm in thickness made of an insulating film of alumina, aluminum nitride, or silicon dioxide, for example, is formed on the entire surface. The recording gap layer 322 on the magnetic layer 318 is then partially etched to form a contact hole for making the magnetic path.

Figures 79A, 79B:
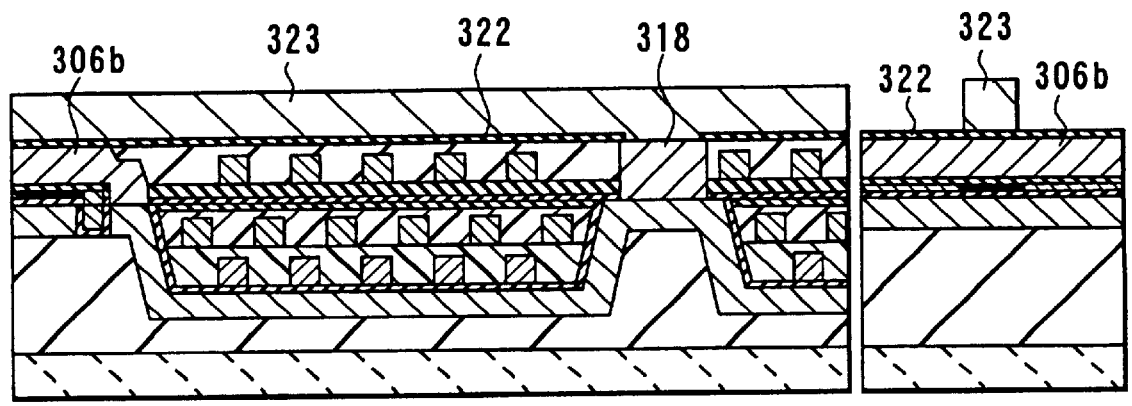
FIG. 79A and FIG. 79B are cross sections for illustrating a step that follows FIG. 78A and FIG. 78B.

Next, as shown in FIG. 79A and FIG. 79B, a top pole layer 323. of about 3 µm in thickness is formed on the recording gap layer 322. The top pole layer 323 determines the track width of the induction recording head. The top pole layer 323 may be formed through plating with NiFe (50 weight % Ni and 50 weight % Fe), or through sputtering a high saturation flux density material such as FeN or a compound thereof and then patterning. Besides the above examples, the material of the top pole layer 323 may be NiFe (80 weight % Ni and 20 weight % Fe) or a high saturation flux density material such as an amorphous of Fe—Co—Zr. Alternatively, the top pole layer 323 may be layers of two or more of the above materials. The top pole layer 323 made of a high saturation flux density material allows the magnetic flux generated by the coils 310, 312 and 319 to effectively reach the pole portion without saturating before reaching there. An efficient recording head is therefore obtained.

Figures 80A, 80B:
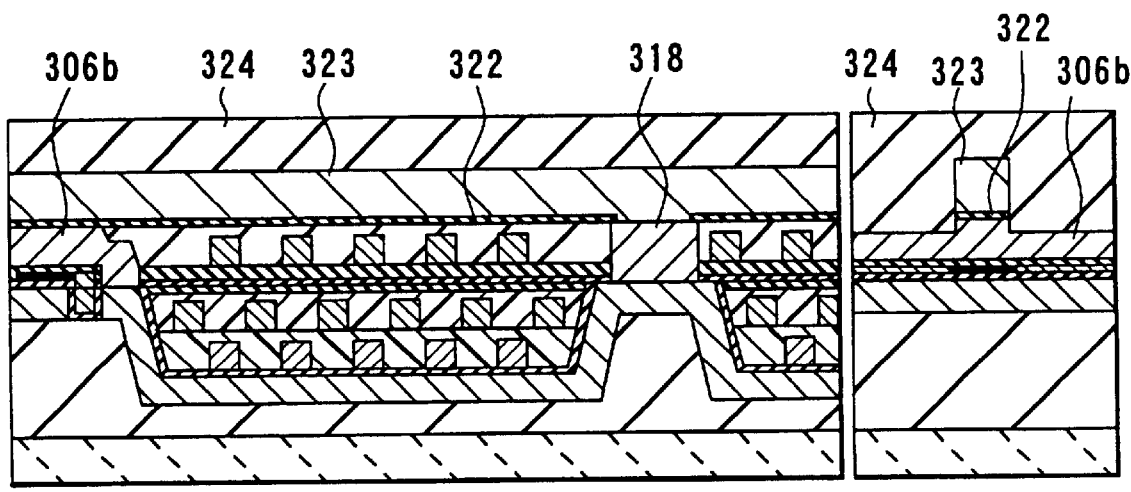
FIG. 80A and FIG. 80B are cross sections of the thin-film magnetic head of the nineteenth embodiment of the invention.

Next, as shown in FIG. 80A and FIG. 80B, part of the recording gap layer 322 on both sides of the top pole layer 323 is removed through dry etching such as reactive ion etching. The exposed second portion 306b of the top shield layer is then etched through ion beam etching such as ion milling with the top pole layer 323 as a mask to form a trim structure.

Next, an overcoat layer 324 of alumina, for example, whose thickness is about 3 to 5 µm is formed to cover the top pole layer 323. Next, on the overcoat layer 324 a plurality of pads are formed to allow connection between the electrodes of the reproducing head and the recording head and the outside. In prior-art techniques the thickness of the overcoat layer made of alumina, for example, is as thick as 30 to 40 µm and columnar electrodes (bumps) connected to the reproducing head and columnar electrodes connected to the recording head are formed to be embedded in the overcoat layer. The surface of the thick overcoat layer is polished for a long time to expose the electrodes from the overcoat layer surface and the pads are thus formed. In the embodiment, in contrast, since the overcoat layer 324 is thin, it is possible to etch the overcoat layer 324 through dry etching such as ion milling or reactive ion etching. The electrodes embedded in the overcoat layer 324 are thereby exposed from the surface of the overcoat layer 324 to form the pads.

Finally, machine processing of the slider is performed and the air bearing surface of the recording head and the reproducing head is formed. The thin-film magnetic head is thus completed.

The top shield layer (bottom pole layer) 306a and 306b, the magnetic layer 318, the top pole layer 323, and the thin-film coils 310, 312 and 319 correspond to a recording head of the invention. That is, the top shield layer (bottom pole layer) 306a and 306b and the magnetic layer 318 correspond to a first magnetic layer of the recording head of the invention. The top pole layer 323 corresponds to a second magnetic layer.

Figure 81:
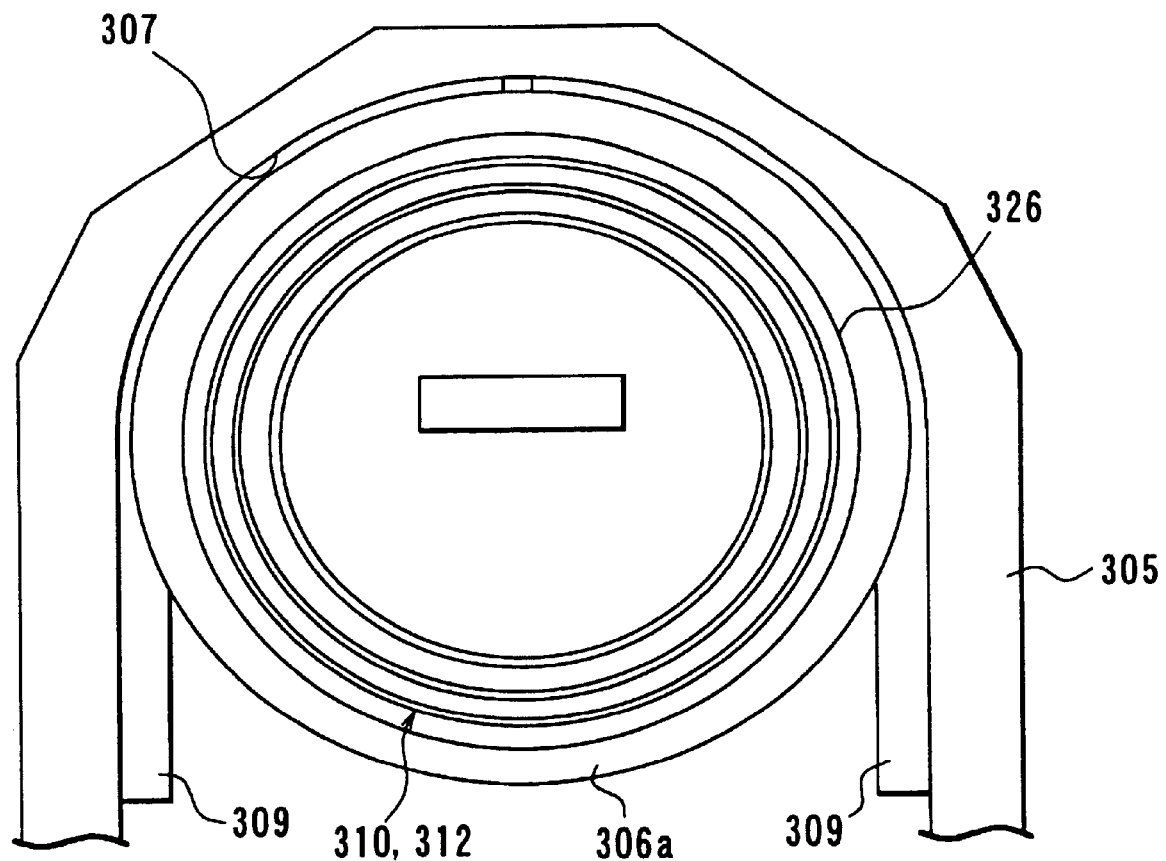
FIG. 81 is a top view of the thin-film magnetic head of the nineteenth embodiment of the invention in the state in one of the manufacturing steps.
Figure 82:
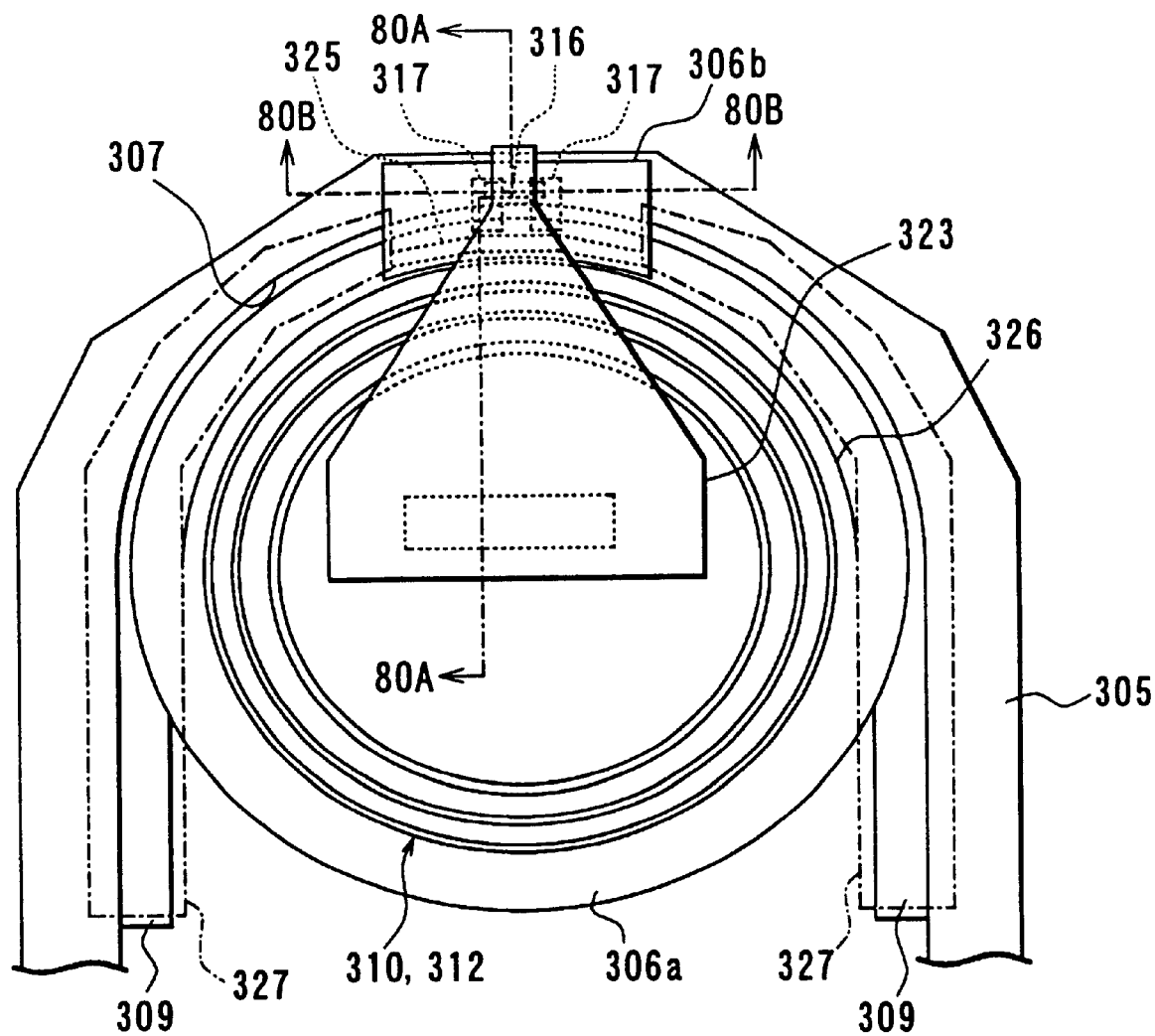
FIG. 82 is a top view of the thin-film magnetic head of the nineteenth embodiment of the invention.

FIG. 81 is a top view of the thin-film magnetic head of the embodiment manufactured through the foregoing process in the state in one of the manufacturing steps. FIG. 82 is a top view of the thin-film magnetic head of the embodiment manufactured through the foregoing process. FIG. 81 corresponds to the state shown in FIG. 75A and FIG. 75B. In FIG. 82 the overcoat layer 324 is omitted. FIG. 82 shows the state before mechanical processing of the slider is performed. Numeral 325 of FIG. 82 indicates the contact hole for connecting the second portion 306b to the first portion 306a of the top shield layer. Numeral 326 of FIG. 81 and FIG. 82 indicates the edge of the concave 304. FIG. 69A to FIG. 80A are cross sections taken along line 80A—80A of FIG. 82. FIG. 69B to FIG. 80B are cross sections taken along line 80B—80B of FIG. 82.

In this embodiment, as shown in FIG. 82, shield layers 327 may be provided for shielding at least portions of the conductive layers 309. The shield layers 327 cover the portions of the conductive layers 309 that do not face the second portion 306b of the top shield layer. In the step of forming the top pole layer 323, for example, the shield layers 327 may be made of the same material as the top pole layer 323 at the same time.

In the embodiment the bottom shield layer 305 and the first portion 306a of the top shield layer do not overlap each other while insulated from each other. The portions of the conductive layers 309 making up the leads connected to the MR element 316 are placed in the grooves 307 provided between the bottom shield layer 305 and the first portion 306a, being insulated by the insulating film 308 from the bottom shield layer 305 and the first portion 306a.

As described above, many customers of thin-film magnetic heads order the track width of a reproducing head and the throat height and the track width of a recording head that suit their own products. However, if thin-film magnetic heads that meet the specifications a customer requires are manufactured after an order is received, it is difficult to supply the products in a short time after the receipt of the order.

According to the embodiment, as shown in FIG. 75A and FIG. 75B, the thin-film magnetic head material commonly used for thin-film magnetic heads is completed in the step of forming part of the thin-film coils, that is, the coil 310 of the first layer and the coil 312 of the second layer in the concave 304 of the insulating layer 302 and forming the insulating layer 314. It takes a relatively short time to perform the steps that follow the formation of the thin-film magnetic head material. In addition, it is possible to inspect the thin-film magnetic head materials and remove nonconforming ones.

Therefore, according to the embodiment, the intermediate product, that is, the thin-film magnetic head material, having gone through the manufacturing steps as far as the step of forming the coils 310 and 312 may be mass-produced so that many intermediate products in stock are obtained. Such intermediate products in stock may be increased so that they are plentiful enough to be supplied to customers. The specifications of the thin-film magnetic heads may be then determined to meet different customers' demands. Therefore, the embodiment allows the appropriate number of intermediate products in stock to be obtained. Such intermediate products have gone through 50 to 60 percent of the entire manufacturing steps and many of them have passed an inspection as conforming products. It is therefore possible to produce thin-film magnetic heads that meet the specifications required by the customer in a short time after receipt of an order. As a result, the cycle time from a receipt of a customer's order to a completion and a shipment of thin-film magnetic heads may be two weeks or less, according to the embodiment, which is shorter than twenty to forty days required in prior-art methods.

According to the embodiment, noncorfoming intermediate products have been already eliminated so that it is possible to make conforming intermediate products into complete products as soon as possible in accordance with customers' demands. High quality of the products that is not obtained by prior-art techniques is therefore achieved and the yields of the finished products improve.

According to the embodiment, it is possible to meet the customer's demand immediately even if it is changed in a short time. It is therefore possible to prevent products from being wasted.

According to the embodiment, intermediate products may be inspected so that the manufacturing steps that follow do not need to be performed on nonconforming products. As a result, manufacturing costs of the thin-film magnetic heads are reduced, compared to prior art.

According to the embodiment, inspections may be performed on both intermediate products and completed thin-film magnetic heads. Extremely high quality products are thereby assured.

According to the embodiment, inspections may be performed on both intermediate products and completed thin-film magnetic heads. As a result, it is easy to detect a manufacturing step with a problem and to immediately improve such a step. It is thereby possible to prevent a more serious problem.

According to the embodiment, the conductive layers 309 and the thin-film coil 310 of the first layer or the thin-film coil 312 of the second layer are formed at the same time. As a result, it is possible to reduce the number of manufacturing steps of the thin-film magnetic head or the thin-film magnetic head material.

According to the embodiment, the bottom shield layer 305 and the first portion 306a of the top shield layer are formed at the same time. As a result, it is possible to further reduce the number of manufacturing steps of the thin-film magnetic head or the thin-film magnetic head material.

According to the embodiment, the MR element 316 is formed after the coils 310 and 312 are formed. It is therefore possible to prevent a reduction in the property of the MR element 316 due to the influence of heat treatment performed on the photoresist when the coils 310 and 312 are formed and the influence of water thereby generated and so on. This preventing effect is particularly effective when the MR element 316 is a sensitive GMR element. In the embodiment the thin-film coil 319 is formed after the MR element 316 is formed. Covering the coil 319 with the insulating layer 321 of alumina or silicon dioxide, for example, prevents a reduction in the property of the MR element 316 due to the influence of heat treatment performed on the photoresist and the influence of water thereby generated and so on.

According to the embodiment, the number of manufacturing steps that follow the formation of the MR element 316 is reduced, compared to prior-art methods. It is therefore possible to greatly reduce breakage such as static damage of the MR element 316 caused by handling and so on. This effect is particularly effective when the MR element 316 is a GMR element made of layers of a plurality of extremely thin (about 1 to 5 nm) films.

In the embodiment the first portion 306a of the top shield layer does not overlap the portion of the bottom shield layer 305 where the MR element 316 is placed, being insulated from the bottom shield layer 305. The portions of the conductive layers 309 making up the leads connected to the MR element 316 are placed in the grooves 307 provided between the bottom shield layer 305 and the first portion 306a, being insulated by the insulating film 308 from the bottom shield layer 305 and the first portion 306a. As a result, according to the embodiment, an extremely high insulation property is achieved between the conductive layers 309 and the bottom shield layer 305 and the first portion 306a of the top shield layer. Although part of the conductive layers 309 faces the second portion 306b of the top shield layer with the bottom shield gap film 315a and the top shield gap film 315b in between, the most part of the conductive layers 309 does not face the top shield layer 306a and 306b. An extremely high insulation property is therefore achieved between the conductive layers 309 and the top shield layer 306a and 306b.

According to the embodiment, an extremely high insulation property is achieved between the conductive layers 309 and the bottom shield layer 305 and the top shield layer 306a and 306b. It is therefore possible to prevent magnetic and electrical insulation faults between the conductive layers 309 and the bottom shield layer 305 and the top shield layer 306a and 306b.

According to the embodiment, the conductive layers 309 are not inserted between the bottom shield gap film 315a and the top shield gap film 315b. As a result, it is impossible that large areas of the conductive layers 309 face the bottom shield layer 305 and the top shield layer 306a and 306b with the bottom shield gap film 315a and the top shield gap film 315b in between. Therefore, although the bottom shield gap film 315a and the top shield gap film 315b are thin, the insulation property is maintained at a high level between the conductive layers 309 and the bottom shield layer 305 and between the conductive layers 309 and the top shield layer 306a and 306b.

According to the embodiment described so far, the insulation property is improved between the conductive layers connected to the MR element 316 and the bottom shield layer 305 and between the conductive layers and the top shield layer 306a and 306b without increasing the thickness of the bottom shield gap film 315a and the top shield gap film 315b.

According to the embodiment, the bottom shield gap film 315a and the top shield gap film 315b are made thin enough to improve the thermal asperity. The property of the reproducing head is thereby improved.

According to the embodiment, the conductive layers 309 are made thick enough so that the wiring resistance of the conductive layers connected to the MR element 316 is more greatly reduced. As a result, it is possible to detect with sensitivity a minute change in the output signal corresponding to a minute change in resistance of the MR element 316. The property of the reproducing head is improved in this respect, too.

In the embodiment, the lateral surfaces of the portions of the conductive layers 309 close to the MR element 316 and placed in the grooves 307 are shielded, being placed between the bottom shield layer 305 and the first portion 306a of the top shield layer. The top surfaces of the portions of the conductive layers 309 are shielded by the second portion 306b of the top shield layer. As a result, it is possible to reduce the effects of noises caused by internal factors such as magnetism and the like generated by the coil of the induction-type recording head or external factors such as the motor of the hard disk drive. The property of the reproducing head is improved in this respect, too.

Since the shield layers 327 for the conductive layers are provided, it is possible to shield the top surfaces of the portions of the conductive layers 309 not facing the second portion 306b of the top shield layer. The effects of noises on the conductive layers 309 are thereby further reduced.

According to the embodiment, part of the thin-film coils, that is, the thin-film coils 310 and 312 are placed in the concave 304 formed in the base body. As a result, the height of the apex, that is, the crest of the coil is reduced and the pole layer (the top pole layer 323) that defines the track width of the recording head is reduced in size. The recording density is thereby increased and the recording head property is improved. According to the embodiment, the apex will not be increased in size even if the thin-film coils are made up of two or three layers to improve the recording head property. Therefore, it is possible to reduce the size of the pole layer (the top pole layer 323) that defines the track width of the recording head while increasing the layers of the thin-film coils and to improve the recording head property. It is thus possible to form the four-layer thin-film coils, for example. A higher-performance recording head is thereby implemented.

According to the embodiment, the flattening process is performed so that the surfaces of the second portion 306b of the top shield layer, the magnetic layer 318 and the insulating layer 321 are brought to one plane. On the flattened surfaces the top pole layer 323 is formed with the recording gap layer 322 in between. As a result, the top pole layer 323 that defines the track width of the recording head is reduced in size and the recording head property is improved.

According to the embodiment, the top pole layer of the recording head is not made up of two layers including a top pole tip and a top yoke layer but made up of a single layer of the top pole layer 323. It is therefore impossible that the top yoke layer greater than the top pole tip in width is exposed in the air bearing surface. As a result, it is possible to prevent problems such as an increase in effective track width and writing data in a region other than the region where data is to be written on a recording medium.

According to the embodiment, there is no possibility of magnetic flux saturation that is generated in a contact portion between the top pole tip and the top yoke layer when the top pole layer is made up of two layers including the top pole tip and the top yoke layer. The writing properties such as magnetic flux rise time is therefore improved.

In prior art an overcoat layer of alumina, for example, whose thickness is about 30 to 40 $\mu$m is formed to protect the reproducing head and the recording head and to maintain the quality of the product in a step immediately before the completion of the mass-production process of the thin-film magnetic heads. Consequently, warpage of the substrate results due to the thick overcoat layer or many particles are generated when the thick layer is formed through sputtering. The property and yields of the thin-film magnetic heads are thereby reduced. In prior art it takes fifteen hours or more to form the alumina film of about 40 $\mu$m in thickness by sputtering. The cycle time of mass-production of the thin-film magnetic heads and the sputtering capability are therefore greatly limited.

In the embodiment, in contrast, the thin-film coils 310 and 312 are provided in the concave 304 so that the surface of the top pole layer 323 below the overcoat layer 324 is almost flat. As a result, the overcoat layer 324 is made thin. Since the overcoat layer 324 is thin in the embodiment, the electrodes embedded in the overcoat layer 324 are exposed from the surface of the overcoat layer 324 by etching the overcoat layer 324 through dry etching such as ion milling or reactive ion etching. The pads are thereby formed. As a result, according to the embodiment, the process time for forming the overcoat layer 324 and the process time for forming the pads are greatly reduced (that is, reduced to a tenth, for example), compared to prior-art methods. The cycle time of mass-production of the thin-film magnetic heads is reduced as well.

According to the embodiment, there is no possibility of warpage of the substrate due to the thick overcoat layer or many particles generated when the thick layer is formed through sputtering. The property and yields of the thin-film magnetic heads are therefore maintained.

In the embodiment, the insulating layer 302 made of alumina is formed on the substrate 301 made of aluminum oxide and titanium carbide ($Al_2O_3$—TiC). The concave 304 is then formed in the insulating layer 302 on which the bottom shield layer 305 and the first portion 306a of the top shield layer are formed. Alternatively, the following configuration may be possible. A concave is formed in a ceramic substrate made up of an alumina layer and an aluminum oxide and titanium carbide layer stacked thereon. An insulating layer of alumina is then formed on the substrate having the concave on which the bottom shield layer 305 and the first portion 306a of the top shield layer are formed. Another alternative is that a metal mask of a specific pattern is formed by plating directly on a substrate made of aluminum oxide and titanium carbide or on a thin alumina layer formed on the substrate. A concave is formed by etching the substrate through dry etching, for example, with the metal mask. On the substrate having the concave an insulating layer of alumina is formed on which the bottom shield layer 305 and the first portion 306a of the top shield layer are formed.

[Twentieth Embodiment]

Figures 83A, 83B:
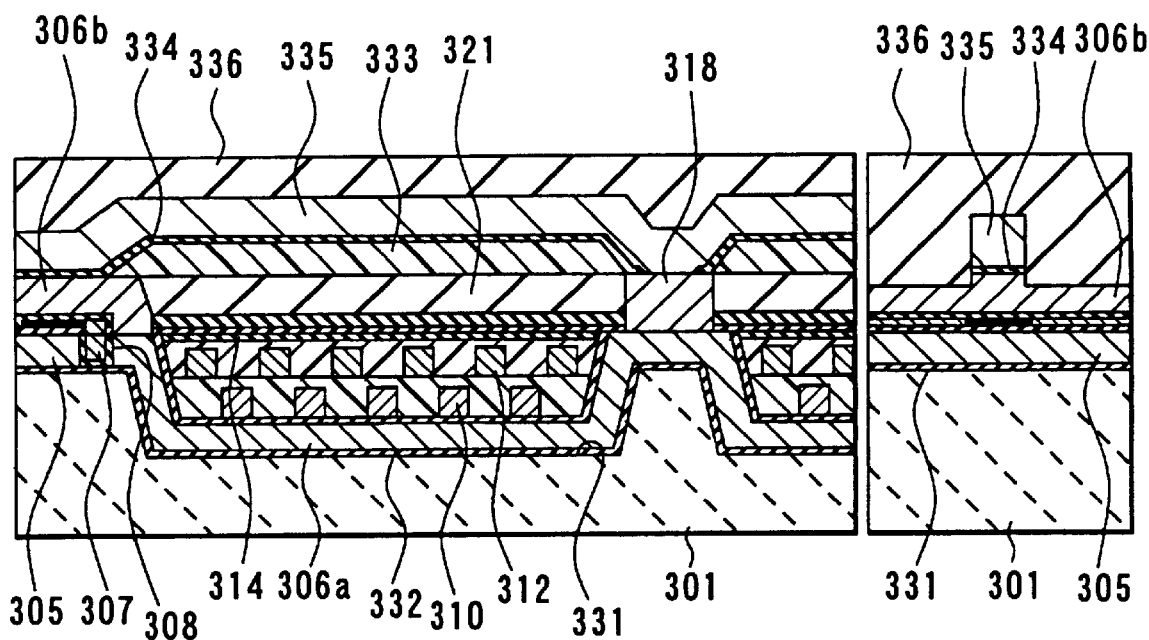
FIG. 83A and FIG. 83B are cross sections of a thin-film magnetic head of a twentieth embodiment of the invention.

Reference is now made to FIG. 83A and FIG. 83B to describe a twentieth embodiment of the invention. FIG. 83A is a cross section of a thin-film magnetic head of the embodiment orthogonal to the air bearing surface. FIG. 83B is a cross section of the pole portion of the thin-film magnetic head parallel to the air bearing surface. FIG. 83A shows the state before mechanical processing of the slider is performed.

In the embodiment, in the top surface of the substrate 301 made of aluminum oxide and titanium carbide ($Al_2O_3$—TiC), a concave 331 similar to the concave 304 of the nineteenth embodiment is formed. Next, an insulating film 332 of alumina, for example, whose thickness is about 0.5 to 1 µm is formed by sputtering, for example, on the entire surface. Next, on the insulating film 332 the bottom shield layer 305 and the first portion 306a of the top shield layer similar to those of the nineteenth embodiment are formed at the same time in one manufacturing step. The steps performed until the formation of the insulating layer 314 are similar to those of the nineteenth embodiment. Upon the formation of the insulating layer 314, the thin-film magnetic head material commonly used in thin-film magnetic heads is completed as in the nineteenth embodiment.

In this embodiment, in order to complete the product to meet the customer's demands, the MR element (an AMR element or a GMR element, and so on) and the material of the shield gap films (alumina, aluminum nitride or boron nitride and so on) are selected and the track width of the reproducing head and the throat height and the track width of the recording head are determined in accordance with the customer's requests. As in the nineteenth embodiment, the bottom shield gap film 315a, the MR element 316, the conductive layers 317 and the top shield gap film 315b are then formed. The numerals of these components are omitted in FIG. 83A and FIG. 83B.

In the embodiment, as in the nineteenth embodiment, the second portion 306b of the top shield layer and the magnetic layer 318 are then formed. Next, on the bottom shield gap film 315a above the coils 310 and 312, the insulating layer 321 of alumina or silicon dioxide, for example, having a thickness of 3 to 4 µm is formed over the entire surface instead of forming the thin-film coil 319. Next, as in the nineteenth embodiment, the insulating layer 321 is polished to the surfaces of the second portion 306b, the magnetic layer 318 and part (not shown) of the coil 319 and flattened.

Next, on the insulating layer 321, an insulating layer 333 of photoresist that defines the throat height is formed. Next, a recording gap layer 334 made of an insulating film of alumina, aluminum nitride, or silicon dioxide is formed over the entire surface. The portion of the recording gap layer 334 on the magnetic layer 318 is then selectively removed to form a contact hole for making a magnetic path.

Next, a top pole layer 335 is formed on the recording gap layer 344. The top pole layer 335 defines the track width of the recording head. Next, the recording gap layer 334 on sides of the top pole layer 335 is removed through dry etching such as reactive ion etching. The exposed second portion 306b of the top shield layer is etched through ion beam etching such as ion milling with the top pole layer 335 as a mask. A trim structure is thereby formed.

Next, an overcoat layer 336 of alumina, for example, whose thickness is about 3 to 5 µm is formed to cover the top pole layer 335. Next, a plurality of pads are formed on the overcoat layer 336. Finally, machine processing of the slider is performed and the air bearing surface of the recording head and the reproducing head is formed. The thin-film magnetic head is thus completed.

The remainder of configuration, functions and effects of the embodiment are similar to those of the nineteenth embodiment.

[Twenty-first Embodiment]

Figure 84:
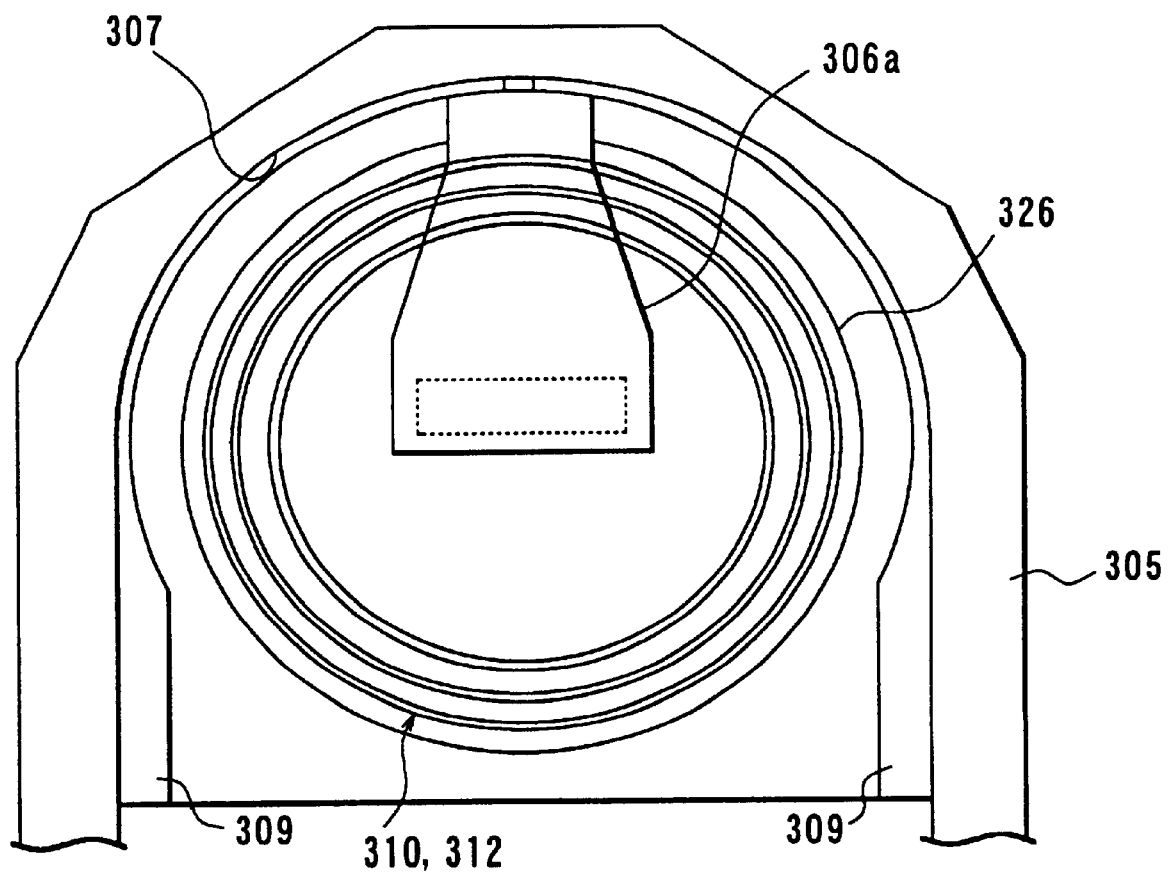
FIG. 84 is a top view of a thin-film magnetic head of a twenty-first embodiment of the invention in the state in one of the manufacturing steps.
Figure 85:
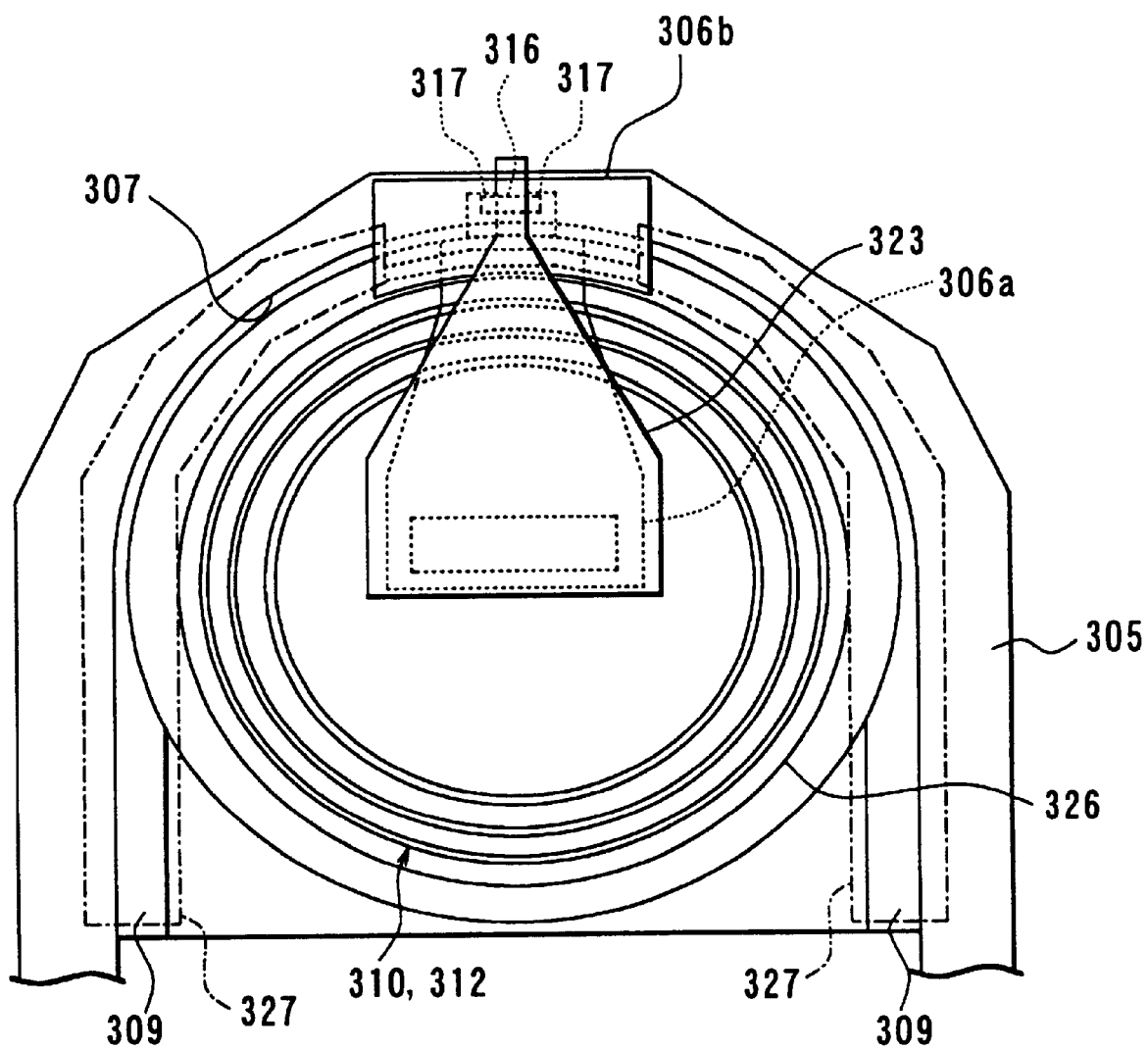
FIG. 85 is a top view of the thin-film magnetic head of the twenty-first embodiment of the invention.

Reference is now made to FIG. 84 and FIG. 85 to describe a twenty-first embodiment of the invention. FIG. 84 is a top view of a thin-film magnetic head fabricated through the manufacturing method of the embodiment in the state in one of the manufacturing steps. FIG. 85 is a top view of the thin-film magnetic head fabricated through the manufacturing method of the embodiment Compared to the nineteenth embodiment, the first portion 306a of the top shield layer is smaller in this embodiment. That is, the first portion 306a of the embodiment extends from the neighborhood of the pole-portion-side edge of the concave of the substrate outside the concave to the neighborhood of the insular portion. Since the top shield layer functions as the bottom pole layer of the recording head as well, the small first portion 306a of the top shield layer of the embodiment has an advantage for being used in a thin-film magnetic head capable of high-frequency operation.

The remainder of configuration, functions and effects of the embodiment are similar to those of the nineteenth embodiment.

[Twenty-second Embodiment]

Figure 86:
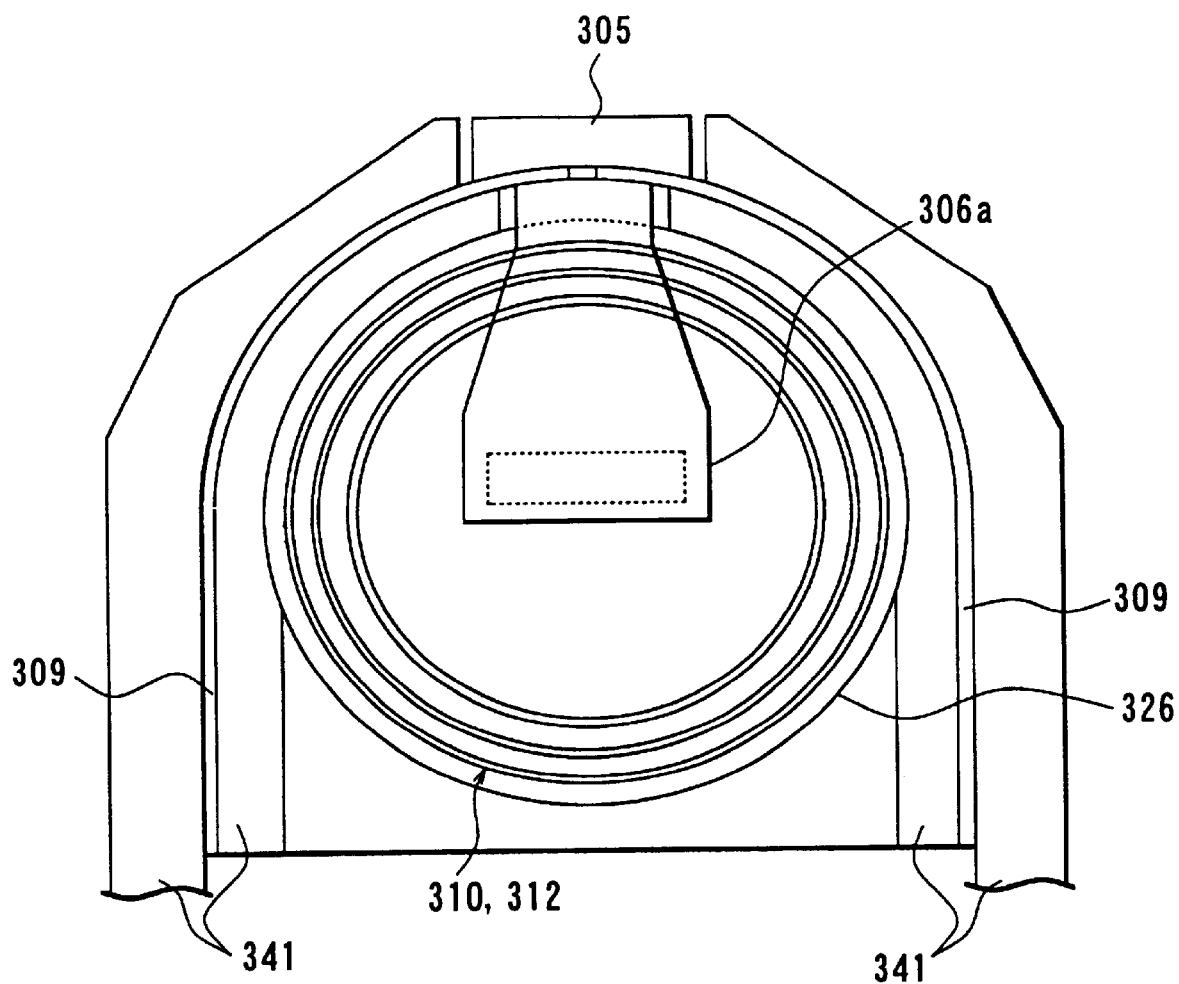
FIG. 86 is a top view of a thin-film magnetic head of a twenty-second embodiment of the invention in the state in one of the manufacturing steps.

Reference is now made to FIG. 86 to describe a twenty-second embodiment of the invention. FIG. 86 is a top view of the thin-film magnetic head fabricated through the manufacturing method of the embodiment in the state in one of the manufacturing steps.

As in the twenty-first embodiment, the first portion 306a of the top shield layer is smaller in this embodiment, compared to the nineteenth embodiment. Furthermore, the bottom shield layer 305 is smaller as well in this embodiment, compared to the nineteenth embodiment. That is, the bottom shield layer 305 is formed only in the region near the MR element.

In the embodiment magnetic layers 341 are formed to hold lateral surfaces of the most part of the portions of the conductive layers 309 not placed between the bottom shield layer 305 and the first portion 306a of the top shield layer. The magnetic layers 341 are placed outside the concave 304 on the insulating layer 302 shown in FIG. 70A and FIG. 70B. The magnetic layers 341 are insulated from the bottom shield layer 305 and the first portion 306a without overlapping them. In the step of forming the bottom shield layer 305 and the first portion 306a of the top shield layer, the magnetic layers 341 are made of the same material at the same time.

In the embodiment, although not shown, the shield layers 327 are provided for covering the portions of the conductive layers 309 not facing the second portion 306b of the top shield layer as in the nineteenth embodiment.

According to the embodiment, the lateral surfaces of the conductive layers 309 are shielded by the magnetic layers 341 and the top surfaces of the conductive layers 309 are shielded by the shield layers 327. As a result, the effects of noises are further reduced.

The remainder of configuration, functions and effects of the embodiment are similar to those of the twenty-first embodiment.

[Twenty-third Embodiment]

Figures 87A, 87B:
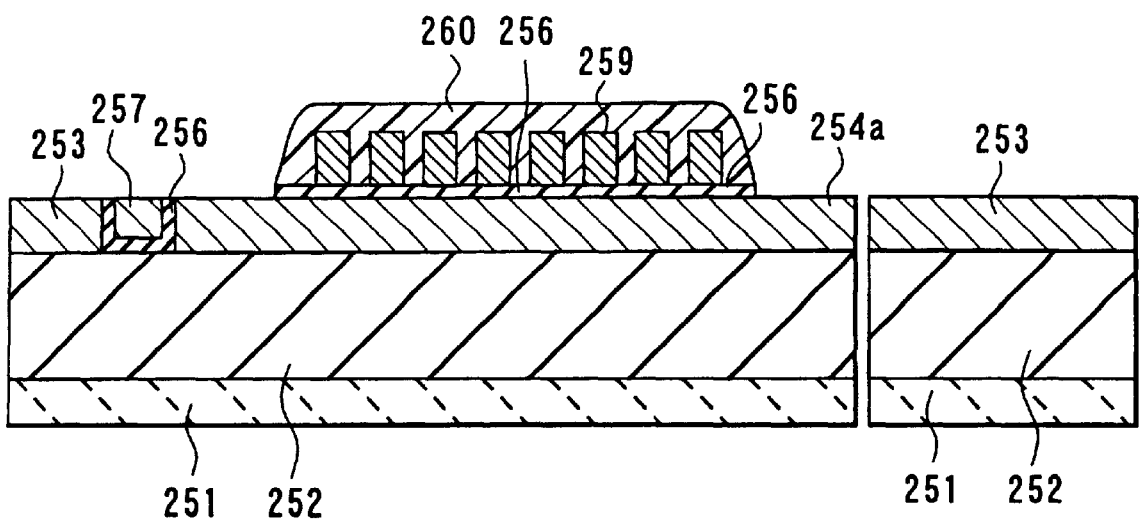
FIG. 87A and FIG. 87B are cross sections for illustrating a step in a method of manufacturing a thin-film magnetic head of a twenty-third embodiment of the invention.
Figures 88A, 88B:
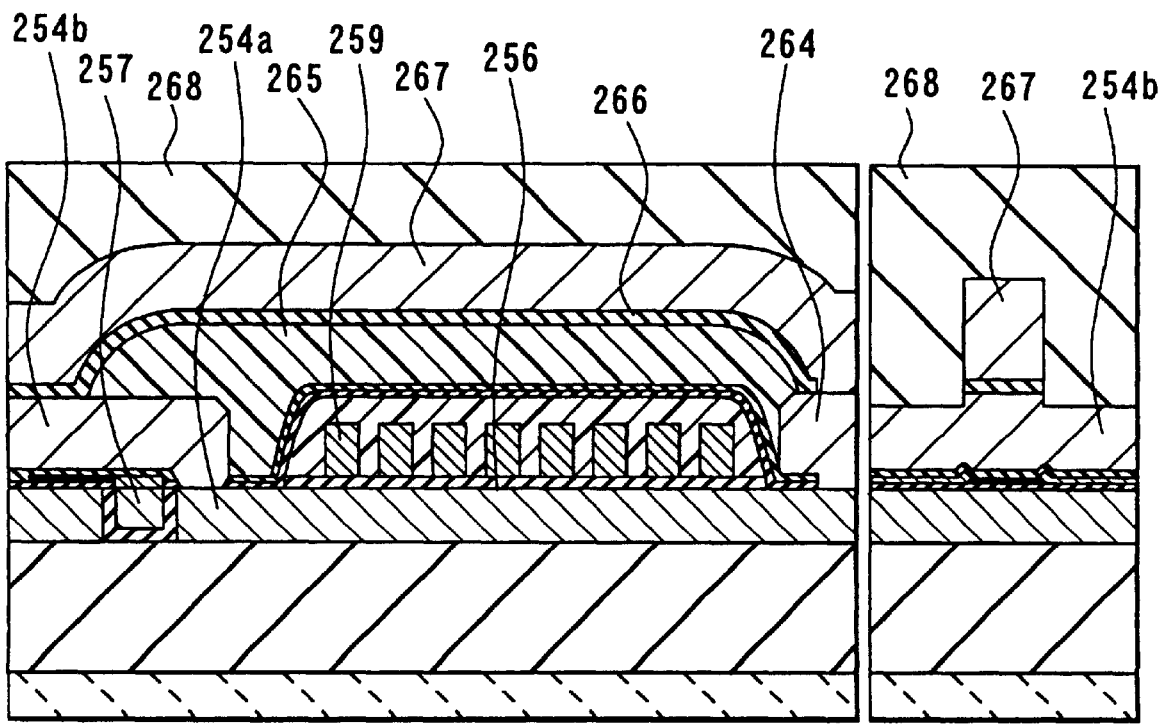
FIG. 88A and FIG. 88B are cross sections of the thin-film magnetic head of the twenty-third embodiment of the invention.

Reference is now made to FIG. 87A, FIG. 87B, FIG. 88A and FIG. 88B to describe a composite thin-film magnetic head and a method of manufacturing the same of a twenty-third embodiment of the invention. FIG. 87A and FIG. 88A are cross sections each orthogonal to the air bearing surface of the thin-film magnetic head. FIG. 87B and FIG. 88B are cross sections each parallel to the air bearing surface of the pole portion of the head.

The thin-film magnetic head of the embodiment is similar to that of the sixteenth embodiment except that the insulating film 256 is provided in place of the insulating layer 258 placed below the coil 259. In the method of manufacturing the thin-film magnetic head of the embodiment, the steps taken to reach the state shown in FIG. 56A and FIG. 56B are similar to those of the sixteenth embodiment. In the next step of the embodiment, as shown in FIG. 87A and FIG. 87B, the coil 259 is formed on the insulating film 256 and the conductive layers 257 are formed in the grooves 255 covered with the insulating film 256, the coil 259 and the conductive layers 257 being made of the same material. Next, the insulating layer 260 of photoresist is formed into a specific pattern on the insulating film 256 and the coil 259. The insulating film 256 is then patterned with the insulating layer 260 as a mask.

The thin-film magnetic head material of the embodiment is the intermediate product shown in FIG. 87A and FIG. 87B, that is, the one comprising the bottom shield layer 253, the first portion 254a of the top shield layer, the conductive layers 257 and the thin-film coil 259. The top view of the intermediate product shown in FIG. 87A and FIG. 87B is similar to the one shown in FIG. 61 as in the sixteenth embodiment.

The manufacturing steps of the embodiment taken to process the intermediate product shown in FIG. 87A and FIG. 87B into the thin-film magnetic head shown in FIG. 88A and FIG. 88B are similar to the steps shown in FIG. 58A to FIG. 60A and FIG. 58B to FIG. 60B of the sixteenth embodiment. The top view of the thin-film magnetic head of the embodiment is similar to the one shown in FIG. 62 as in the sixteenth embodiment.

In the embodiment the shield layers 271 for shielding at least part of the conductive layers 257 may be provided as shown in FIG. 62 as in the sixteenth embodiment.

According to the embodiment, the number of the manufacturing steps are greatly reduced, compared to the sixteenth embodiment.

The remainder of configuration, functions and effects of the embodiment are similar to those of the sixteenth or nineteenth embodiment.

[Twenty-fourth Embodiment]

Figures 89A, 89B:
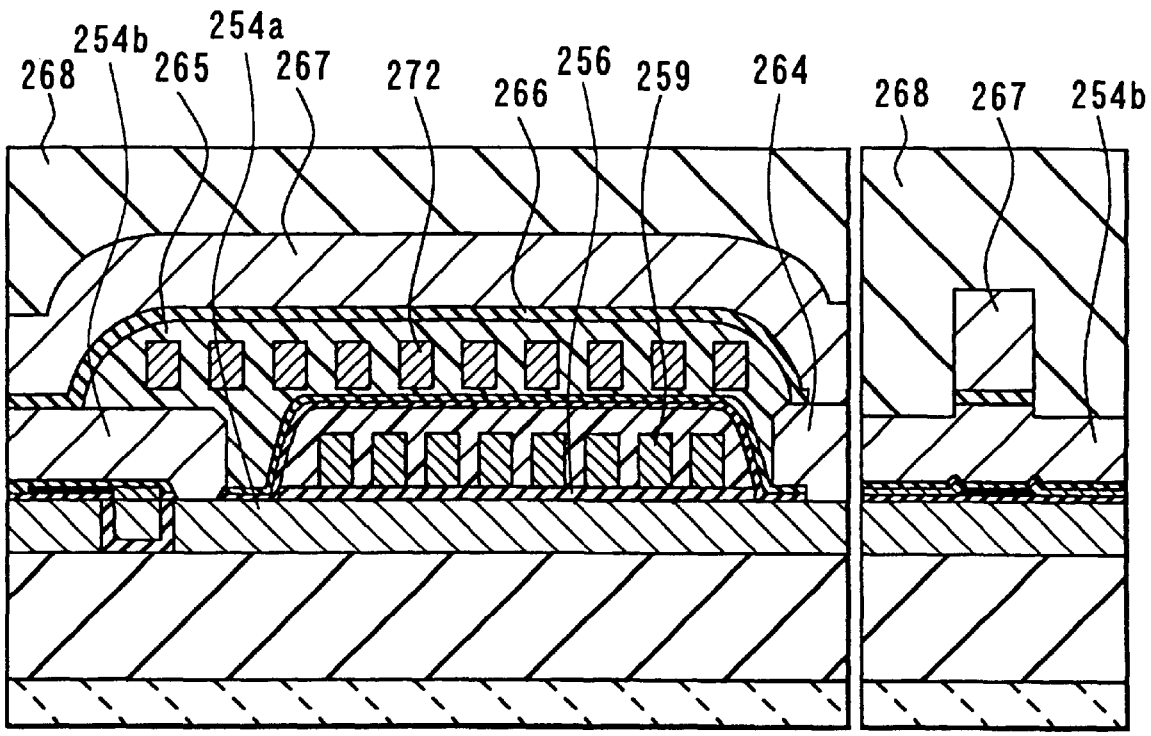
FIG. 89A and FIG. 89B are cross sections of a thin-film magnetic head of a twenty-fourth embodiment of the invention.

Reference is now made to FIG. 89A and FIG. 89B to describe a twenty-fourth embodiment of the invention. FIG. 89A is a cross section orthogonal to the air bearing surface of a thin-film magnetic head. FIG. 89B is a cross section parallel to the air bearing surface of the pole portion of the head. FIG. 89A shows the state before mechanical processing of the slider is performed.

In the thin-film magnetic head of the embodiment, the thin-film coil 272 of the second layer is formed in the insulating layer 265 made of photoresist of the thin-film magnetic head of the twenty-third embodiment. In this case, the insulating layer 265 of photoresist having a specific thickness is formed over the coil 259. The coil 272 is then formed through plating, for example. The insulating layer 265 is further formed to cover the coil 272. The throat height is defined by the insulating layer 265 in this embodiment.

The remainder of configuration, functions and effects of the embodiment are similar to those of the twenty-third embodiment.

[Twenty-fifth Embodiment]

Figures 90A, 90B:
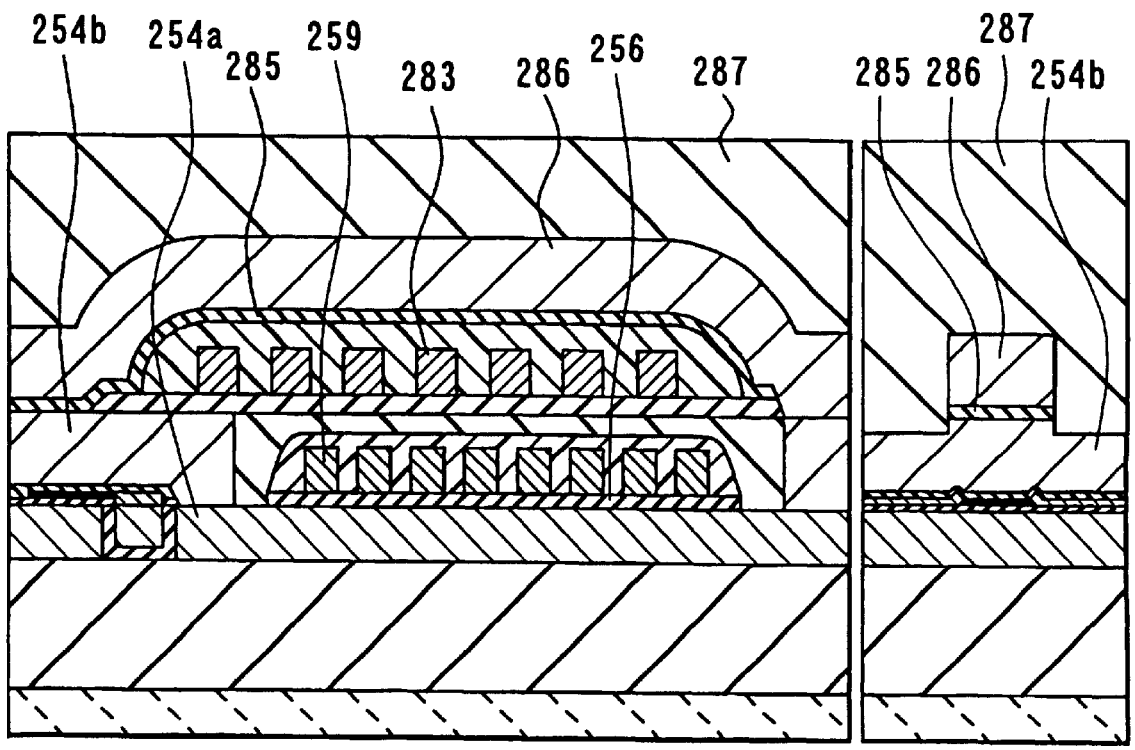
FIG. 90A and FIG. 90B are cross sections of a thin-film magnetic head of a twenty-fifth embodiment of the invention.
Figure 97A:
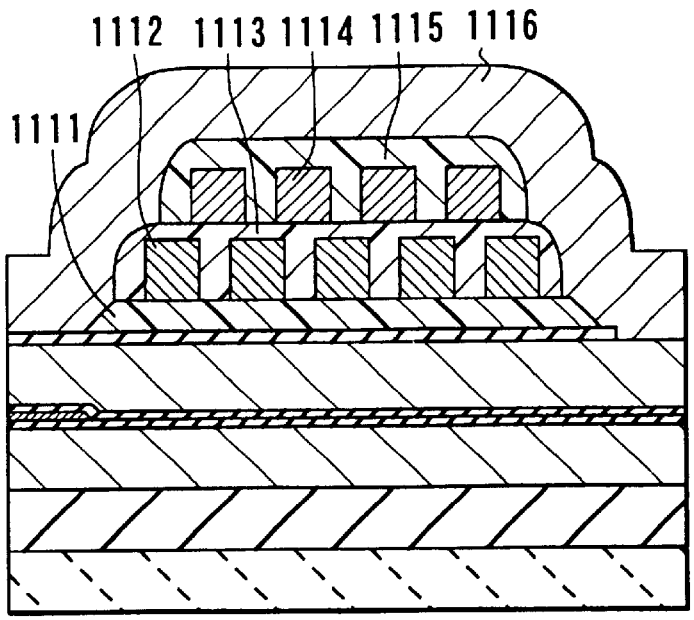
FIG. 97A and FIG. 97B are cross sections for illustrating a step that follows FIG. 96A and FIG. 96B.
Figure 97B:
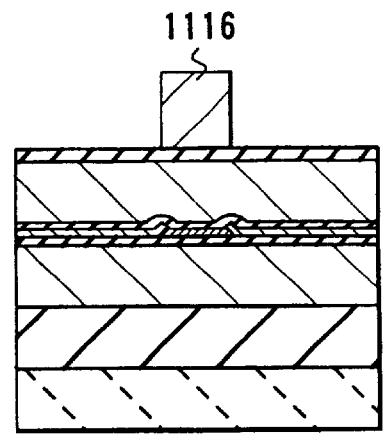
Figure 98A:
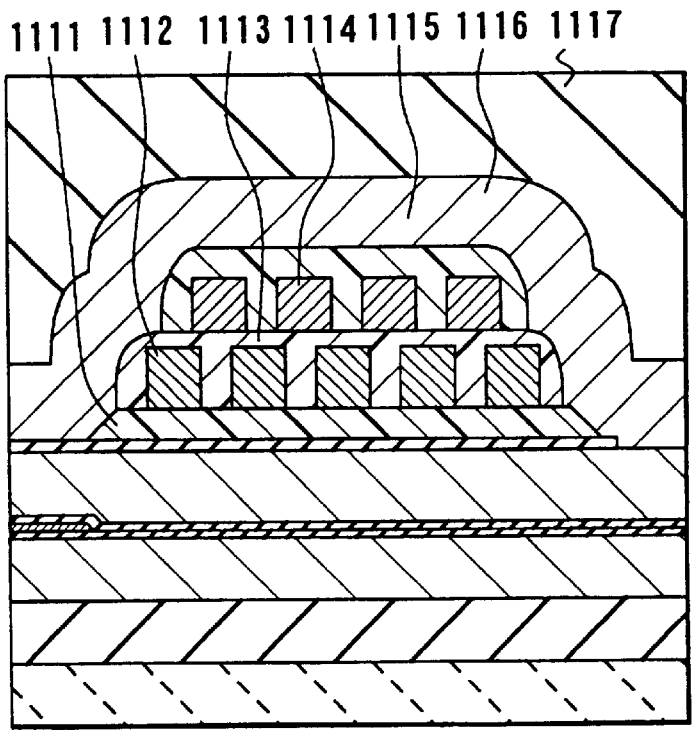
FIG. 98A and FIG. 98B are cross sections of the related-art thin-film magnetic head.
Figure 98B:
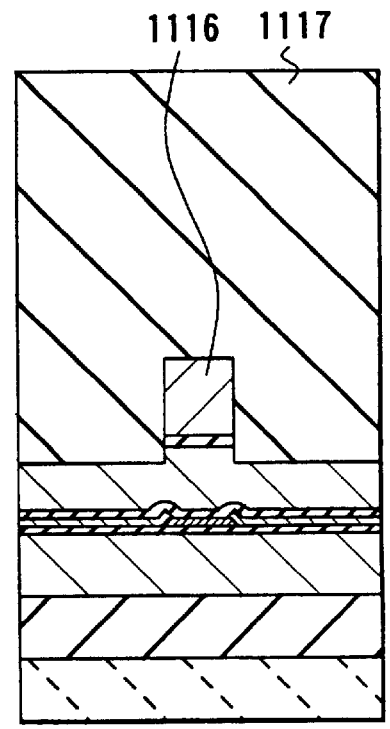
Figure 99:
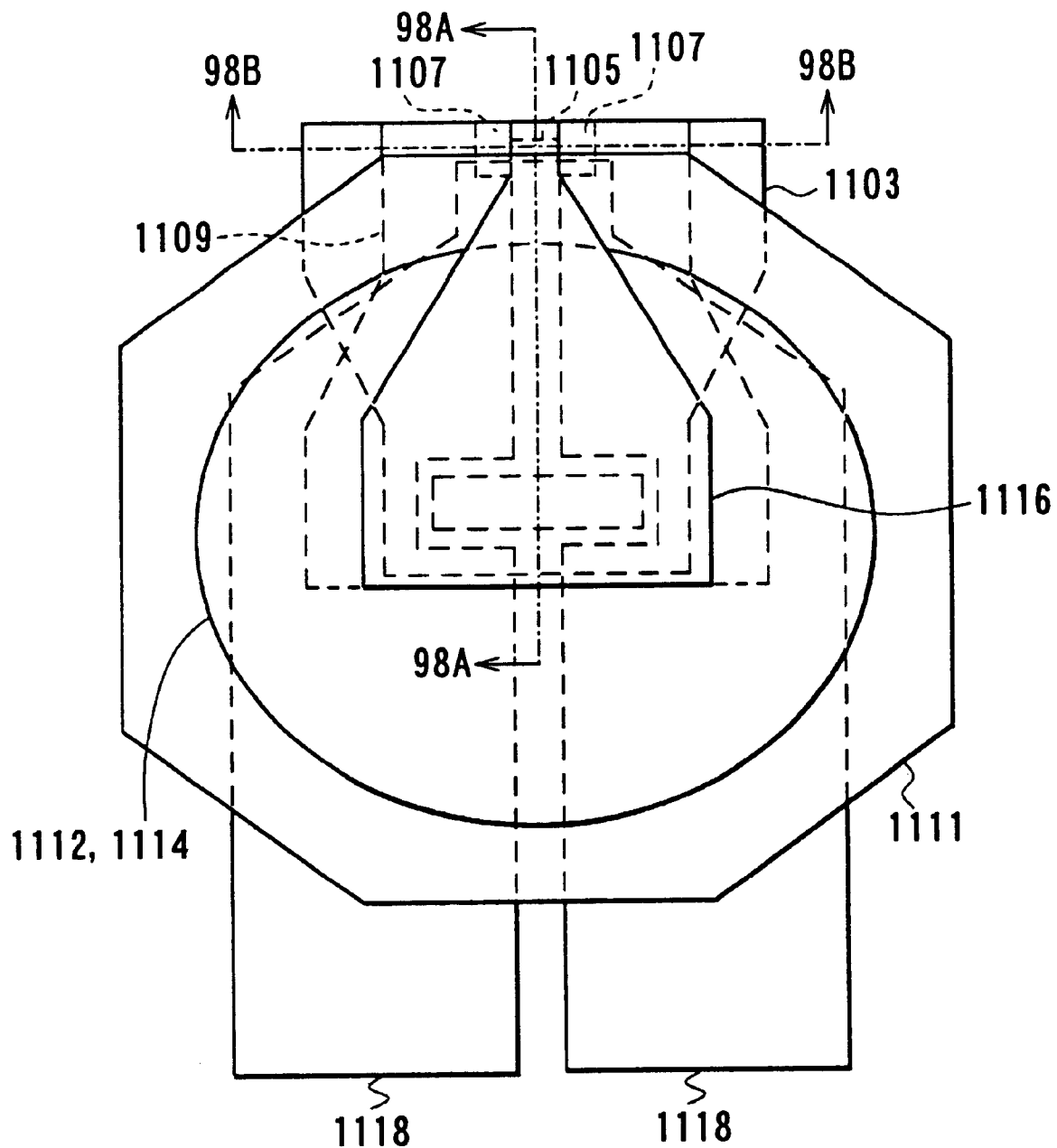
FIG. 99 is a top view of the related-art thin-film magnetic head.
Figure 100:
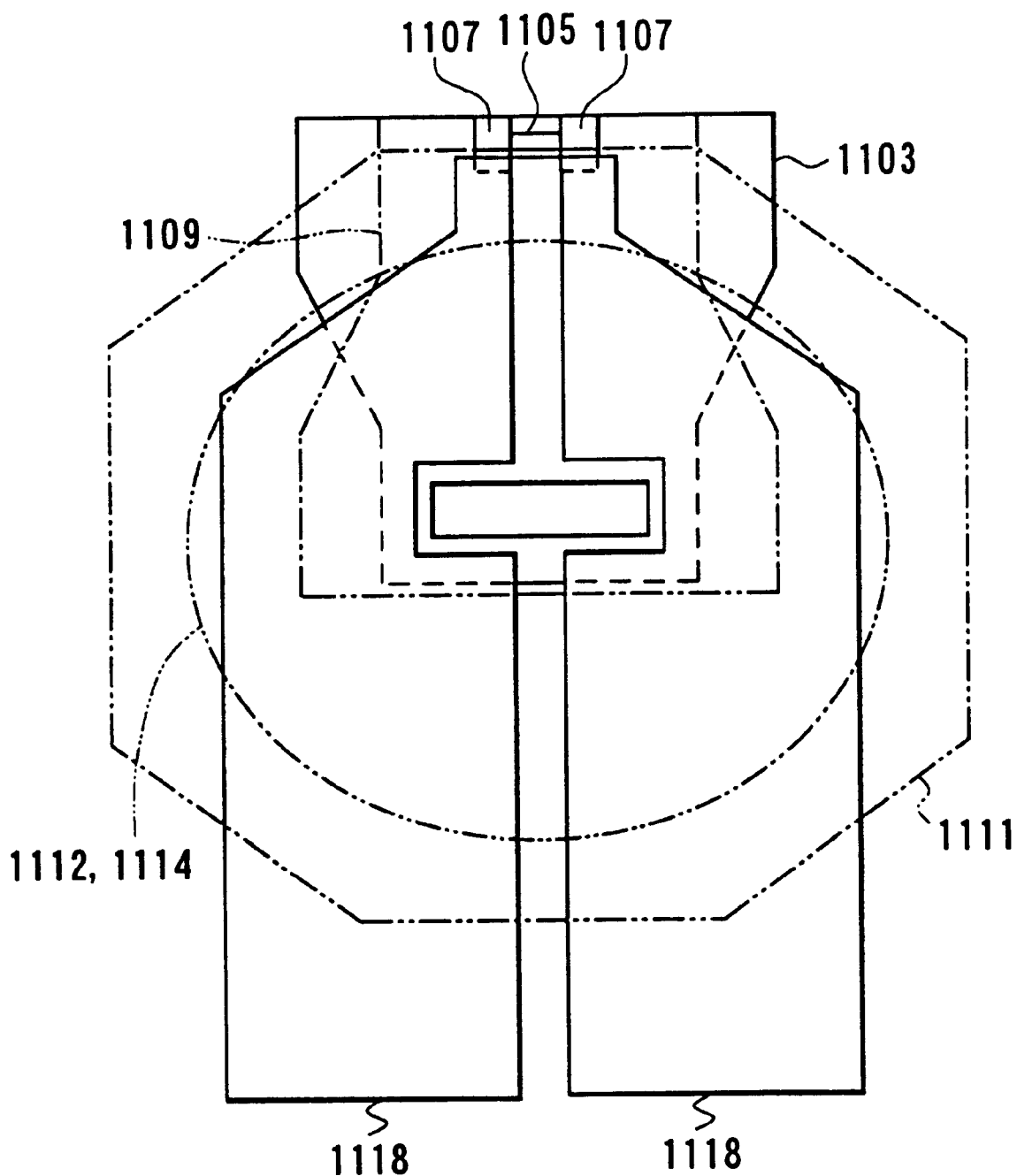
FIG. 100 is a top view of the related-art thin-film magnetic head in the state in one of the manufacturing steps.

Reference is now made to FIG. 90A and FIG. 90B to describe a twenty-fifth embodiment of the invention. FIG. 90A is a cross section orthogonal to the air bearing surface of the thin-film magnetic head. FIG. 90B is a cross section parallel to the air bearing surface of the pole portion of the head. FIG. 90A shows the state before mechanical processing of the slider is performed.

The thin-film magnetic head of the embodiment is similar to that of the eighteenth embodiment except that the insulating film 256 is provided in place of the insulating layer 258 placed below the coil 259. In the method of manufacturing the thin-film magnetic head of the twenty-fifth embodiment, the steps taken to reach the step of forming the coil 259 shown in FIG. 87A and FIG. 87B are similar to those of the twenty-third embodiment. The intermediate products having gone through the steps are mass-produced and inspected. An appropriate amount of conforming intermediate products are obtained. The top view of the intermediate product of the embodiment is similar to the one shown in FIG. 67 as in the eighteenth embodiment.

The manufacturing steps of the embodiment taken to process the intermediate product shown in FIG. 87A and FIG. 87B into the thin-film magnetic head shown in FIG. 90A and FIG. 90B are similar to those shown in FIG. 64A to FIG. 66A and FIG. 64B to FIG. 66B of the eighteenth embodiment. The top view of the thin-film magnetic head of the twenty-fifth embodiment is similar to the one shown. in FIG. 68 as in the eighteenth embodiment.

In the twenty-fifth embodiment the shield layers 271 for shielding at least part of the conductive layers 257 may be provided as shown in FIG. 68 as in the twenty-third embodiment. The shield layers 271 is formed to cover the portions of the conductive layers 257 not facing the second portion 254b of the top shield layer. In the step of forming the top pole layer 286, for example, the shield layers 271 are made of the same magnetic material as the top pole layer 286 at the same time.

The remainder of configuration, functions and effects of the embodiment are similar to those of the eighteenth or twenty-third embodiment.

In the nineteenth to twenty-fifth embodiment the thin-film magnetic head material is manufactured that comprises the first shield layer, the first portion of the second shield layer, at least part of the conductive layers to be connected to the MR element, and at least part of the thin-film coils. In response to the customer's requests, the second portion of the second shield layer, the MR element, and the second magnetic layer are added to the material. The thin-film magnetic head is thus manufactured. As a result, according to the embodiments, it is possible to provide thin-film magnetic heads that meet the specifications required by the customer in a short period of time. According to the embodiments, the materials are inspected so that it is possible to process only conforming materials into thin-film magnetic heads. The yields of the heads are thereby improved. According to the embodiments, it is possible to fabricate at least part of the conductive layers to be connected to the MR element and at least part of the thin-film coils at the same time. As a result, it is possible to reduce the number of manufacturing steps of the thin-film magnetic head or the thin-film magnetic head material.

It is possible to further reduce the number of manufacturing steps of the thin-film magnetic head or the thin-film magnetic head material if the first shield layer and the first portion of the second shield layer are formed at the same time in one step.

In the step of forming at least part of the conductive layers and at least part of the thin-film coils at the same time, the part of the conductive layers may be formed to be placed between the first shield layer and the first portion of the second shield layer, being insulated from them. In this case the following effects are achieved. A high insulation property is achieved between the conductive layers and each shield layer. In addition, since the conductive layers are not placed between the shield layers with insulating layers in between, the insulation property is improved between each shield layer and the conductive layers connected to the MR element without increasing the thickness of the insulating layer between the MR element and the shield layer. In this case, it is possible to fabricate the conductive layers sufficiently thick. The wiring resistance of the conductive layers is thereby reduced. Furthermore, the portions of the conductive layers placed between the first shield layer and the first portion of the second shield layer are shielded, being placed between the two shield layers. The effects of noises on the conductive layers are thereby reduced.

In the step of forming the first shield layer and the first portion of the second shield layer, the first shield layer and the first portion may be formed such that, on the base body having the concave, at least part of the first shield layer is placed in a portion other than the concave, part of the first portion is placed in a portion other than the concave, and the remaining part of the first portion is placed along the inner surface of the concave. In addition, in the step of forming at least part of the conductive layers and at least part of the thin-film coils at the same time, the part of the thin-film coil may be placed in the concave. In such a case, the following effects are achieved. The height of the crest of the coil is reduced and the second magnetic layer that defines the track width of the recording head is greatly reduced in size.

At least part of the thin-film coil may be placed in the concave, and the insulating layer may be then formed to cover the part of the thin-film coil and the surfaces of the insulating layer, the first shield layer and the first portion of the second shield layer may be flattened so that the surfaces are brought to one plane. In this case it is possible to precisely fabricate the MR element.

The second magnetic layer that defines the track width of the recording head is greatly reduced in size if the following steps are taken. That is, part of the thin-film coil is placed in the concave, and the first insulating layer is then formed to cover the part of the thin-film coil. The second insulating layer is then formed to cover the remaining part of the thin-film coil. The surfaces of the second insulating layer and the second portion of the top shield layer are flattened so that the surfaces are brought to one plane.

If t he shield layers are provided for shielding at least part of the conductive layers, the effects of noises on the conductive layers are further reduced.

The present invention is not limited to the foregoing embodiments. For example, in the first to thirteenth embodiments, the top pole layer of the urecrding head is made up of the two layers of the top pole tip and the top spoke layer. Alternatively, the top pole layer may be made of a single layer in those embodiments. In the fourteenth to twenty-fifth embodiments, the top pole layer is made of the single layer. Alternatively, the top pole layer may be made of the two layers of the top pole tip and the top yoke layer in those embodiments.

In the foregoing embodiments the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element as well.

In the thin-film magnetic head having such a structure, the top shield layer provided for the MR element corresponds to the first shield layer of the invention. Therefore, in the thin-film magnetic head the grooves in which the conductive layers are placed may be formed in the top shield layer.

A base body having a concave is preferred for the thin-film magnetic head having such a structure. If the coils are formed in the concave of the base body, the thin-film magnetic is further reduced in size.

Alternatively, the insulating layers formed between the thin-film coils forming the coils of the induction-type magnetic transducer may be all made of inorganic layers.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a magnetoresistive element;
   a first shield layer and a second shield layer for shielding the magnetoresistive element, wherein portions of the first shield layer and the second shield layer facing a recording medium are opposed to each other with the magnetoresistive element in between;
   a first insulating layer provided between the magnetoresistive element and the first shield layer and a second insulating layer provided between the magnetoresistive element and the second shield layer;
   a lead connected to the magnetoresistive element such that the magnetoresistive element is disposed between a portion of the lead connected to the magnetoresistive element and an air bearing surface of the thin-film magnetic head; and
   a base layer serving as a base of the first shield layer,
   wherein the second shield layer includes a first portion at least part of which is placed together with the first shield layer in one plane of the base layer, and a second portion connected to the first portion, the second portion being opposed to the first shield layer with the magnetoresistive element in between;
   the thin-film magnetic head further comprising a groove in which at least part of the lead is placed, the groove being formed between the first shield layer and the first portion of the second shield layer, wherein the at least part of the lead is placed in the groove to extend from the portion of the lead connected to the magnetoresistive element, being insulated from the first shield layer and the first portion of the second shield layer.

2. The thin-film magnetic head according to claim 1, further comprising an insulating film placed in the groove wherein the insulating film insulates the at least part of the lead from the shield layers facing the groove.

3. The thin-film magnetic head according to claim 1, further comprising an induction-type magnetic transducer having two magnetic layers magnetically coupled to each other and a thin-film coil placed between the two magnetic layers, wherein: parts of sides of the two magnetic layers facing a recording medium include magnetic pole portions opposed to each other with a gap layer in between; and the magnetic layers are each made up of at least one layer.

4. The thin-film magnetic head according to claim 3 wherein one of the first and second shield layers functions as one of the two magnetic layers as well.

5. The thin-film magnetic head according to claim 3 wherein at least part of the groove is placed around a region facing the two magnetic layers and the thin-film coil of the induction-type magnetic transducer.

6. The thin-film magnetic head according to claim 3 wherein at least part of the groove is placed to pass through a region facing the two magnetic layers and the thin-film coil of the induction-type magnetic transducer.

7. The thin-film magnetic head according to claim 3 wherein at least part of the thin-film coil is placed on a side of the second portion of the second shield layer in a direction parallel to surface of the second portion.

8. The thin-film magnetic head according to claim 3, further comprising a base body having a concave portion, wherein:

at least part of the first shield layer is placed in a portion other than the concave portion on the surface of the base body where the concave portion is formed;

part of the first portion of the second shield layer is placed in a portion other than the concave portion on the surface of the base body where the concave portion is formed;

the remaining part of the first portion of the second shield layer is placed along the inner surface of the concave portion; and at least part of the thin-film coil is placed in the concave portion.

9. The thin-film magnetic head according to claim 1, further comprising a shield layer for shielding the at least part of the lead.

10. A method of manufacturing a thin-film magnetic head comprising: a magnetoresistive element; a first shield layer and a second shield layer for shielding the magnetoresistive element, wherein portions of the first shield layer and the second shield layer facing a recording medium are opposed to each other with the magnetoresistive element in between; a first insulating layer provided between the magnetoresistive element and the first shield layer and a second insulating layer provided between the magnetoresistive element and the second shield layer; a lead connected to the magnetoresistive element such that the magnetoresistive element is disposed between a portion of the lead connected to the magnetoresistive element and an air bearing surface of the thin-film magnetic head; and a base layer serving as a base of the first shield layer, the method including the steps of:

forming the base layer;
forming the first shield layer on the base layer;
forming the first insulating layer on the first shield layer;
forming the magnetoresistive element on the first insulating layer;
forming the second insulating layer on the magnetoresistive element and the first insulating layer; and
forming the second shield layer so that the portion of the second shield layer facing the recording medium is opposed to the first shield layer with the first insulating layer, the magnetoresistive element and the second insulating layer in between, wherein the step of forming the second shield layer includes the steps of forming: a first portion of the second shield layer at least part of which is placed together with the first shield layer in one plane of the base layer; a second portion of the second shield layer connected to the first portion, the second portion being opposed to the first shield layer with the magnetoresistive element in between; and a groove located between the first shield layer and the first portion of the second shield layer, in which at least part of the lead is placed, the method further including the step of forming the lead so that the at least part of the lead is placed in the groove to extend from the portion of the lead connected to the magnetoresistive element, being insulated from the first shield layer and the first portion of the second shield layer.

11. The method according to claim 10, further including the step of forming an insulating film placed in the groove, the insulating film insulating the at least part of the lead from the shield layers facing the groove.

12. The method according to claim 10, further including the step of forming an induction-type magnetic transducer having two magnetic layers magnetically coupled to each other and a thin-film coil placed between the two magnetic layers, wherein: parts of sides of the two magnetic layers facing a recording medium include magnetic pole portions opposed to each other with a gap layer in between; and the magnetic layers are each made up of at least one layer.

13. The method according to claim 12 wherein one of the first and second shield layers functions as one of the two magnetic layers as well.

14. The method according to claim 12 wherein at least part of the groove is placed around a region facing the two magnetic layers and the thin-film coil of the induction-type magnetic transducer.

15. The method according to claim 12 wherein at least part of the groove is placed to pass through a region facing the two magnetic layers and the thin-film coil of the induction-type magnetic transducer.

16. The method according to claim 12, further including the step of forming a shield layer for shielding the at least part of the lead at the same time as forming one of the magnetic layers of the induction-type magnetic transducer.

17. The method according to claim 12 wherein at least part of the thin-film coil is placed on a side of the second portion of the second shield layer in a direction parallel to surfaces of the second portion.

18. The method according to claim 12 wherein the at least part of the lead and at least part of the thin-film coil are formed at the same time in the step of forming the lead and the step of forming the induction-type magnetic transducer.

19. The method according to claim 18 wherein the at least part of the lead and the at least part of the thin-film coil are formed by plating.

20. The method according to claim 12 wherein the thin-film magnetic head further comprises a base body having a concave portion, wherein:
- at least part of the first shield layer is placed in a portion other than the concave portion on the surface of the base body where the concave portion is formed;
- part of the first portion of the second shield layer is placed in a portion other than the concave portion on the surface of the base body where the concave portion is formed;
- the remaining part of the first portion of the second shield layer is placed along the inner surface of the concave portion; and
- at least part of the thin-film coil is placed in the concave portion.

21. The method according to claim 20 wherein the step of forming the induction-type magnetic transducer includes the steps of:
- forming the at least part of the thin-film coil in the concave portion;
- forming an insulating portion to cover the at least part of the thin-film coil in the concave portion; and
- flattening the surfaces of the insulating portion, the first shield layer and the first portion of the second shield layer so that the surfaces are brought to one plane.

22. The method according to claim 20 wherein the step of forming the induction-type magnetic transducer includes the steps of:
- forming part of the thin-film coil in the concave portion;
- forming a first insulating portion to cover the part of the thin-film coil in the concave portion;
- flattening the surfaces of the first insulating portion, the first shield layer and the first portion of the second shield layer so that the surfaces are brought to one plane;
- forming the remaining part of the thin-film coil on the first insulating portion;
- forming a second insulating portion to cover the remaining part of the thin-film coil; and
- flattening the surfaces of the second insulating portion and the second portion of the second shield layer so that the surfaces are brought to one.

23. The method according to claim 10, further including the step of forming a shield layer for shielding the at least part of the lead.

24. The method according to claim 10 wherein the first portion of the second shield layer is formed at the same time as the first shield layer and made of the same material as the first shield layer in the step of forming the first shield layer and the step of forming the second shield layer.

25. The method according to claim 10 wherein the first shield layer and the first portion of the second shield layer placed in the one plane are formed by plating.

26. The method according to claim 10 wherein the at least part of the lead is formed by plating.

27. A thin-film magnetic head material used for manufacturing a thin-film magnetic head, the head comprising:
- a magnetoresistive element;
- a first shield layer and a second shield layer for shielding the magnetoresistive element, wherein portions of the first shield layer and the second shield layer facing a recording medium are opposed to each other with the magnetoresistive element in between;
- a first insulating layer provided between the magnetoresistive element and the first shield layer and a second insulating layer provided between the magnetoresistive element and the second shield layer;
- a lead connected to the magnetoresistive element such that the magnetoresistive element is disposed between a portion of the lead connected to the magnetoresistive element and an air bearing surface of the thin-film magnetic head;
- a base layer serving as a base of the first shield layer; and
- an induction-type magnetic transducer having a first magnetic layer and a second magnetic layer magnetically coupled to each other and a thin-film coil placed between the two magnetic layers, wherein: parts of sides of the two magnetic layers facing a recording medium include magnetic pole portions opposed to each other with a gap layer in between; and the magnetic layers are each made up of at least one layer;

wherein the second shield layer includes a first portion at least part of which is placed together with the first shield layer in one plane of the base layer, and a second portion connected to the first portion, the second portion being opposed to the first shield layer with the magnetoresistive element in between, and the second shield layer functions as the first magnetic layer as well;

the head further comprising a groove in which at least part of the lead is placed, the groove being formed between the first shield layer and the first portion of the second shield layer, wherein the at least part of the lead is placed in the groove to extend from the portion of the lead connected to the magnetoresistive element, being insulated from the first shield layer and the first portion of the second shield layer, the head material comprising:
- the base layer;
- the first shield layer;
- the first portion of the second shield layer placed such that the groove is formed between the first shield layer and the first portion;
- the at least part of the lead placed in the groove; and
- at least part of the thin-film coil placed to face the first portion of the second shield layer.

28. The thin-film magnetic head material according to claim 27, further comprising an insulating film placed in the groove, the insulating film insulating the at least part of the lead from the first shield layer and the first portion of the second shield layer.

29. The thin-film magnetic head material according to claim 27, further comprising a base body having a concave portion, wherein:
- at least part of the first shield layer is placed in a portion other than the concave portion on the surface of the base body where the concave portion is formed;
- part of the first portion of the second shield layer is placed in a portion other than the concave portion on the surface of the base body where the concave portion is formed;
- the remaining part of the first portion of the second shield layer is placed along the inner surface of the concave portion; and
- at least part of the thin-film coil is placed in the concave portion.

30. A method of manufacturing a thin-film magnetic head material used for manufacturing a thin-film magnetic head, the head comprising:

a magnetoresistive element;

a first shield layer and a second shield layer for shielding the magnetoresistive element, wherein portions of the first shield layer and the second shield layer facing a recording medium are opposed to each other with the magnetoresistive element in between;

a first insulating layer provided between the magnetoresistive element and the first shield layer and a second insulating layer provided between the magnetoresistive element and the second shield layer;

a lead connected to the magnetoresistive element such that the magnetoresistive element is disposed between a portion of the lead connected to the magnetoresistive element and an air bearing surface of the thin-film magnetic head;

a base layer serving as a base of the first shield layer; and an induction-type magnetic transducer having a first magnetic layer and a second magnetic layer magnetically coupled to each other and a thin-film coil placed between the two magnetic layers, wherein: parts of sides of the two magnetic layers facing a recording medium include magnetic pole portions opposed to each other with a gap layer in between; and the magnetic layers are each made up of at least one layer; wherein:

the second shield layer includes a first portion at least part of which is placed together with the first shield layer in one plane of the base layer, and a second portion connected to the first portion, the second portion being opposed to the first shield layer with the magnetoresistive element in between; and the second shield layer functions as the first magnetic layer as well;

the head further comprising a groove in which at least part of the lead is placed, the groove being formed between the first shield layer and the first portion of the second shield layer, wherein the at least part of the lead is placed in the groove to extend from the portion of the lead connected to the magnetoresistive element, being insulated from the first shield layer and the first portion of the second shield layer, the method including the steps of:

forming the base layer;

forming the first shield layer on the base layer;

forming the first portion of the second shield layer such that the groove is formed between the first shield layer and the first portion;

forming the at least part of the lead placed in the groove; and forming at least part of the thin-film coil on the first portion of the second shield layer.

31. The method according to claim 30, further including the step of forming an insulating film placed in the groove, the insulating film insulating the at least part of the lead from the first shield layer and the first portion of the second shield layer.

32. The method according to claim 30 wherein the first portion of the second shield layer is formed at the same time as the first shield layer and made of the same material as the first shield layer in the step of forming the first shield layer and the step of forming the first portion of the second shield layer.

33. The method according to claim 30 wherein the first shield layer and the first portion of the second shield layer are formed by plating.

34. The method according to claim 30 wherein the at least part of the lead is formed by plating.

35. The method according to claim 30 wherein the at least part of the lead and the at least part of the thin-film coil are formed at the same time in the step of forming the at least part of the lead and the step of forming the at least part of the thin-film coil.

36. The method according to claim 35 wherein the at least part of the lead and the at least part of the thin-film coil are formed by plating.

37. The method according to claim 30, the thin-film magnetic head material comprising a base body having a concave portion, wherein:

at least part of the first shield layer is placed in a portion other than the concave portion on the surface of the base body where the concave portion is formed;

part of the first portion of the second shield layer is placed in a portion other than the concave portion on the surface of the base body where the concave portion is formed;

the remaining part of the first portion of the second shield layer is placed along the inner surface of the concave portion; and at least part of the thin-film coil is placed in the concave portion.

38. The method according to claim 37, further including the steps of:

forming an insulating portion to cover the at least part of the thin-film coil in the concave portion; and flattening the surfaces of the insulating portion, the first shield layer and the first portion of the second shield layer so that the surfaces are brought to one plane.

* * * * *